US009446648B2

(12) United States Patent
Allen

(10) Patent No.: US 9,446,648 B2
(45) Date of Patent: Sep. 20, 2016

(54) GAS SPRING AND GAS DAMPER ASSEMBLY WITH A RELEASABLE AXIAL-LOCKING ASSEMBLY

(71) Applicant: Firestone Industrial Products Company, LLC, Indianapolis, IN (US)

(72) Inventor: Michael P. Allen, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/404,172

(22) PCT Filed: May 29, 2013

(86) PCT No.: PCT/US2013/043196
§ 371 (c)(1),
(2) Date: Nov. 26, 2014

(87) PCT Pub. No.: WO2013/181301
PCT Pub. Date: Dec. 5, 2013

(65) Prior Publication Data
US 2015/0367700 A1    Dec. 24, 2015

Related U.S. Application Data

(60) Provisional application No. 61/652,657, filed on May 29, 2012, provisional application No. 61/682,193, filed on Aug. 10, 2012, provisional application No. 61/734,370, filed on Dec. 6, 2012.

(51) Int. Cl.
*F16F 9/56*    (2006.01)
*B60G 15/12*    (2006.01)
(Continued)

(52) U.S. Cl.
CPC .............. *B60G 15/12* (2013.01); *B60G 11/62*
(2013.01); *B60G 13/10* (2013.01); *B60G 17/00* (2013.01); *B60G 17/005* (2013.01); *F16F 9/0254* (2013.01); *F16F 9/0472* (2013.01);
(Continued)

(58) Field of Classification Search
CPC combination set(s) only.
See application file for complete search history.

(56) References Cited

U.S. PATENT DOCUMENTS 6,659,475 B2 * 12/2003 Clements ........... B60G 17/0162
267/188
7,284,644 B2 * 10/2007 Cmich .................... B60G 11/28
188/321.11
(Continued)

FOREIGN PATENT DOCUMENTS

WO    WO-2012/054524    4/2012
WO    WO-2013/075036    5/2013

OTHER PUBLICATIONS

International Search Report for corresponding Patent Application No. PCT/US2013/043196 dated Jul. 19, 2013.

*Primary Examiner* — Nicole Verley
(74) *Attorney, Agent, or Firm* — Thomas R. Kingsbury; Fay Sharpe LLP

(57) ABSTRACT

Gas spring and gas damper assemblies can include a gas spring that includes a flexible spring member, a first end member and a second end member that together at least partially define a spring chamber. A gas damper can include a first damper element and a second damper element that are telescopically engaged with one another for reciprocal motion. A releasable axial-locking assembly can be operatively connected between the first and second damper elements that is capable of operating in both locked and released conditions. Gas damper assemblies, suspension systems and methods of manufacture are also included.

20 Claims, 36 Drawing Sheets

(51) Int. Cl.
*F16F 9/05* (2006.01)
*B60G 11/62* (2006.01)
*B60G 13/10* (2006.01)
*F16F 9/02* (2006.01)
*F16F 9/04* (2006.01)
*F16F 9/32* (2006.01)
*B60G 17/00* (2006.01)
*B60G 17/005* (2006.01)

(52) U.S. Cl.
CPC .............. *F16F 9/052* (2013.01); *F16F 9/057* (2013.01); *F16F 9/3228* (2013.01); *F16F 9/56* (2013.01); *B60G 2202/134* (2013.01); *B60G 2202/152* (2013.01); *B60G 2202/242* (2013.01); *B60G 2202/314* (2013.01); *B60G 2204/424* (2013.01); *B60G 2204/46* (2013.01); *B60G 2206/41* (2013.01); *F16F 2230/0041* (2013.01); *F16F 2230/24* (2013.01)

(56) References Cited

U.S. PATENT DOCUMENTS

| | | | | |
|---|---|---|---|---|
| 7,891,643 B2* | 2/2011 | Rana | ............... | F16F 9/0254 188/300 |
| 8,127,900 B2* | 3/2012 | Inoue | ............... | B60G 13/16 188/266.1 |
| 8,205,540 B2* | 6/2012 | Bochen | ............... | F16F 9/56 92/26 |
| 8,641,051 B2* | 2/2014 | Pavuk | ............... | B60G 17/052 188/275 |
| 8,800,975 B2* | 8/2014 | Moulik | ............... | B60G 15/14 267/64.24 |
| 8,979,075 B2* | 3/2015 | Street | ............... | B60G 11/27 267/219 |
| 9,056,650 B2* | 6/2015 | Gonzalez | ............... | B62K 25/08 |
| 9,062,738 B2* | 6/2015 | Hilpert | ............... | F16F 9/12 |
| 9,254,727 B2* | 2/2016 | Moulik | ............... | B60G 17/0521 |
| 9,290,073 B2* | 3/2016 | Bounds | ............... | B60G 15/14 |
| 9,296,272 B2* | 3/2016 | Leonard | ............... | B60G 11/62 |
| 2002/0121413 A1 | 9/2002 | Jurrens | | |
| 2003/0173723 A1 | 9/2003 | Behmenburg | | |
| 2004/0124571 A1 | 7/2004 | Gold | | |
| 2013/0234377 A1* | 9/2013 | Leonard | ............... | B60G 15/00 267/219 |
| 2013/0306413 A1* | 11/2013 | Wilkinson | ............... | F16B 7/1418 188/67 |
| 2015/0008627 A1* | 1/2015 | Leonard | ............... | F16F 7/09 267/64.24 |

* cited by examiner

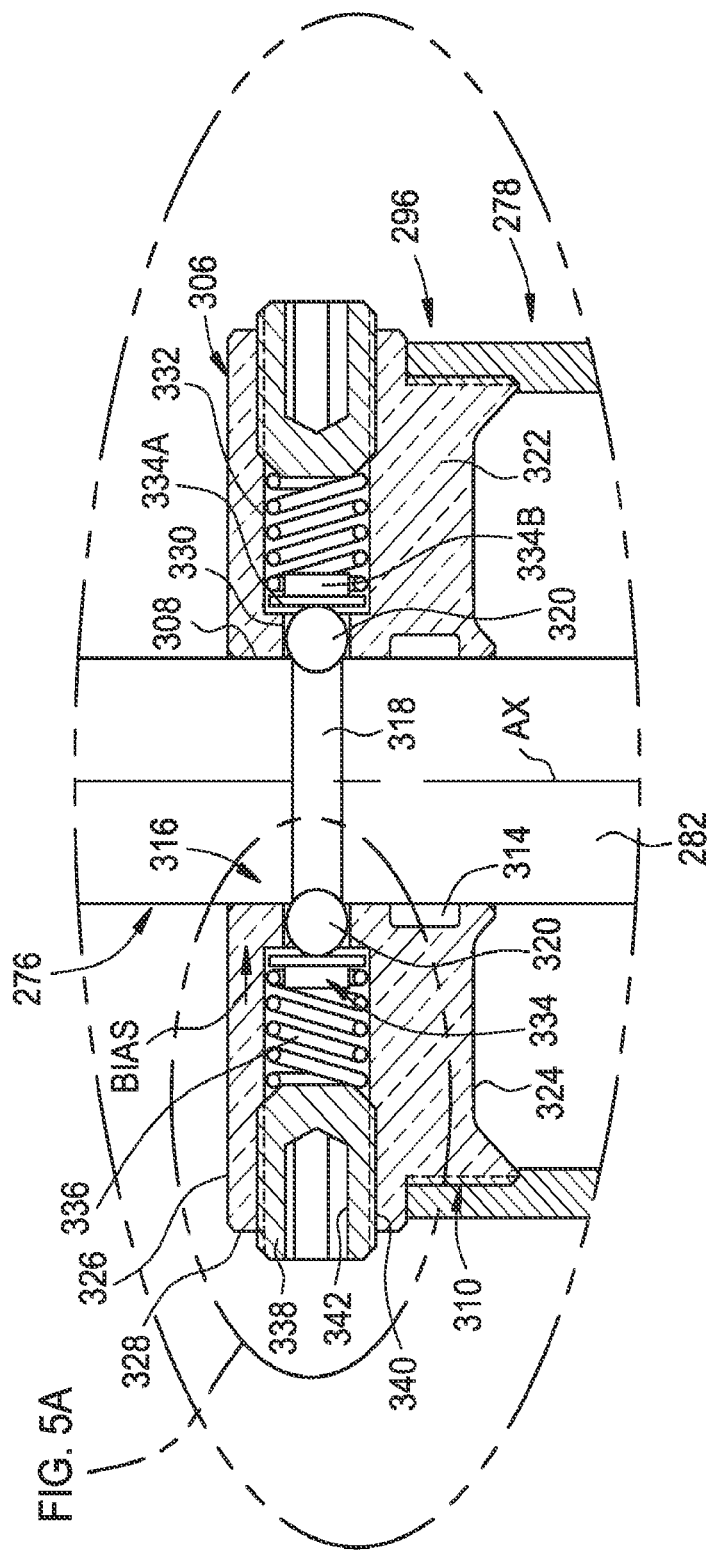

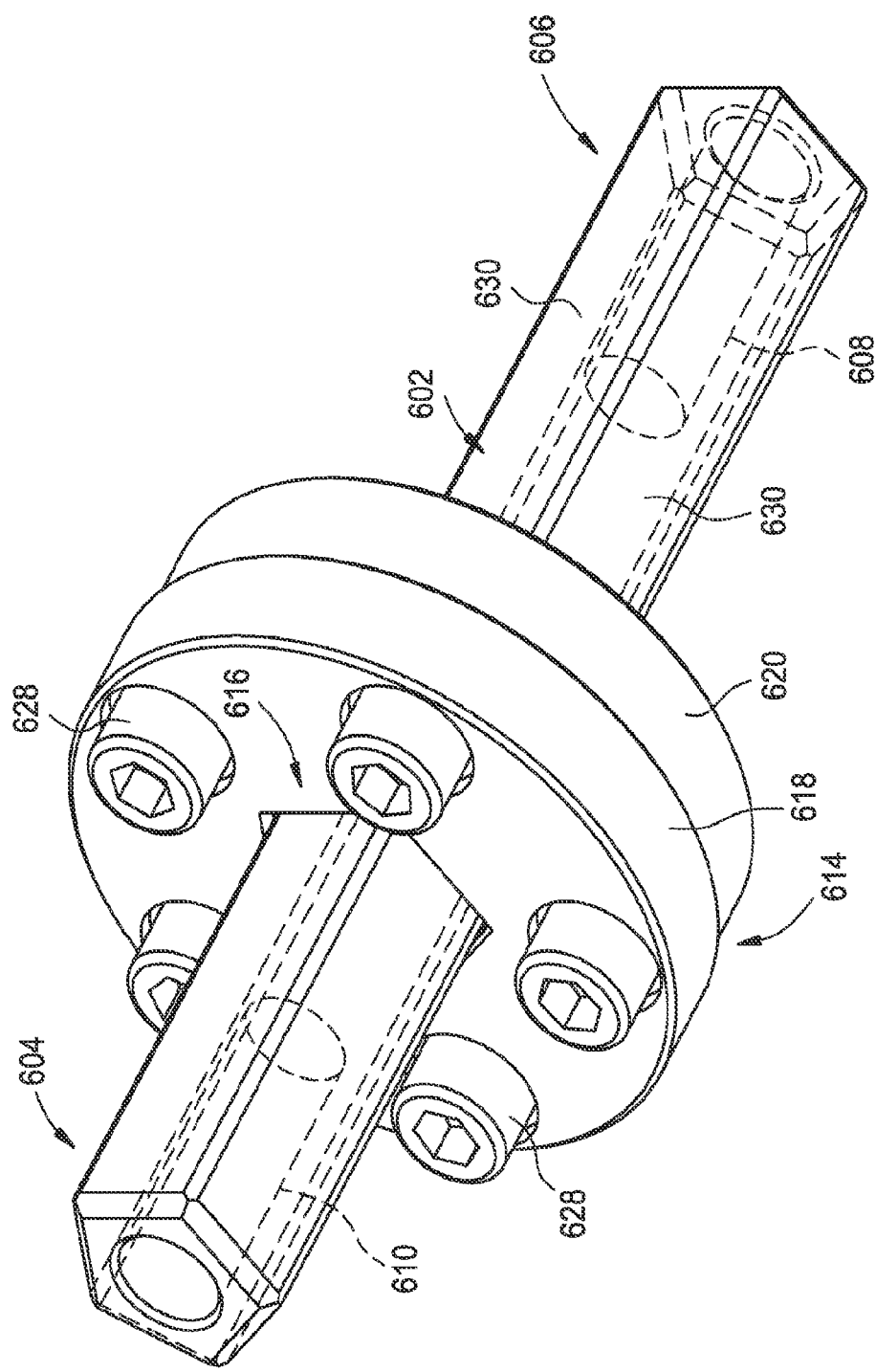

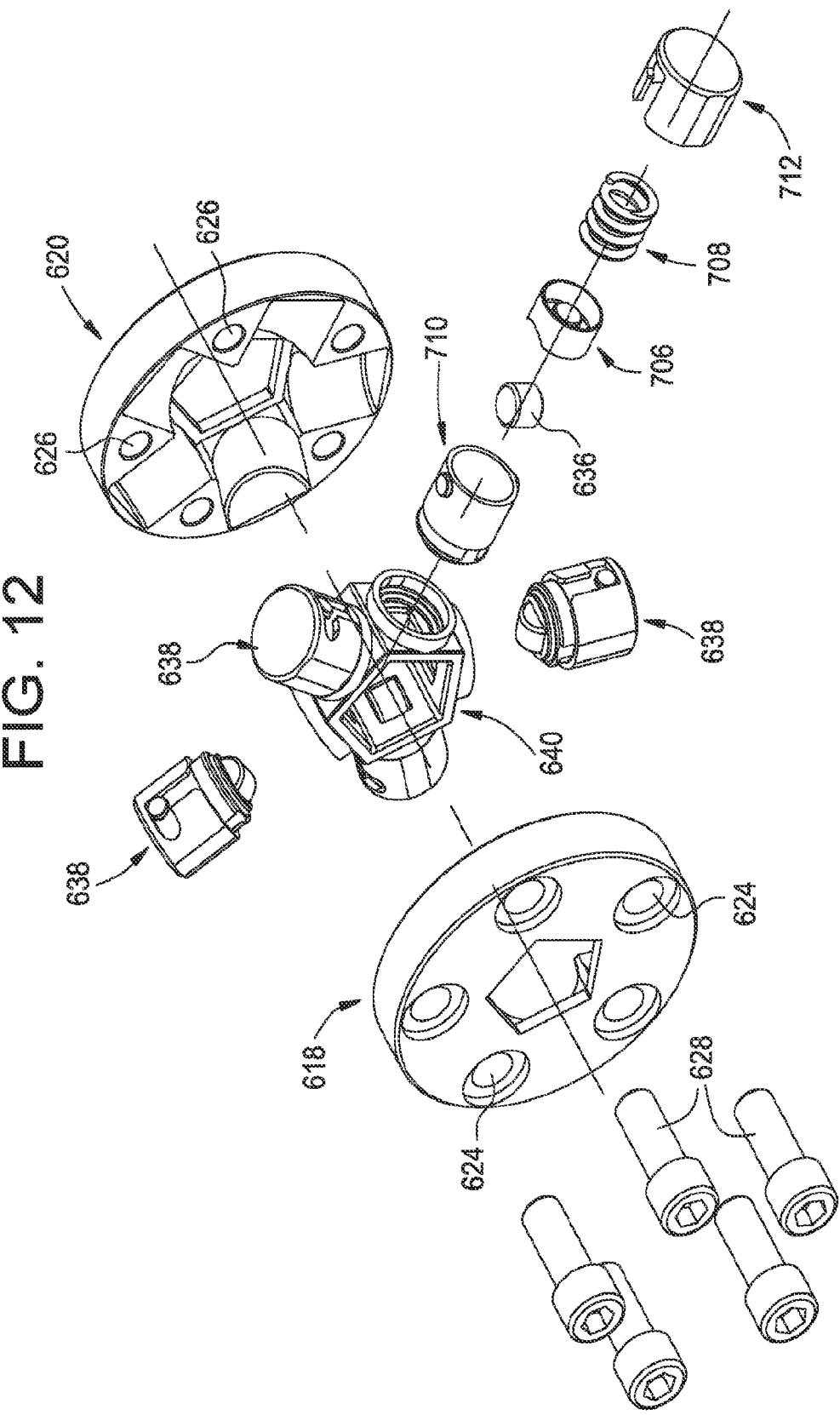

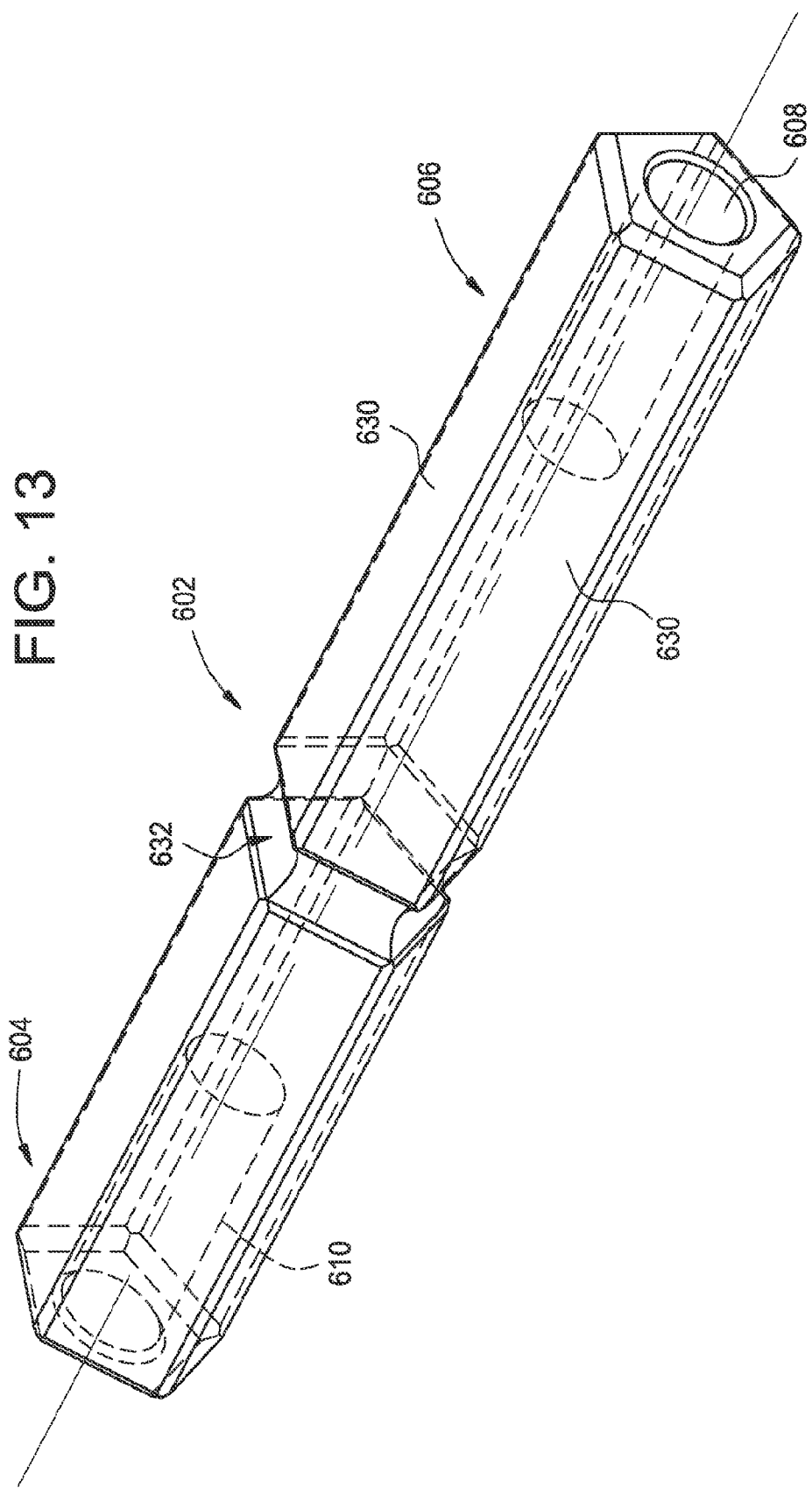

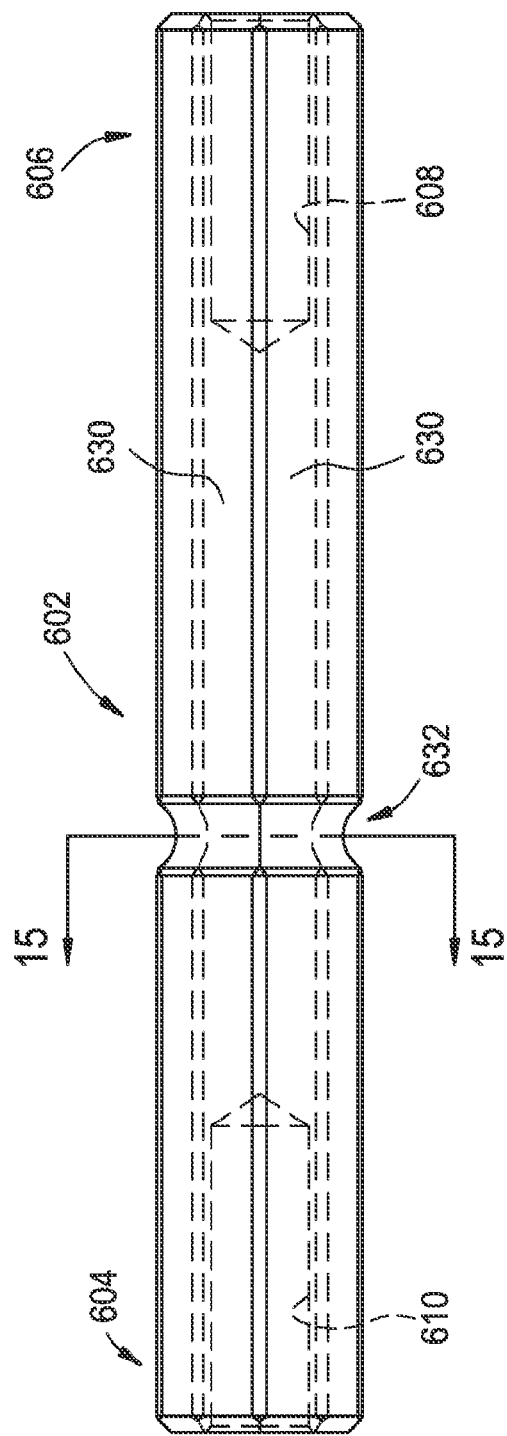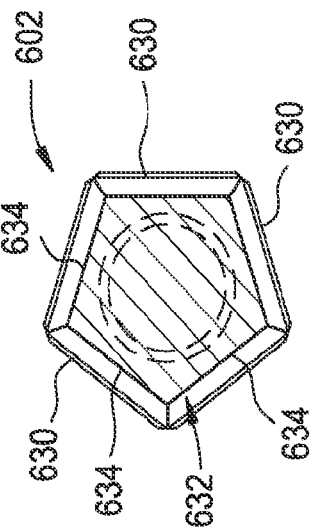

GAS SPRING AND GAS DAMPER ASSEMBLY WITH A RELEASABLE AXIAL-LOCKING ASSEMBLY

This application is the National Stage of International Application No. PCT/US2013/043196, filed on May 29, 2013, which claims the benefit of priority from U.S. Provisional Patent Application No. 61/652,657 filed on May 29, 2012, U.S. Provisional Patent Application No. 61/682,193 filed on Aug. 10, 2012, and U.S. Provisional Application No. 61/734,370 filed on Dec. 6, 2012, the subject matter of each of which is hereby incorporated herein by reference in its entirety.

BACKGROUND

The present disclosure broadly relates to the art of spring devices and, more particularly, to a gas spring and gas damper assembly as well as a vehicle suspension system that includes such a gas spring and gas damper assembly and a method of operating such a gas spring and gas damper assembly.

Suspension systems, such as may be used in connection with apparatuses, such as motorized vehicles, for example, can include one or more spring elements for accommodating forces and loads associated with the operation and use of the corresponding apparatus (e.g., a motorized vehicle) to which the suspension system is operatively connected. In such applications, it is often considered desirable to utilize spring elements that operate at a lower relative spring rate, as such a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the significant travel of which gas spring devices are capable. That is, gas spring devices are capable of being displaced between a minimum or compressed height and a maximum or extended height and the difference in these overall heights can be substantial.

Certain difficulties relating to the incorporation of gas dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is desired to develop a gas spring and gas damper assembly as well as a suspension system and method of assembly that overcome the foregoing and/or other difficulties associated with known constructions, and/or which may otherwise advance the art of gas spring and gas damper assemblies.

BRIEF SUMMARY

One example of a releasable axial-locking assembly in accordance with the subject matter of the present disclosure for use in forming a damper assembly can include a first damper element and a second damper element telescopically engaged with the first damper element for reciprocal motion relative to one another. A releasable axial-locking assembly can be operatively connected between the first and second damper elements. The releasable axial-locking assembly can be capable of operation in a locked condition in which the first and second damper elements are maintained in a substantially fixed position relative to one another up to a predetermined force threshold. And, the releasable axial-locking assembly can be capable of operation in a released condition in which the first and second damper elements can move relative to one another under conditions in which the predetermined force threshold is exceeded.

One example of a gas spring and gas damper assembly in accordance with the subject matter of the present disclosure can include a gas spring and a gas damper disposed within the gas spring. The gas spring can have a longitudinal axis and can include a flexible spring member that includes a flexible wall extending peripherally about the axis and longitudinally between opposing first and second ends such that the flexible spring member at least partially defines a spring chamber. A first end member can be secured across the first end of the flexible spring member such that a substantially fluid-tight seal is formed therebetween. A second end member can be secured across the second end of the flexible spring member such that a substantially fluid-tight seal is formed therebetween. The gas damper can include a first damper element operatively connected to the first end member. A second damper element can be operatively connected to the second end member and can be telescopically engaged with the first damper element for reciprocal motion relative to one another upon displacement of the gas spring between an extended condition and a compressed condition. A releasable axial-locking assembly can be operatively connected between the first and second damper elements and can be capable of maintaining the first and second damper elements in a substantially fixed position relative to one another up to a predetermined force threshold and capable of permitting relative movement between the first and second damper elements under conditions in which the predetermined force threshold is exceeded.

One example of a suspension system in accordance with the subject matter of the present disclosure can include a pressurized gas system and one or more gas spring assemblies according to the foregoing paragraph in fluid communication with the pressurized gas system.

One example of a method of manufacturing a damper assembly including a releasable axial-locking assembly in accordance with the subject matter of the present disclosure can include providing first and second damper elements and telescopically engaging the first and second damper elements for reciprocal motion relative to one another. The method can also include providing a releasable axial-locking assembly capable of operation in a locked condition in which the first and second damper elements are maintained in a substantially fixed position relative to one another up to a predetermined force threshold and capable of operation in a released condition in which the first and second damper elements can move relative to one another under conditions in which the predetermined force threshold is exceeded. The method can further include operatively connecting the releasable axial-locking assembly between the first and second damper elements.

A method of manufacturing a gas spring and gas damper assembly can include providing a damper assembly according to the foregoing paragraph. The method can also include providing a first end member, a second end member and a flexible spring member. The method can further include operatively connecting the first damper element to the first end member and operatively connecting the second damper element to the second end member. The method can also include securing the flexible spring member between the first and second and members to form a gas spring having a spring chamber that includes the damper assembly therein.

BRIEF DESCRIPTION OF THE DRAWINGS

FIG. 5 is an enlarged, cross-sectional view of the portion of the gas spring and gas damper assembly in FIGS. 2-4 identified as Detail 5 in FIG. 4.

FIG. 11 is a top perspective view of a portion of the gas spring and gas damper assembly shown in FIGS. 9 and 10.

FIG. 12 is an exploded perspective view of a portion of the gas spring and gas damper assembly shown in FIGS. 9-11.

FIG. 13 is a perspective view of one example of a damper rod.

FIG. 14 is a top plan view of the damper rod shown in FIG. 13.

FIG. 15 is a cross-sectional side view of the damper rod shown in FIGS. 13 and 14 taken from along line 15-15 in FIG. 14.

DETAILED DESCRIPTION

Figure 1:
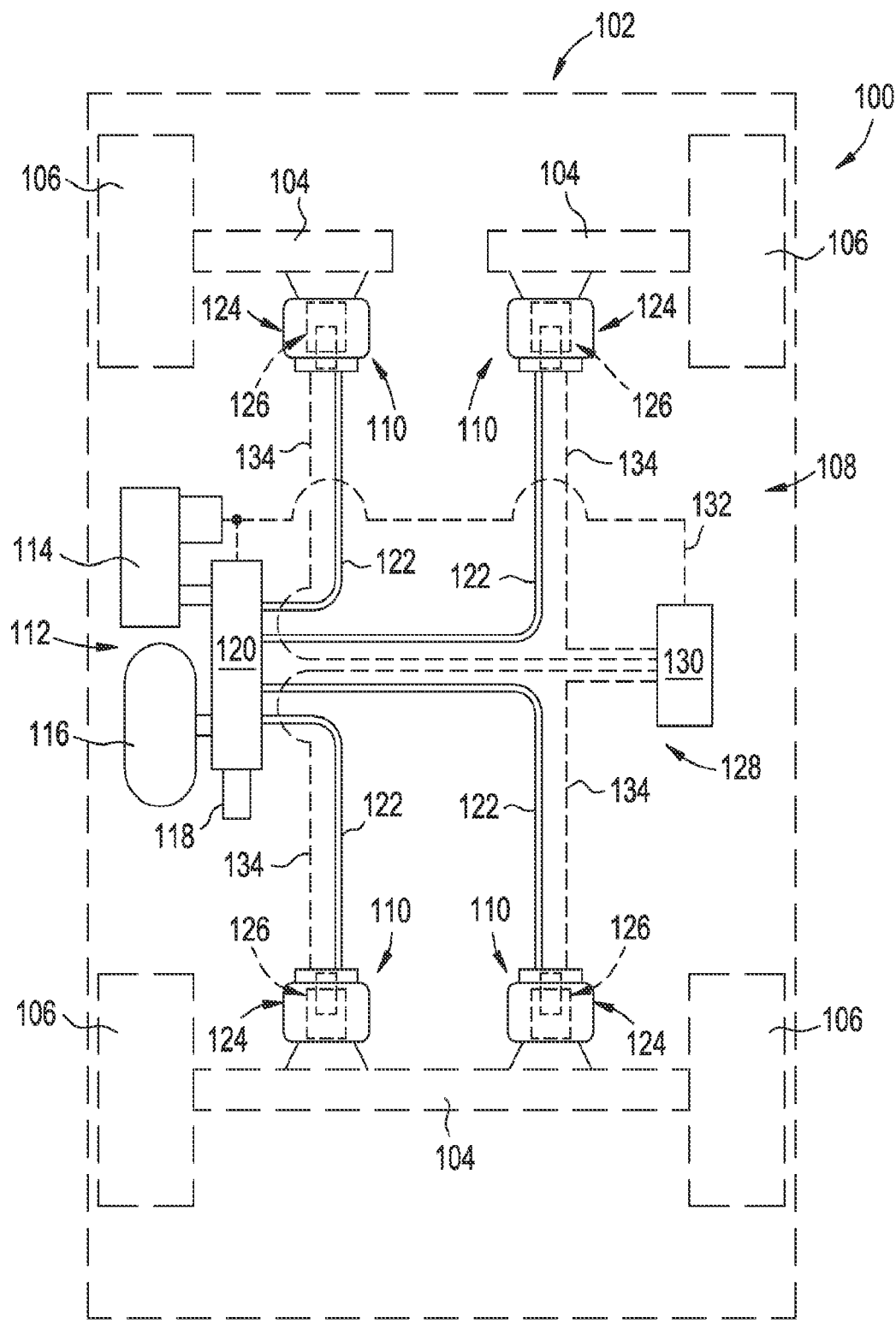
FIG. 1 is a schematic representation of one example of a vehicle including a suspension system utilizing gas spring and gas damper assemblies in accordance with the subject matter of the present disclosure.
Figure 2:
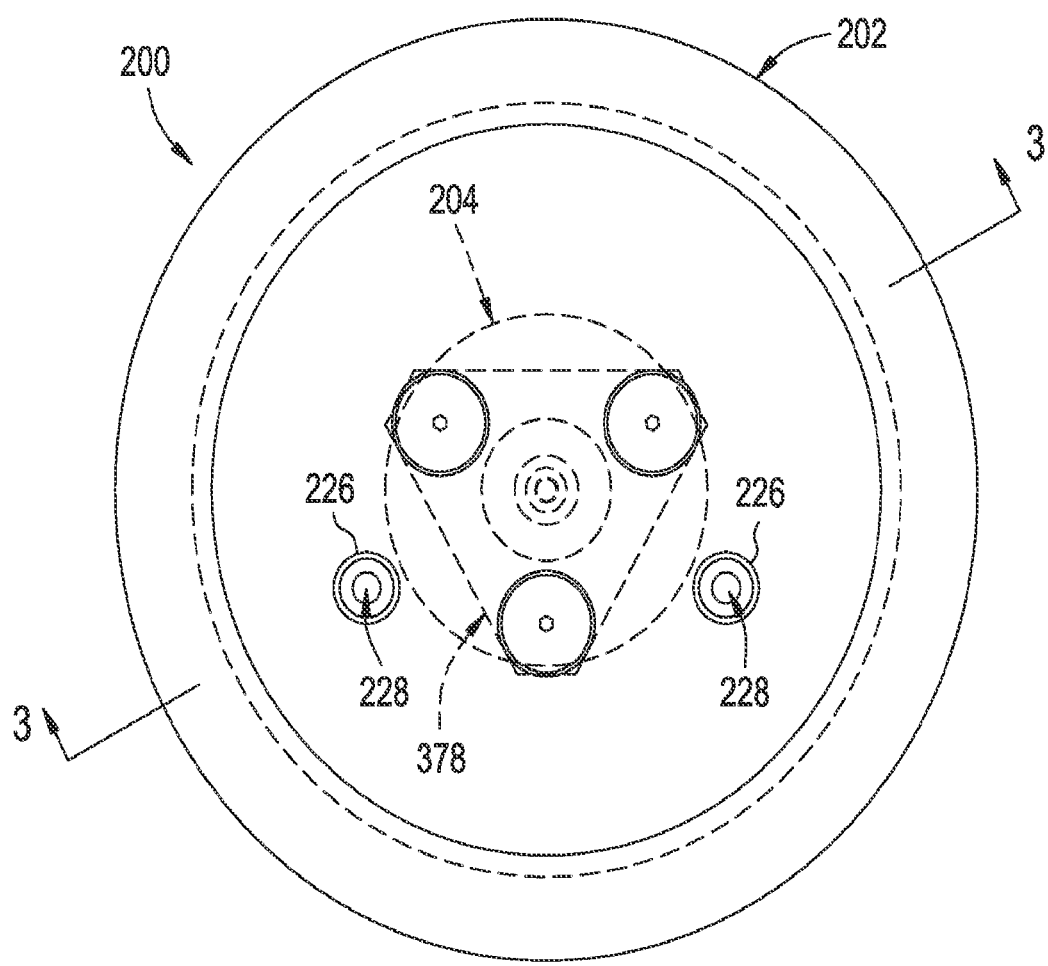
FIG. 2 is a top plan view of one example of a gas spring and gas damper assembly in accordance with the subject matter of the present disclosure.

Turning now to the drawings wherein the showings are for the purpose of illustrating exemplary embodiments of the subject matter of the present disclosure and not for limiting the same, FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Vehicle 100 also includes a pressurized gas system 112 that is in communication with assemblies 110 and that is operative to selectively supply pressurized gas thereto and exhaust pressurized gas therefrom. Pressurized gas system 112 can include a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting pressurized gas from the system.

Pressurized gas system 112 can be in communication with the gas spring and gas damper assemblies in any suitable manner. For example, system 112 can include a valve assembly 120 or other suitable device or arrangement for selectively distributing pressurized gas to, from and/or between the pressurized gas source or sources, the exhaust and/or the gas spring and gas damper assemblies. As shown in the exemplary embodiment in FIG. 1, compressor 114, reservoir 116 and muffler 118 are in fluid communication with valve assembly 120 and can be selectively placed in fluid communication with one another by way of the valve assembly. Additionally, assemblies 110 are in fluid communication with valve assembly 120 by way of gas transmission lines 122 and, thus, can be selectively placed in communication with the compressor, reservoir, muffler and/or one another by way of the valve assembly.

It will be appreciated that gas spring and gas damper assemblies 110 can take any suitable form, configuration and/or construction in accordance with the present novel concept. In the embodiment shown in FIG. 1, each assembly 110 includes a gas spring assembly 124 and a gas damper assembly, which is schematically represented in FIG. 1 by item number 126, that is substantially-entirely contained within gas spring assembly 124. Gas spring assemblies 124 include a spring chamber (not numbered) that is operative to receive and retain a quantity of pressurized gas. Gas damper assemblies 126 can include a plurality of components that are telescopically interconnected with one another and at least partially define a plurality of damping chambers. In some cases, one of the gas dampers can be at least partially received within the spring chamber of a gas spring assembly with one or more of the damping chambers being in fluid communication with the spring chamber of the gas spring assembly.

In operation of the exemplary embodiment shown in FIG. 1, valve assembly 120 can be selectively actuated to transfer pressurized gas from the compressor and/or reservoir to one or more of gas spring and gas damper assemblies 110 via one or more of gas transmission lines 122. Additionally, valve assembly 120 can be selectively actuated to exhaust pressurized gas from one or more of the gas spring and gas damper assemblies through the gas transmission lines, such as by way of muffler 118 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a control system 128 for selectively operating, adjusting or otherwise influencing or controlling the performance or one or more suspension system components, such as gas spring and gas damper assemblies 110 and/or pressurized gas system 112, for example. Control system 128 can include an electronic control unit 130 in communication with one or more components of valve assembly 120, such as through a communication line 132, for example, for selective actuation and/or operation thereof. Electronic control unit 130 is also shown in FIG. 1 as being in communication with suitable height sensing devices (not shown in FIG. 1) that can optionally be used in association with gas spring and gas damper assemblies 110. It will be appreciated that such communications can be implemented in any suitable manner, such as by way of communication lines 134, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 128, such as pressure sensors, accelerometers and/or temperature sensors, for example.

Figure 3:
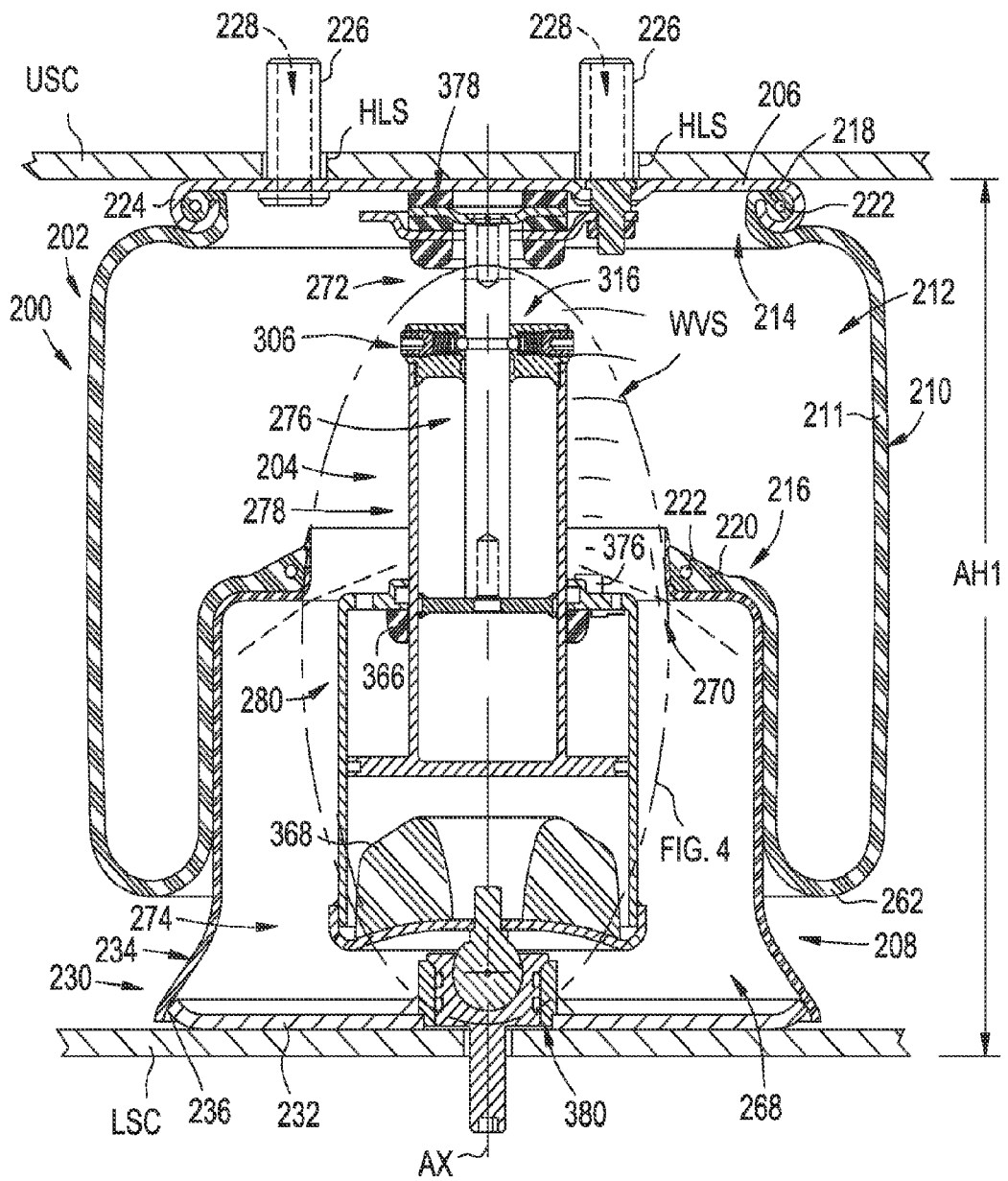
FIG. 3 is a cross-sectional side view of the gas spring and gas damper assembly shown in FIG. 2 taken from along line 3-3 thereof.

One example of a gas spring and gas damper assembly 200 in accordance with the subject matter of the present disclosure, such as may be suitable for use as assemblies 110 in FIG. 1, for example, is shown in FIGS. 2-7. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement, such as is shown in FIG. 1-7 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 202 can operatively connected between opposing structural components in any suitable manner, such as, for example, are generally represented in FIG. 3 by upper structural component USC (e.g., vehicle body 102 in FIG. 1) and lower structural component LSC (e.g., axle 104 in FIG. 1).

In the exemplary arrangement shown in FIGS. 2, 3, 6 and 7, gas spring assembly 202 has a longitudinally-extending axis AX and includes a first or upper end member, such as a bead plate 206, for example, and an opposing second or lower end member, such as a piston 208, for example, that is spaced longitudinally from the first end member. A flexible wall, such as a flexible sleeve 210, for example, can be secured between the first end member (e.g., bead plate 206) and the second end member (e.g., piston 208) in a suitable manner such that a spring chamber 212 is at least partially formed therebetween.

Flexible sleeve 210 includes a flexible wall 211 that extends peripherally about axis AX and in a generally longitudinal manner between a sleeve end 214 and a sleeve end 216. Flexible sleeve 210 can also include a mounting bead 218 along sleeve end 214 and a mounting bead 220 along sleeve end 216. Mounting beads 218 and 220 can optionally include a reinforcing element or other suitable component, such as a bead wire 222, for example.

End 214 of flexible sleeve 210 can be secured on or along the end member in any suitable manner. For example, mounting bead 218 of the flexible sleeve can be captured by an outer peripheral edge 224 of bead plate 206. The peripheral edge can be deformed around mounting bead 218 in any manner suitable for forming a substantially fluid-tight seal therewith. One or more securement devices, such as mounting studs 226, for example, can be included along bead plate 206 and project through the associated structural component (e.g., upper structural component USC) in a manner suitable for receiving a corresponding securement device or element (not shown) to secure the first end member to the associated structural component. In the exemplary embodiment shown in FIG. 3, mounting studs 226 project axially outwardly from the bead plate and extend through holes HLS in upper structural component USC.

Additionally, a fluid communication port, such as a fluid passage 228, for example, can optionally be provided on or along the first or upper end member to permit fluid communication with spring chamber 212. In the exemplary embodiment shown, fluid passages 228 extend through mounting studs 226 and are in fluid communication with the spring chamber. It will be appreciated, however, that any other suitable fluid communication arrangement could alternately be used.

Mounting bead 220 of flexible sleeve 210 can be secured to the second end member in any suitable manner. As one example, the mounting bead could be retained on or along the piston using one or more retaining elements or components (e.g., crimp rings or retaining caps). As another example, mounting bead 220 could be friction fit along a wall portion of piston 208 and, optionally, at least partially retained thereon using a radially outwardly-extending projection. It will be appreciated, however, that any other suitable arrangement and/or configuration could alternately be used.

Figure 6:
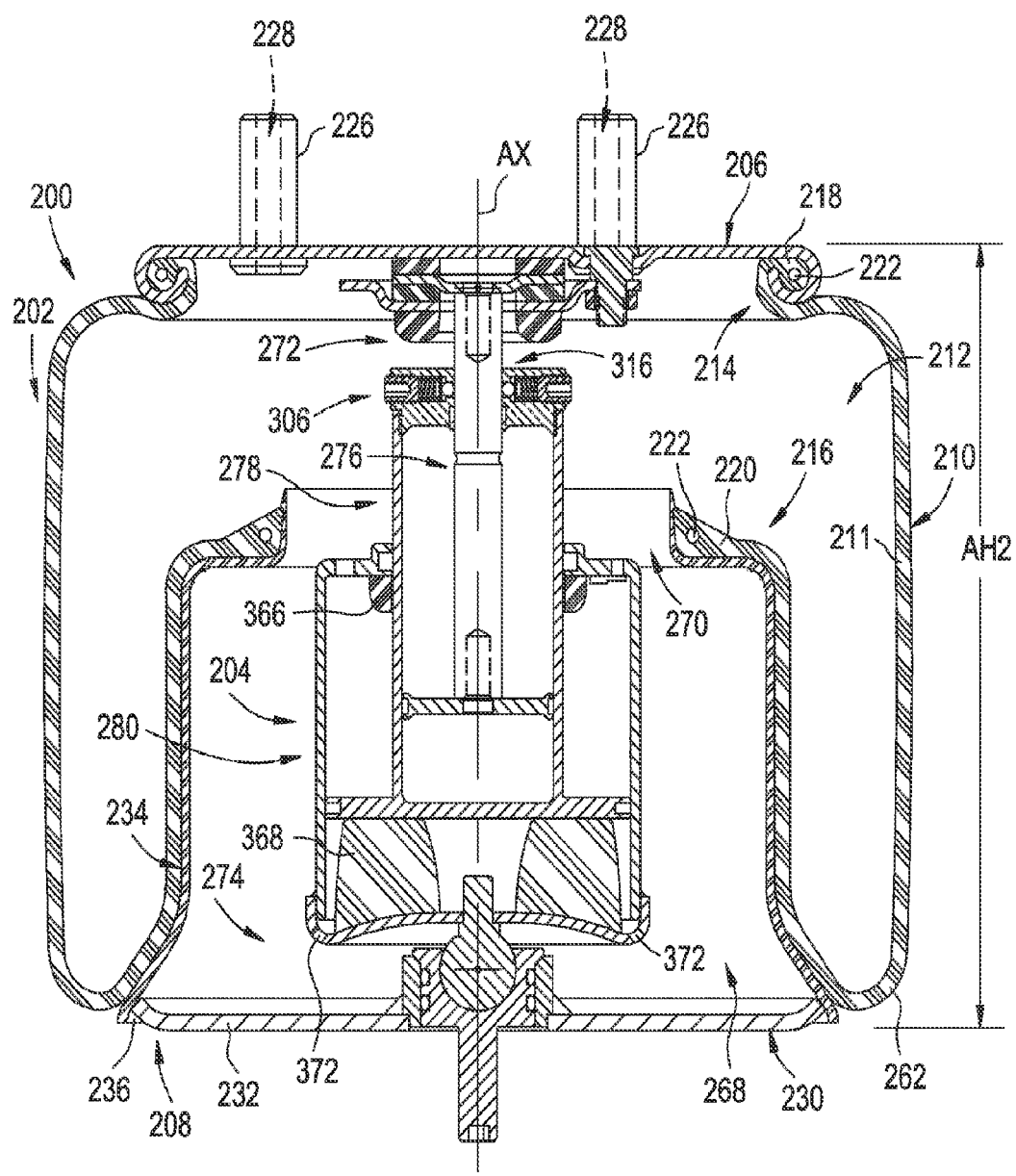
FIG. 6 is a cross-sectional side view of the gas spring and gas damper assembly in FIGS. 2-5 shown in a compressed condition.
Figure 7:
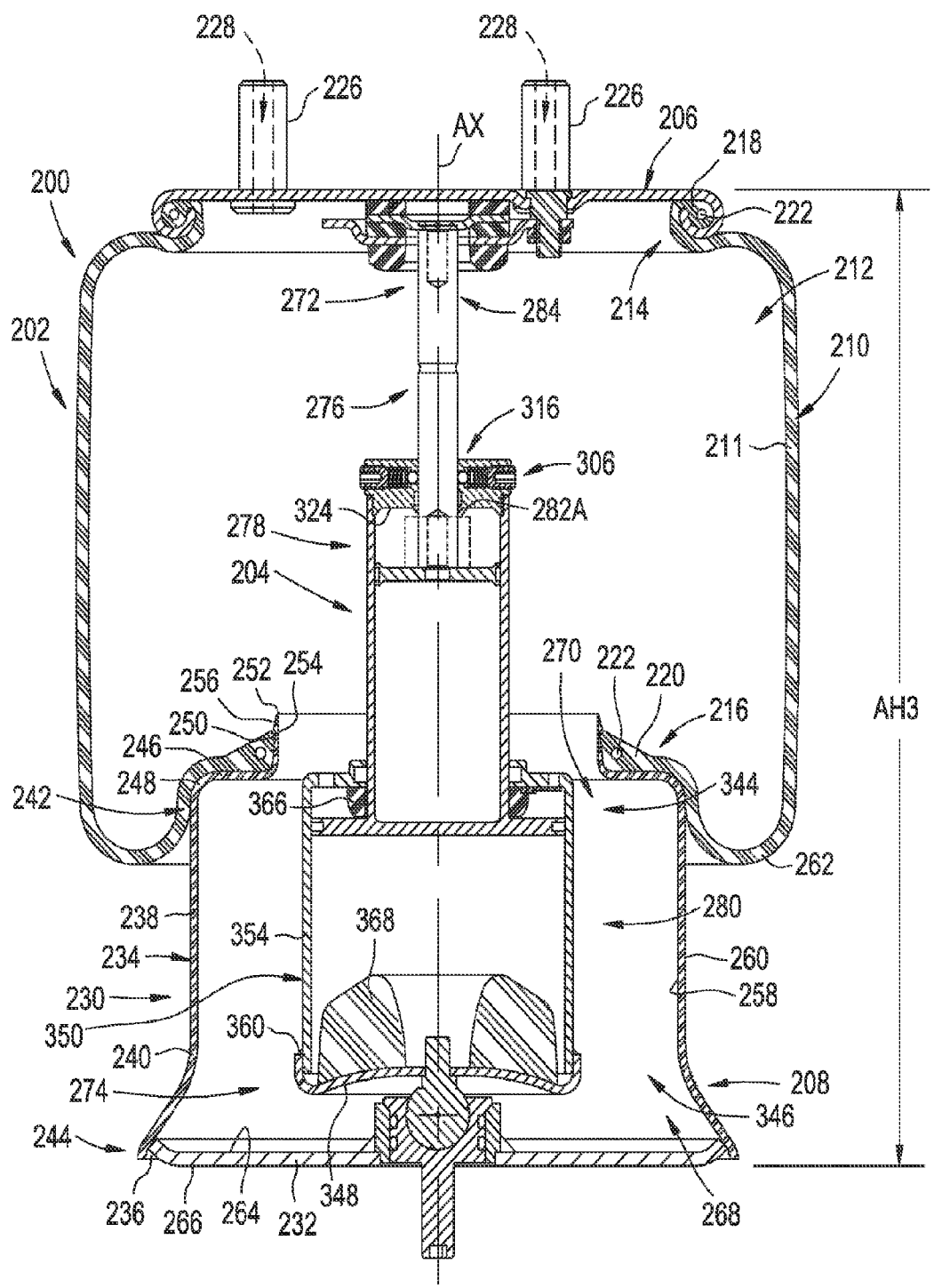
FIG. 7 is a cross-sectional side view of the gas spring and gas damper assembly in FIGS. 2-6 shown in an extended condition.

In the exemplary embodiment in FIGS. 3, 6 and 7, for example, piston 208 is shown as including piston body 230 that is formed from a base member 232 and an outer shell 234, which is operatively connected to the base member such that a substantially fluid-tight seal is formed therebetween, such as through the use of a flowed-material joint 236 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

As identified in FIG. 7, outer shell (or outer shell portion) 234 includes a shell wall 238 that extends circumferentially about axis AX. Shell wall 238 includes an outer side wall portion 240 that extends in a generally longitudinal direction between an end 242, which is disposed toward bead plate 206, and an end 244, which is disposed in longitudinally spaced relation to end 242 and toward lower structural component LSC. Shell wall 238 also includes an end wall portion 246 that transitions into outer side wall portion 240 at a curved or shoulder portion 248. An inner side wall portion 250 projects from end wall portion 246 in a direction extending axially away from end 244. Inner side wall portion 250 terminates in the axial direction at an end 252. Additionally, inner side wall portion 250 includes an outer surface (not numbered) facing radially outward and an inner surface 254 facing radially inward. A projection 256 extends radially-outwardly from along the outer surface adjacent end 252 of inner side wall portion 250.

It will be recognized that a wide variety of shapes, profiles and/or configurations can and have been used in forming the outer side wall of a gas spring piston. As such, it will be appreciated that outer side wall portion 240 of shell wall 238 can be of any suitable shape, profile and/or configuration and that the profile shown in FIGS. 3, 6 and 7 is merely exemplary. Mounting bead 220 of flexible sleeve 210 can be received on or along the outer surface of inner side wall portion 250 such that a substantially fluid-tight seal is formed therebetween with projection 256 at least partially retaining mounting bead 220 on inner side wall portion 250. Additionally, outer side wall portion 240 of shell wall 238 includes an inside surface 258 (FIG. 7) and an outside surface 260 (FIG. 7). As such, a portion of flexible sleeve 210 extends along end wall portion 246 and outside surface 260 of outer side wall portion 240 such that a rolling lobe 262 is formed along piston body 230 and is displaced along the outer side wall portion as the gas spring assembly undergoes changes in overall height.

Base member 232 includes an inside surface 264 (FIG. 7) and an outside surface 266 (FIG. 7), which can be disposed in abutting engagement with lower structural component LSC. Inside surface 264 of base member 232 and inside surface 258 of outer side wall portion 240 at least partially define a piston chamber 268 within piston 208. Inner surface 254 of inner side wall portion 250 at least partially defines an opening or passage 270 into piston 208 by which piston chamber 268 is in fluid communication with spring chamber 212. In a preferred arrangement, inner surface 254 defines an opening or passage (e.g., passage 270) into piston chamber 268 that is of sufficient size to permit piston chamber 268 and spring chamber 212 to operate as a substantially unified fluid chamber. That is, in a preferred arrangement, passage 270 will be sufficiently large that minimal fluid flow restriction (e.g., approximate zero fluid flow restriction) will occur for pressurized gas flowing between spring chamber 212 and piston chamber 268 under typical conditions of operation.

Gas damper assembly 204 is shown in FIGS. 2-7 as being substantially entirely contained within gas spring assembly 202 and extending longitudinally between an end 272 that is operatively connected to bead plate 206 and an end 274 that is operatively connected to piston 208. Gas damper assembly 204 includes a plurality of damper elements that are operatively interconnected with one another for telescopic extension and compression in relation to corresponding extension and compression of gas spring assembly 202.

In the exemplary arrangement in FIGS. 2-7, gas damper assembly 204 is shown as including damper elements 276, 278 and 280 that are operatively interconnected with one another for telescopic extension and compression. Damper element 276 is operatively connected to the first end member (e.g., bead plate 206) and extends from the first end member toward the second end member (e.g., piston 208). Damper element 280 is operatively connected to the second end member (e.g. piston 208) and extends from the second end member toward the first end member (e.g., bead plate 206). Damper element 278 is disposed longitudinally between damper elements 276 and 280, and is operatively interconnected therewith such that damper elements 276 and 278 can move relative to one another and such that damper element 278 and 280 can move relative to one another.

Figure 4:
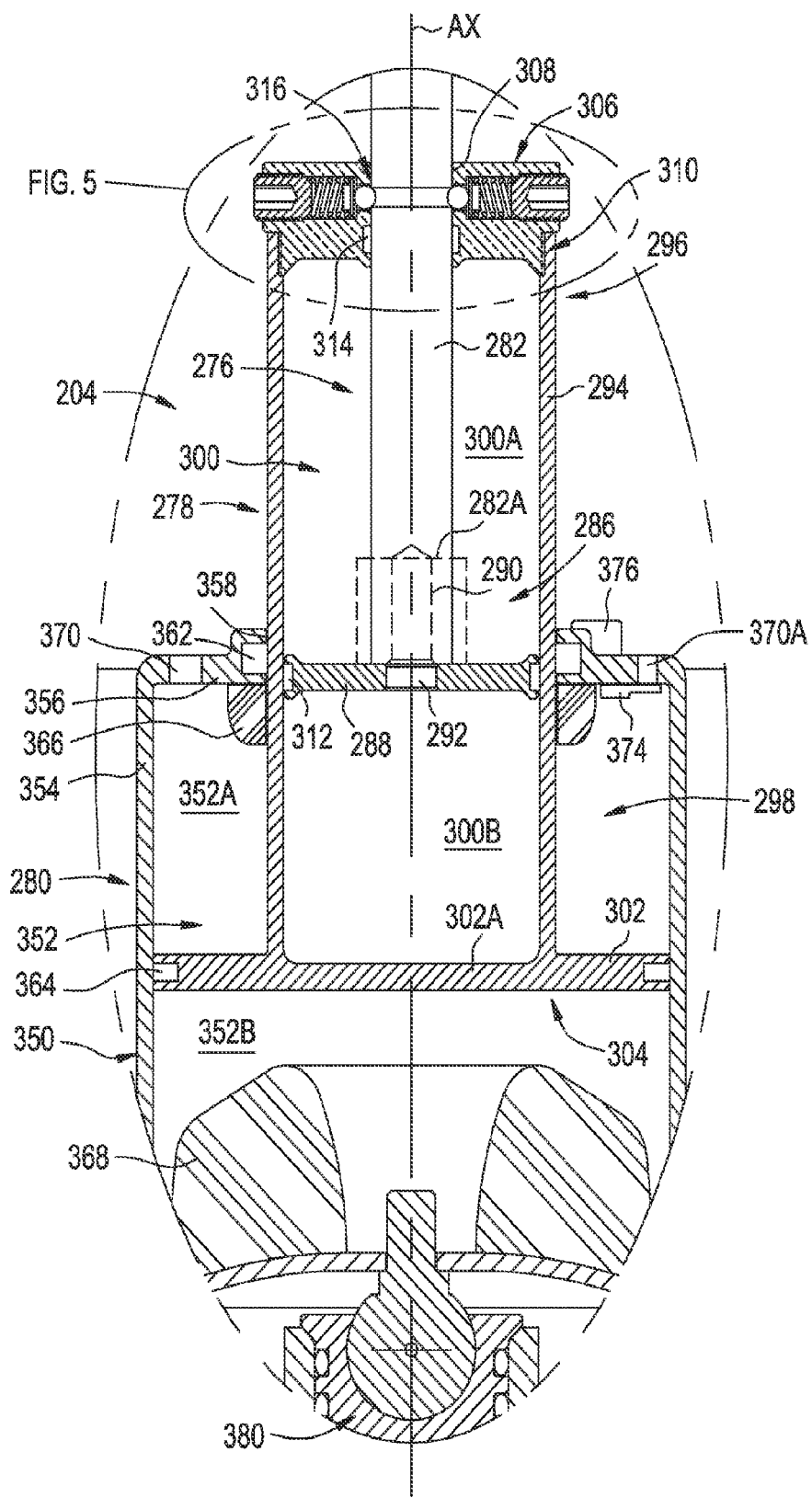
FIG. 4 is an enlarged, cross-sectional view of the portion of the gas spring and gas damper assembly in FIGS. 2 and 3 identified as Detail 4 in FIG. 3.

As identified in FIG. 4, damper element 276 includes a damper rod 282 that extends longitudinally from an end 284 (FIG. 7) to an end 286. A damper piston 288 is disposed along end 286 of damper rod 282 and can be attached or otherwise connected thereto in any suitable manner. For example, damper piston 288 could be integrally formed with damper rod 282. As another example, end 286 of damper rod 282 could include a securement feature, such as a threaded passage 290, for example. Damper piston 288 could include a hole 292 extending therethrough such that a securement device, such as a threaded fastener (not shown), for example, could be used to secure damper piston 288 along end 286 of damper rod 282.

With continued reference to FIG. 4 and additional reference to FIG. 5, damper element 278 includes a side wall 294 extending peripherally (e.g., circumferentially) about axis AX between longitudinally-spaced ends 296 and 298 such that a longitudinally-extending damping chamber 300 is at least partially formed by side wall 294. A piston wall 302 extends radially outwardly beyond side wall 294 such that a damper piston 304 is formed along end 298 of damper element 278. An end cap 306 is secured across end 296 of side wall 294 and thereby further encloses and defines damping chamber 300. As identified in FIG. 5, end cap 306 includes a passage wall 308 that at least partially defines a rod passage (not numbered) extending through the end cap. Additionally, an outer peripheral edge of end cap 306 can include a securement feature, and end 296 of side wall 294 can include a securement feature that is complimentary to the securement feature of end cap 306. In this manner, the end cap can be secured across the end of the side wall. As one example, a plurality of threads could be disposed along the outer peripheral edge of end cap 306 and a corresponding plurality of threads could be disposed along end 296 of side wall 294 such that a threaded connection 310 can be formed therebetween. While it will be appreciated that other securement features could alternately be used, one benefit of using a threaded connection, such as has been described above, is that the same may facilitate assembly, as will be described in additional detail hereinafter.

As discussed above, damper elements 276 and 278 are operatively interengaged with one another for telescopic extension and compression. In the exemplary arrangement shown, damper piston 288 is disposed within damping chamber 300 and damper rod 282 extends out of damping chamber 300 through the rod passage (not numbered) that is at least partially defined by passage wall 308. As such, end 284 of damper rod 282 is disposed outwardly of damping chamber 300 and can be operatively connected along bead plate 206 in a suitable manner, such as will be described in additional detail hereinafter.

As identified in FIG. 4, damping chamber 300 is separated by damper piston 288 into chamber portions 300A and 300B. In some cases, it may be desirable to maintain chamber portions 300A and 300B in fluidic isolation from one another, such as by including one or more sealing elements (not shown) operatively disposed between damper piston 288 and side wall 294. Additionally, it may be desirable to include one or more sealing elements (not shown) between damper rod 282 and passage wall 308, such that a substantially fluid-tight seal is formed therebetween and such that damping chamber 300 and spring chamber 212 are fluidically isolated from one another through the rod passage. In such case, additional fluid communication ports (not shown) can be selectively provided in one or more of damper piston 288, end cap 306 and/or a central portion 302A of piston wall 302. Such additional fluid communication ports can be sized and configured to generate damping forces during relative movement between damper element 276 and damper element 278.

It will be recognized that significant frictional forces may be generated by the sealing arrangements described above in connection with the interface between damper piston 288 and side wall 294 as well as in connection with the interface between damper rod 282 and passage wall 308. In some cases, it may be desirable to avoid these frictional forces (or for other reasons) by forgoing the use of sealing elements along the interface between damper piston 288 and side wall 294 and/or along the interface between damper rod 282 and passage wall 308. In such case, a friction reducing bushing or wear band can, optionally, be disposed between the damper piston and the side wall and/or between the damper rod and the passage wall. As identified in FIGS. 4 and 5, friction-reducing bushings or wear bands 312 and 314 are respectively disposed between damper piston 288 and side wall 294 and between damper rod 282 and passage wall 308.

In some cases, it may be desirable at least partially control or otherwise influence the relative positioning and/or movement of two or more of damper elements 276, 278 and/or 280. For example, the gas damper assembly can, in some cases, include one or more biasing elements (not shown) disposed within damping chamber 300, which can be operative to act between damper piston 288 and either one or both of end cap 306 and central portion 302A of piston wall 302. One benefit of including one or more of such biasing elements (not shown) within one or both of the chamber portions (e.g., chamber portions 300A and 300B) is that the biasing element can act as a bumper or cushion that impedes direct physical contact between damper piston 288 and a corresponding one of end cap 306 and/or central portion 302A of piston wall 302. Another benefit of including such one or more biasing elements (not shown) within one or both of the chamber portions is that the biasing element(s) can act to establish and/or control the longitudinal position of damper element 278 relative to other components of the gas damper assembly.

As another example, damper assembly 204 can include one or more connections between two or more of damper elements 276, 278 and/or 280 that may be capable of maintaining two damper elements in a substantially fixed position relative to one another up to a predetermined force threshold and capable of permitting relative movement between the two damper elements under conditions in which the predetermined force threshold is exceeded. It will be appreciated that a connection of any suitable type, kind, configuration and/or arrangement could be used between any two of the damper elements. One example of such a connection is shown in FIGS. 3-7 as operatively interconnecting damper elements 276 and 278 in the form of a releasable axial-locking assembly (or a releasable shaft-lock connection) 316 that utilizes a rolling element and detent arrangement. It will be appreciated that any suitable configuration and/or arrangement of features can be used between the two damper elements.

In the exemplary arrangement identified in FIG. 5, damper rod 282 is shown as including a detent in the form of a groove 318 that extends inwardly into the damper rod. It will be appreciated that groove 318 can be of any suitable size, shape and/or configuration, such as, for example, may take the form of an endless annular groove that extends radially inwardly into the damper rod and/or such as may include a curved cross-sectional profile. Additionally, it will be appreciated that the damper rod can have any suitable cross-section of shape and/or configuration, and that the group can have any suitable cross-sectional shape and/or configuration. In some cases, the groove can have a cross-sectional shape that is approximately the same as the cross-sectional shape of the damper rod (e.g., both the damper rod and the groove could have a circular, pentagonal, hexagonal or octagonal shape). In other cases, the groove can have a cross-sectional shape that differs from the cross-sectional shape of the damper rod (e.g., the damper rod can have a polygonal cross-sectional shape and the groove can have a circular cross-sectional shape). It will be appreciated that, in some cases, the inclusion of a non-circular damper rod and corresponding releasable shaft-lock connection can inhibit twisting or rotational actions that may be inherent in certain gas spring and gas damper assemblies.

Connection 316 can also include one or more detent-engaging elements 320 that are biased into engagement with groove 318. It will be appreciated that detent-engaging elements of any suitable size, shape and/or arrangement could be used, such as one or more sphere-shaped elements, one or more cylindrically-shaped elements, one or more convex-shaped (e.g., barrel-shaped) elements, or any combination thereof. In the exemplary arrangement shown, the detent-engaging element(s) are in the form of a plurality of spheres, such as hardened steel or ceramic ball bearings, for example, that are biased into engagement with groove 318. It will be appreciated, however, that detent-engaging elements of other shapes, sizes and/or configurations could alternately be used.

In the arrangement shown in FIGS. 3-7, for example, end cap 306 is identified in FIG. 5 as including an end cap body 322 that includes a surface 324 disposed toward chamber portion 300A and extending in generally transverse relation to axis AX, a surface 326 disposed toward end member 206, and an outer peripheral edge 328. End cap body 322 can also include passage wall 308 and can be dimensioned to receive one or more sealing elements, bushings and/or wear bands, such as wear band 314, for example. It will be appreciated that the one or more detent-engaging elements can be supported on or along a corresponding one of the damper elements in any suitable manner. For example, end cap body 322 can include an element bore 330 that is dimensioned to receive one of detent-engaging elements 320 and is in communication with the passage defined by passage wall 308 such that the detent-engaging element can be biased into and out of the passage and thereby engage a corresponding detent (e.g., groove 318 in damper rod 282).

It will be appreciated that the one or more detent-engaging elements can be biased radially inwardly toward the passage defined by passage wall 308 in any suitable manner and through the use of any arrangement and/or configuration of components. As one example, end cap body 322 can include one or more adjustment bores 332 disposed outwardly from a corresponding one of element bores 330 and accessible from along outer peripheral edge 328. In the exemplary arrangement shown, adjustment bores 332 are disposed in approximate alignment with element bores 330 and can have a greater cross-sectional dimension than the cross-sectional dimension of the element bores.

Connection 316 can also include one or more contacting or retaining elements that abuttingly engage one or more of the detent-engaging elements. It will be appreciated that the one or more contacting or retaining elements can be of any suitable type, kind, configuration and/or construction. As one example, a plunger 334 can be disposed within each of adjustment bores 332, and can abuttingly engage the corresponding detent-engaging element. As identified in FIG. 5, plunger 334 can include an end wall 334A that is approximately planar and oriented transverse to element bore 330 and adjustment bore 332. Plunger 334 can also include an inner side wall 334B that extends axially from along end wall 334A. A biasing element 336, such as a coil spring, for example, can be disposed within the adjustment bores along an opposing side of plunger 334 from the detent-engaging element. In some cases, inner side wall 334B can be dimensioned to form a spring seat (not numbered) or otherwise abuttingly engage the biasing element. Biasing element 336 operates to bias or otherwise urge plunger 334 and detent-engaging element 320 in a radially-inward direction, such as is represented by arrow BIAS in FIG. 5, for example.

Figure 5A:
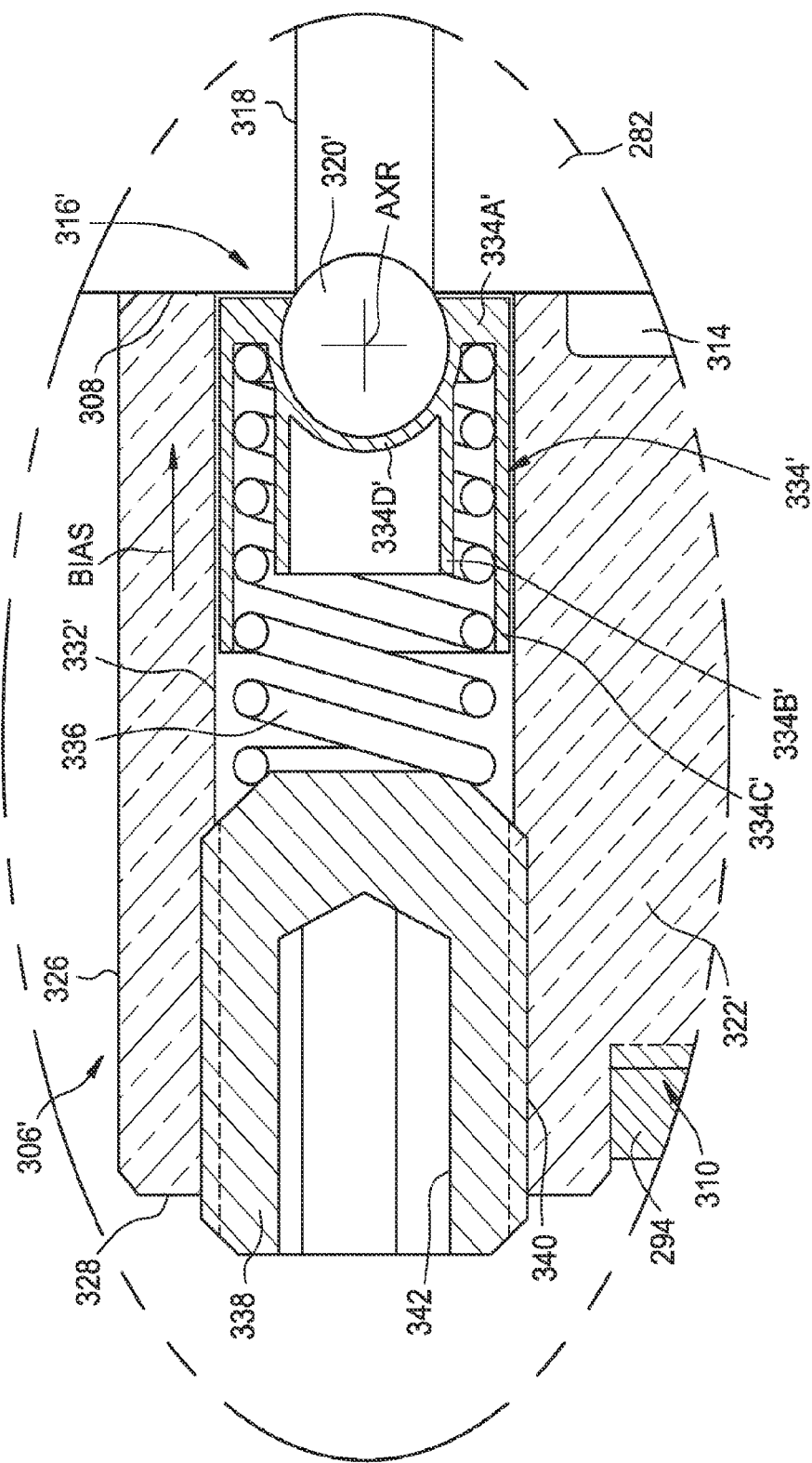
FIG. 5A is an enlarged, cross-sectional view of an alternate embodiment of the portion of the gas spring and gas damper assembly shown in FIG. 5.

As another example, end cap 306' is shown in FIG. 5A as being secured along side wall 294 by way of threaded connection 310, such as has been described above in connection with end cap 306. End cap 306' is shown as being similar to end cap 306 and, as such, common features are represented by a like item numbers. End cap 306' is shown as differing from end cap 306 in that adjustment bores 332' extend through to passage wall 308. As such, element bores 330 are not included on end cap 306'. Additionally, another example of a releasable axial-locking assembly (or a releasable shaft-lock connection) 316' is shown in FIG. 5A as including one or more detent-engaging elements 320' that are biased into engagement with groove 318. Connection 316' can also include one or more contacting or retaining elements that abuttingly engage detent-engaging elements 320'. In the arrangement shown in FIG. 5A, for example, connection 316' includes a plurality of retainers 334' (only one of which is shown) that at least partially receive a detent-engaging element and/or otherwise at least partially retain a detent-engaging element in at least one direction.

Retainers 334' can include an end wall 334A', an inner side wall 334B', and can optionally include an outer side wall 334C'.

Retainers 334' also include a recess (not numbered) dimensioned to at least partially receive one or more of detent-engaging elements 320' for rotation about an axis AXR. It will be appreciated that the recess can be formed in any suitable manner. As one example, end wall 334A' could include a curved or curvilinear wall portion or a V-shaped wall portion that at least partially defines a recess. As another example, retainers 334' can include a recess wall 334D' that at least partially defines a recess, and end wall 334A' can at least partially define an opening (not numbered) through which at least a portion of a detent-engaging element can project. In some cases, outer side wall 334C' can extend peripherally around the recess. In such cases, the one or more detent-engaging elements could be sphere-shaped balls. In other cases, the recess can have an elongated shape with open ends that extend through outer side wall 334C'. In such cases, the one or more detent-engaging elements could be cylindrical or convex-shaped rollers that can be inserted through one of the open ends.

Shaft-lock connection 316 can also include one or more retaining elements 338 that abuttingly engage one or more of biasing elements 336 and provide a wall or surface (not numbered) against which the biasing element(s) can act. In some cases, the one or more retaining elements may be rigidly affixed on or along the end cap body. In other cases, however, the one or more retaining elements may be secured on or along the end cap body such that the position of the wall or surface against which the biasing element(s) act can be varied or otherwise selectively adjusted. As one example, the plurality of retaining elements can each include a securement feature, such as one or more helical threads, for example. Additionally, at least a portion of one or more of the adjustment bores can include a securement feature that is complimentary to the securement feature of the retaining elements, such as one or more helical threads, for example. In this manner, the retaining element(s) can be secured within an outer end of the adjustment bore by way of a threaded connection 340 formed therebetween, and the relative position of each of the retaining elements can be adjusted, such as may be useful to compensate for changes or variations in the spring rate of biasing elements 336, for example. In some cases, an engagement feature 342, such as a hex-shaped recess, for example, can be included to facilitate adjustment of the retaining element(s).

Additionally, it will be appreciated that the biasing elements acting on corresponding ones of the detent-engaging elements will generate a predetermined force threshold. As such, it will be recognized that shaft-lock connection 316 will remain in an engaged condition with the detent-engaging elements operatively engaged with the corresponding detent(s) in the damper rod under longitudinally-acting forces at or below the predetermined force threshold. Additionally, it will be recognized that the biasing forces of biasing elements 336 will be overcome under longitudinally-acting forces having a greater magnitude than the predetermined force threshold and that under such conditions shaft-lock connection 316 will disengage to permit relative movement of damper rod 282 relative to end cap 306. As such, during use in operation, longitudinal forces acting between damper element 276 and damper element 278 and having a magnitude less than that of a predetermined force threshold will be withstood by shaft-lock connection 316, and such forces will generate movement of damper element 278 relative to damper element 280, such as will be discussed in greater detail hereinafter.

It will be appreciated that the predetermined force threshold of shaft-lock connection 316 will correspond with or otherwise have a relation to the spring rate of the one or more biasing elements (e.g., biasing elements 336). As such, it will be recognized that the predetermined force threshold could be altered, varied or otherwise adjusted, such as by using biasing elements having different spring rates, by using different materials or combinations of materials for the biasing elements, by using different sizes, dimensions and/or proportions for the biasing elements, and/or by adjusting the length of the biasing element (e.g., by varying the position of retaining elements 338).

Damper element 280 is shown in FIGS. 3, 4, 6 and 7, and identified in FIGS. 4 and 7, as extending longitudinally between opposing ends 344 and 346 and including an end wall 348 disposed along end 346 and housing wall 350 that is secured to end wall 348 and at least partially defines a damping chamber 352 therebetween. End wall 348 is operatively connected on or along the second end member (e.g., piston 208). As identified in FIG. 4, housing wall 350 is shown as including a side wall portion 354 extending longitudinally from along end wall 348 toward an end wall portion 356 of the housing wall. End wall portion 356 of housing wall 350 includes a passage wall 358 that at least partially defines a damper passage (not numbered) extending therethrough. End wall 348 and housing wall 350 can be operatively connected to one another in any manner suitable for forming a substantially fluid-tight seal therebetween. As one example, a threaded connection (not shown), such as may be similar to threaded connection 310, for example, could be used in conjunction with one or more sealing elements (not shown) to form a substantially fluid-tight seal. As another example, a flowed-material joint 360 could be used.

As discussed above, damper elements 278 and 280 are operatively interengaged with one another for telescopic extension and compression. In the exemplary arrangement shown, a portion of damper element 278 is disposed within damping chamber 352 such that end wall 306 and at least a portion of side wall 294 of damper element 278 are disposed longitudinally-outwardly of damping chamber 352 through the damper passage (not numbered) that is at least partially defined by passage wall 358 within end wall portion 356. As such, end 296 of damper element 278 is disposed outwardly of damping chamber 352 and end 298 of damper element 278 is disposed within damping chamber 352, such that piston wall 302 extends radially-outwardly toward side wall portion 354 of housing wall 350 and separates damping chamber 352 into chamber portions 352A and 352B.

In some cases, it may be desirable to permit fluid communication between chamber portions 352A and 352B, such as by including one or more friction-reducing bushings or wear bands disposed along the interface between side wall 294 and passage wall 358 of end wall portion 356 of housing wall 350 and/or along the interface between piston wall 302 and side wall portion 354 of housing wall 350. In a preferred embodiment, however, chamber portions 352A and 352B are maintained in fluidic isolation from one another, such as by including one or more sealing elements 362 (FIG. 4) operatively disposed between side wall 294 and passage wall 358 of end wall portion 356 of housing wall 350. Additionally, such a preferred arrangement can include one or more sealing elements 364 (FIG. 4) disposed between piston wall 302 and side wall portion 354 of housing wall 350 such that a substantially fluid-tight seal is formed therebetween.

As discussed above, damper elements 278 and 280 are operatively interengaged with one another for telescopic extension and compression. As such, piston wall 302 of damper element 278 moves toward and away from end wall 348 of damper element 280 during operation and use of the gas damper assembly. A bumper or other cushioning element can optionally be disposed within either or both of chamber portions 352A and/or 352B such as may be useful to prevent or at least minimize the possibility of direct physical contact between piston wall 302 of damper element 278 and end wall 358 and/or end wall portion 356 of housing wall 350. As shown in FIGS. 3, 4, 6 and 7, a bumper 366 is disposed within chamber portion 352A and is supported along and secured to end wall portion 356 of housing wall 350. Additionally, a bumper 368 is disposed within chamber portion 352B and is supported along and secured to end wall 348 of damper element 280. It will be appreciated, however, that any other suitable arrangement could alternately be used. For example, one or more of the bumpers could alternately be secured on along piston wall 302 of damper element 278.

As discussed above, sealing elements 362 and 364 are respectively disposed between side wall 294 and passage wall 358 of end wall portion 356 of housing wall 350 and between piston wall 302 and side wall portion 354 of housing wall 350, such that substantially fluid-tight seals are formed therebetween. As such, in some cases, it may be desirable to permit fluid transfer into, out of and/or between chamber portions 352A and/or 352B depending upon the desired performance characteristics of gas damper assembly 204.

For example, the arrangement shown in FIGS. 3, 4, 6 and 7 includes a substantially fluid-tight seal formed between chamber portions 352A and 352B across piston wall 302. In some cases, piston wall 302 may include a passage or port (not shown) extending through the piston wall that would permit fluid communication between chamber portions 352A and 352B through or otherwise across the piston wall. Additionally, or in the alternative, housing wall 350 and/or end wall 348 can include one or more passages or ports extending therethrough that will permit pressurized gas transfer into and out of chamber portion 352A and/or 352B. For example, end wall portion 356 of housing wall 350 can include one or more passages or ports 370 (FIG. 4) extending therethrough that permit pressurized gas transfer into and out of chamber portion 352A of damping chamber 352. Additionally, end wall 348 can include one or more passages or ports 372 (FIG. 6) extending therethrough that permit pressurized gas transfer into and out of chamber portion 352B of damping chamber 352. Furthermore, one or more of the passages or ports provided on or along the walls or wall portions (e.g., end wall 334, and portions 354 and/or 356 of housing wall 350) of damper element 280 can optionally include a flow control valve that restricts pressurized gas flow through the corresponding passage or port to flow in a single direction. For example, end wall portion 356 includes a passage or port 370A (FIG. 4) that extends therethrough. A unidirectional or single direction flow control valve of a suitable type, kind and/or construction is disposed on or along the end wall portion and restricts pressurized gas flow to a single direction. In the exemplary arrangement shown in FIGS. 3-7, a one-way valve 374 (FIG. 4) is fluidically associated with passage 370A and permits pressurized gas transfer into chamber portion 352A through passage 370A while substantially inhibiting pressurized gas transfer out of chamber portion 352A through passage 370A. As such, in the exemplary arrangement shown, pressurized gas transfer out of chamber portion 352A occurs only through the remaining one or more of passages 370.

Gas spring and gas damper assembly 200 is shown in FIG. 3 supported between upper and lower structural components USC and LSC and having an assembly height, which is represented in FIG. 3 by reference dimension AH1, that corresponds to an initial height condition of the gas spring and gas damper assembly. In some cases, such an initial height condition may be referred to as a design height. At such a design height, rolling lobe 262 is disposed approximately at a design position along side wall portion 240 of piston 208. Additionally, damper piston 288 is disposed at a design position along side wall 294 within damping chamber 300 with shaft-lock connection 316 in an engaged condition, such as, for example, in which detent-engaging elements 320 are operatively engaged with groove 318. Under such conditions, piston wall 302 of damper piston 304 is disposed at a design position along side wall portion 354 within damping chamber 352.

As gas spring and gas damper assembly 200 is displaced into a compressed condition, which may be referred to in the art as a jounce condition, bead plate 206 and piston 208 are moved toward one another and may reach a compressed height, which is represented in FIG. 6 by reference dimension AH2, that is less than design height AH1. As bead plate 206 and piston 208 are displaced toward one another, damper rod 282 and damper piston 288 of damper element 276 are also displaced toward piston 208. Initially, the longitudinal forces acting between damper elements 276 and 278 will likely be insufficient overcome the predetermined force threshold of shaft-lock connection 316, and the longitudinal forces acting on damper element 276 are transferred or otherwise communicated to damper element 278. In which case, damper element 278 would compress the pressurized gas contained within chamber portion 352B and urge a portion of the pressurized gas to flow out of the chamber portion through passages 372 in end wall 348 and into piston chamber 268. It will be recognized that upon sizing and configuring passages 372 such that an appropriate total orifice area (e.g., total cross-sectional area for the active passages) for a given application is provided, such a flow of pressurized gas through passages 372 can operate to dissipate a portion of the energy acting on assembly 200 and thereby provide a damping action thereto.

As damper element 278 is displaced toward end wall 348, damper piston 304 will contact bumper 368. Bumper 368 may also operate as a biasing element that includes a spring rate and that will deflect upon the application of a sufficiently-high longitudinal force thereto. Upon contacting bumper 368 with such a sufficiently-high force, damper piston 304 of damper element 278 will continue to urge pressurized gas through passages 372 and will also compress bumper 368, such as is shown in FIG. 6, for example. In some cases, bumper 368 may be compressed or otherwise deformed by an amount sufficient to fluidically isolate passages 372 from chamber portion 352B and thereby prevent further flow of pressurized gas through passages 372. In other cases, however, bumper 368 may be configured such that passages 372 remain in fluid communication with chamber portion 352B even at the maximum deformation of bumper 368.

Additionally, upon contacting bumper 368 or at some point earlier thereto or occurring thereafter, the longitudinal force acting between damper element 276 and 278 may exceed the predetermined force threshold of shaft-lock connection 316 and may result in the shaft-lock connection releasing damper rod 282 from engagement. In such case, damper piston 288 is permitted to translate along side wall 294 in a direction toward piston wall 302.

Furthermore, it will be recognized that as assembly 200 is compressed, the gas pressure within spring chamber 212 and piston chamber 268 increases, at least temporarily. It has been recognized that gas damping has a relationship to the magnitude of the difference between the pressure of the gas within the damping chamber (e.g., chamber portion 352B) and the pressure of the gas into which the gas from the damping chamber flows (e.g., piston chamber 268). Thus, increasing the pressure within the damping chamber (e.g., chamber portion 352B) and/or decreasing the pressure of the surrounding gas into which the gas from the damping chamber flows (e.g., piston chamber 268) can result in improved damping performance.

As described above, end wall portion 354 of housing wall 350 includes one or more passages 370 extending therethrough in fluid communication with chamber portion 352A of damping chamber 352. As damper piston 304 of damper element 278 is displaced toward end wall 348 of damper element 280, the volume of chamber portion 352A increases, which may initially result in a reduced pressure level within the chamber portion. As discussed above, however, the pressure level within spring chamber 212 and piston chamber 268 is increasing at this same time. As such, a portion of the pressurized gas within the spring and piston chambers will flow through passages 370 and into chamber portion 352A, upon sizing and configuring passages 370 such that an appropriate total orifice area (e.g., total cross-sectional area for the active passages) for a given application is used. Additionally, one or more of passages 370, such as passage 370A, for example, can be operatively associated with a one-way flow control device, such as valve 374, for example, that will permit additional pressurized gas transfer into chamber portion 352A while permitting an appropriate total orifice area to be used for damping purposed during displacement of the assembly in the opposing direction (i.e., during extension).

One benefit of permitting pressurized gas from the spring and piston chambers to flow into chamber portion 352A is that an overall reduction in the pressure within spring chamber 212 and piston chamber 268 can be achieved. And, as discussed above, improved damping performance can result from increasing the differential pressure between the gas within the damping chamber (e.g., chamber portion 352B) and the pressure of the gas into which the gas from the damping chamber flows (e.g., piston chamber 268). Another benefit of permitting pressurized gas from the spring and piston chambers to flow into chamber portion 352A is that the gas pressure within chamber portion 352A is at least temporarily increased. As will be discussed in greater detail hereinafter, such an increased pressure level can provide a further increased pressure differential between the gas within chamber portion 352A and the gas into which the gas from chamber portion 352A will flow during extension.

As gas spring and gas damper assembly 200 is displaced into an extended condition, which may be referred to in the art as a rebound condition, bead plate 206 and piston 208 are moved away one another and may reach an extended height, which is represented in FIG. 7 by reference dimension AH3, that is greater than design height AH1. As bead plate 206 and piston 208 are displaced away from one another, damper rod 282 and damper piston 288 of damper element 276 are also displaced away from piston 208. In some cases, a shoulder wall 282A (FIGS. 4 and 7) can be formed on or along damper rod 282, such as may be suitable for abuttingly engaging surface 324 of end cap body 322, for example. Initially, the longitudinal forces acting between damper elements 276 and 278 will likely be insufficient overcome the predetermined force threshold of shaft-lock connection 316, and the longitudinal forces acting on damper element 276 are transferred or otherwise communicated to damper element 278. In which case, damper element 278 would compress the pressurized gas contained within chamber portion 352A and urge a portion of the pressurized gas to flow out of the chamber portion through passages 370 in end wall portion 356 and into piston chamber 268. It will be appreciated that valve 374 will cause passage 370A to remain fluidically isolated from chamber portion 352A, under such conditions, such that pressurized gas does not flow out of the chamber portion through passage 370A.

It will be appreciated that pressurized gas within chamber portion 352A is capable of flowing through passages at a given rate depending upon various factors, such as the total orifice area of passages 370, for example. As such, continued extension of assembly 200 can compress the gas within chamber portion 352A and thereby increase the pressure level thereof. As damper element 278 is displaced toward end wall portion 356, damper piston 304 will contact bumper 366. Bumper 366 may also operate as a biasing element that includes a spring rate and that will deflect upon the application of a sufficiently-high longitudinal force thereto. Upon contacting bumper 366 or at some point earlier thereto or occurring thereafter, the longitudinal force acting between damper element 276 and 278 may exceed the predetermined force threshold of shaft-lock connection 316 and may result in the shaft-lock connection releasing damper rod 282 from engagement. In such case, damper piston 288 is permitted to translate along side wall 294 in a direction toward end cap 306.

Additionally, it will be recognized that as assembly 200 is extended, the gas pressure within spring chamber 212 and piston chamber 268 decreases, at least temporarily. At that same time, the gas pressure within chamber portion 352A is increasing, such as has been described above, for example. As a result, an increased differential pressure between the gas within the damping chamber (e.g., chamber portion 352A) and the pressure of the gas into which the gas from the damping chamber flows (e.g., spring chamber 212) may be achieved, which may provide increased damping performance. Additionally, as described above, valve 374 can act as a charging valve that permits an increased volume of pressurized gas to transfer into chamber portion 352A during compression, which can result in an increased overall pressure level within the chamber portion. Upon transitioning to extension, this increased overall pressure level represents the initial pressure level of the pressurized gas within chamber portion 352A as the chamber portion begins to undergo compression, as described above.

Gas spring and gas damper assembly can optionally include any number of one or more additional elements, features and/or components. For example, a distance sensing device can be operatively connected on or along one of the components of the gas spring assembly or the gas damper assembly. As shown in FIGS. 3 and 4, for example, a height sensor 376 can be operatively secured on or along end wall portion 356 of housing wall 350 and can transmit suitable electromagnetic or ultrasonic waves WVS in an approximately longitudinal direction toward bead plate 206. It will be appreciated, however, that other arrangements could alternately be used.

It will be recognized that the foregoing discussion of FIGS. 3-6 regarding the displacement of gas spring and gas damper assembly 200 from a design height to a compressed height and an extended height included movement in a substantially longitudinal direction. In many applications, such as vehicle applications, for example, conventional gas spring assemblies are often displaced such that the first or upper end member (e.g., bead plate 206) and the second or lower end member (e.g., piston 208) are disposed at an angle relative to one another. In some cases, the angle may change (e.g., increase or decrease) as the end members are displaced toward and away from one another. It will be appreciated that conventional gas spring assemblies can typically accommodate such angular misalignments. In some cases, however, the gas spring assembly will include an internally mounted device, such as a rebound limiter or a spring aid, for example, that can limit the amount of angular misalignment that can be accommodated.

For the subject matter of the present disclosure to be capable of broad use in a wide variety of applications, it is desirable for gas spring assembly 202 to be capable of operation in applications and operating conditions that can result in relatively high misalignment conditions without interfering with the operation and/or seal integrity of gas damper assembly 204. As such, end 274 of gas damper assembly 204 can be operatively connected with piston 208 by way of a high-articulation misalignment mount 378 (FIG. 3) that is capable of freely compliant (e.g., non-resilient) articulation, such as is shown in FIGS. 3, 4, 6 and 7. Additionally, end 272 of gas damper assembly 204 can be operatively connected with bead plate 206 by way of a low-profile misalignment mount 380 (FIG. 3), such as is shown in FIGS. 3, 6 and 7. It will be appreciated, however, that mounts 378 and 380 are optional and that either one or both of mounts 378 and 380 can, optionally, be included on or used in connection with gas spring and gas damper assembly 200.

Figure 8:
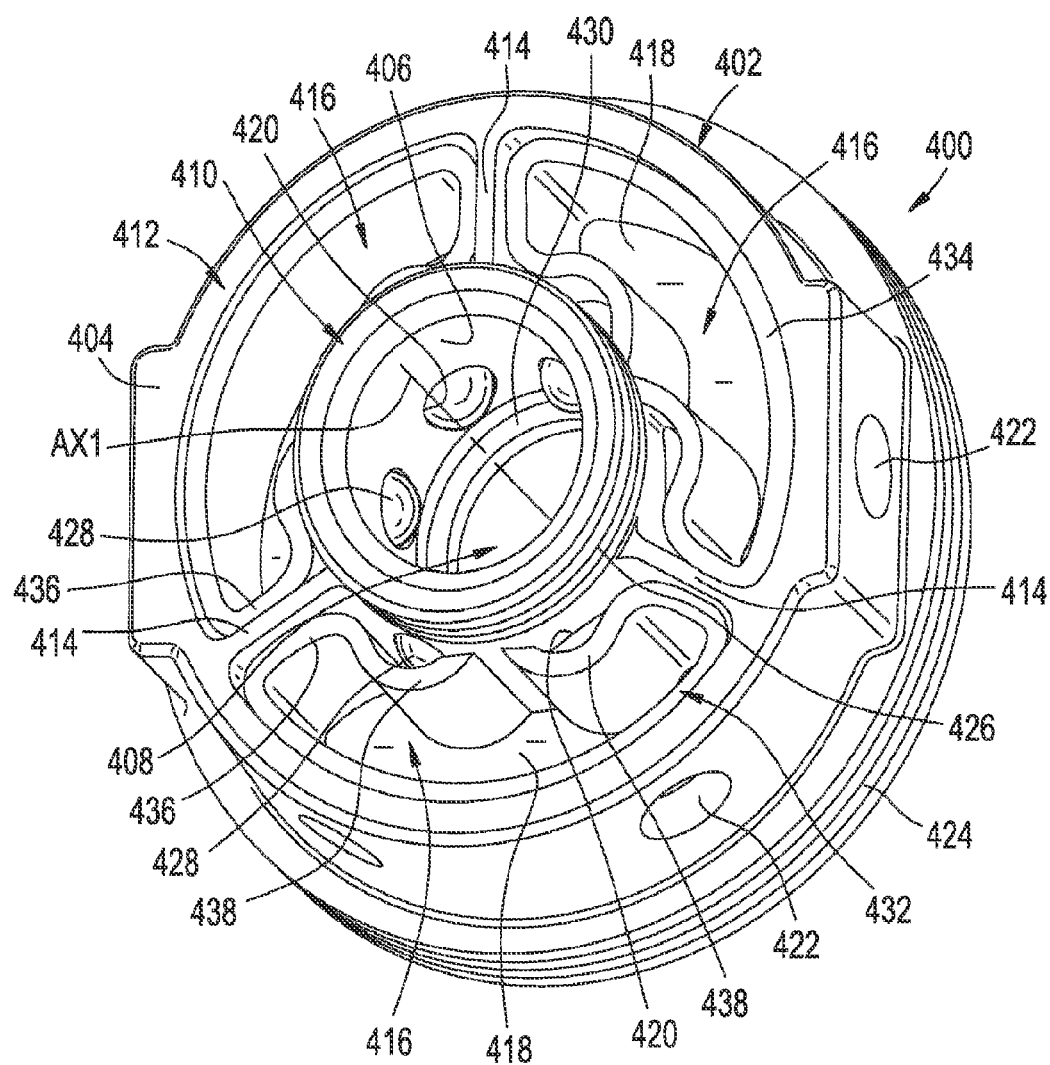
FIG. 8 is a top perspective view of an alternate embodiment of the end caps shown in FIGS. 3-7.

FIG. 8 illustrates an alternate embodiment of an end cap 400 suitable for use in connection with a gas damper assembly, such as an alternative to end cap 306 of damper element 278 of gas damper assembly 204, for example. End cap 400 includes an end cap body 402 with a longitudinally-extending axis AX1, a surface 404 that extends transverse to axis AX1 and a surface (not shown) disposed opposite surface 404. A passage wall 406 extends longitudinally along end cap body 402 and at least partially defines a rod passage 408 extending through end cap body 402. End cap body 402 also includes at least one side wall. In the exemplary arrangement shown in FIG. 8, end cap body 402 includes an inner side wall 410 and an outer side wall 412 that is disposed in radially-outwardly spaced relation to the inner side wall such that at least one cavity is formed therebetween, such as may be accessible from along surface 404, for example. In some cases, one or more connector walls 414 can extend between and operatively interconnect the inner and outer side walls. In such case, a plurality of cavities 416 can be formed between inner and outer side walls 410 and 412. In some cases, the cavities can extend through the end cap body. In other cases, however, cavities 416 can include a bottom wall 418.

End cap body 402 also includes one or more element bores 420 that extend through inner side wall 410. In the arrangement in FIG. 8, a plurality of element bores are shown as being disposed transverse to axis AX1 and extending radially outwardly through the inner side wall such that the element bores are in communication with rod passage 408. In some cases, one or more outer bores 422 can, optionally, extend through outer side wall 412 and can, if provided, be disposed in approximate alignment with element bores 420, such as may be beneficial for manufacturing purposes, for example.

It will be appreciated that end cap 400 can be secured on or along an associated component, such as side wall 294 of damper element 278, for example, in any suitable manner. As one example, end cap body 402 can include one or more helical threads 424 that extend peripherally about an outer peripheral surface (not numbered) of the end cap body. Additionally, end cap body 402 can, optionally, include a securement feature on or along inner side wall 410, such as may be useful for securing a cover (not shown) across the open end of cavities 416, for example. In the exemplary arrangement shown in FIG. 8, for example, one or more helical threads 426 can be provided along an outer surface (not numbered) of the inner side wall.

End cap 400 can also include one or more detent-engaging elements 428, such as hardened steel or ceramic spheres, for example, disposed within element bores 420 and can be biased into engagement with an associated detent feature of a damper rod, such as groove 318 of damper rod 282, for example. It will be appreciated, however, that detent-engaging elements of other shapes, sizes and/or configurations could alternately be used. End cap 400 can also include one or more sealing elements, bushings and/or wear bands. In the exemplary arrangement shown in FIG. 8, a wear band 430 is supported on or along passage wall 406.

Additionally, it will be appreciated that detent-engaging elements 420 can be biased into engagement with the associated detent (e.g., groove 318 of damper rod 282) in any suitable manner. As one example, one or more biasing elements can be supported on or along end cap body 402 and can operatively engage one or more of the detent-engaging elements. In the arrangement shown in FIG. 8, for example, a plurality of biasing elements 432 are supported on end cap body 402 with at least one biasing element disposed within one of cavities 416. Biasing elements 432 are shown as being formed from an elongated element wall (not numbered) that has a somewhat C-shaped configuration with a base wall portion 434, side wall portions 436 and element engaging portions 438. Base wall portion 434 is disposed in abutting engagement with an inside surface (not numbered) of outer side wall 412. Side wall portions 436 extend from along base wall portion 434 and are disposed adjacent corresponding connector walls 414. Element engaging portions 438 form free ends of the elongated element wall and have a curvilinear shape that abuttingly engages a corresponding number of one or more detent-engaging elements 428. In a preferred arrangement, element engaging portions 438 are disposed in spaced relation from the outer surface (not numbered) of inner side wall 410 such that the detent-engaging elements are biased in a radially inward direction due at least in part to a biasing force from the deflection of element engaging portions 438.

Figure 9:
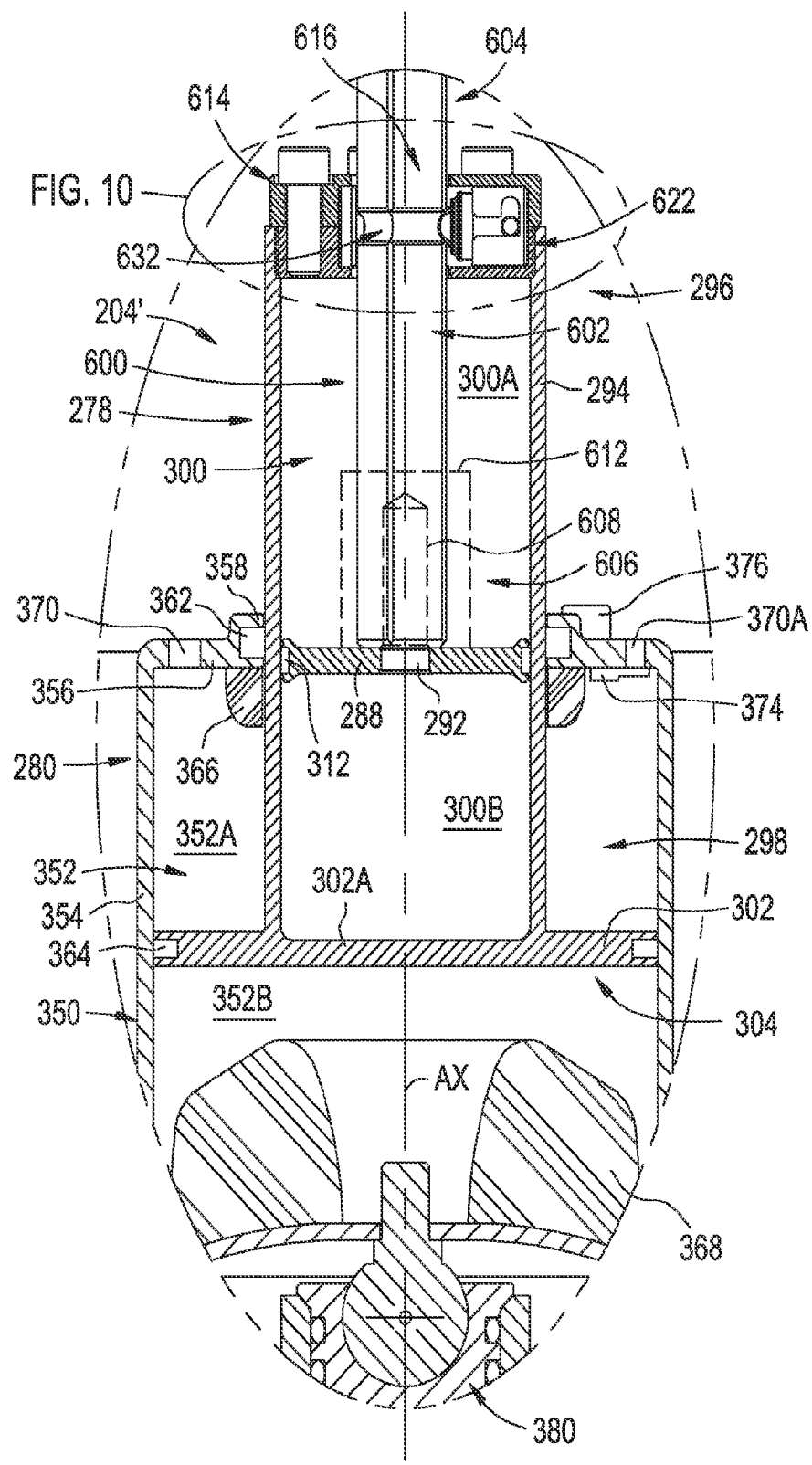
FIG. 9 is an enlarged, cross-sectional view of an alternate embodiment of the portion of the gas spring and gas damper assembly in FIG. 4.
Figure 10:
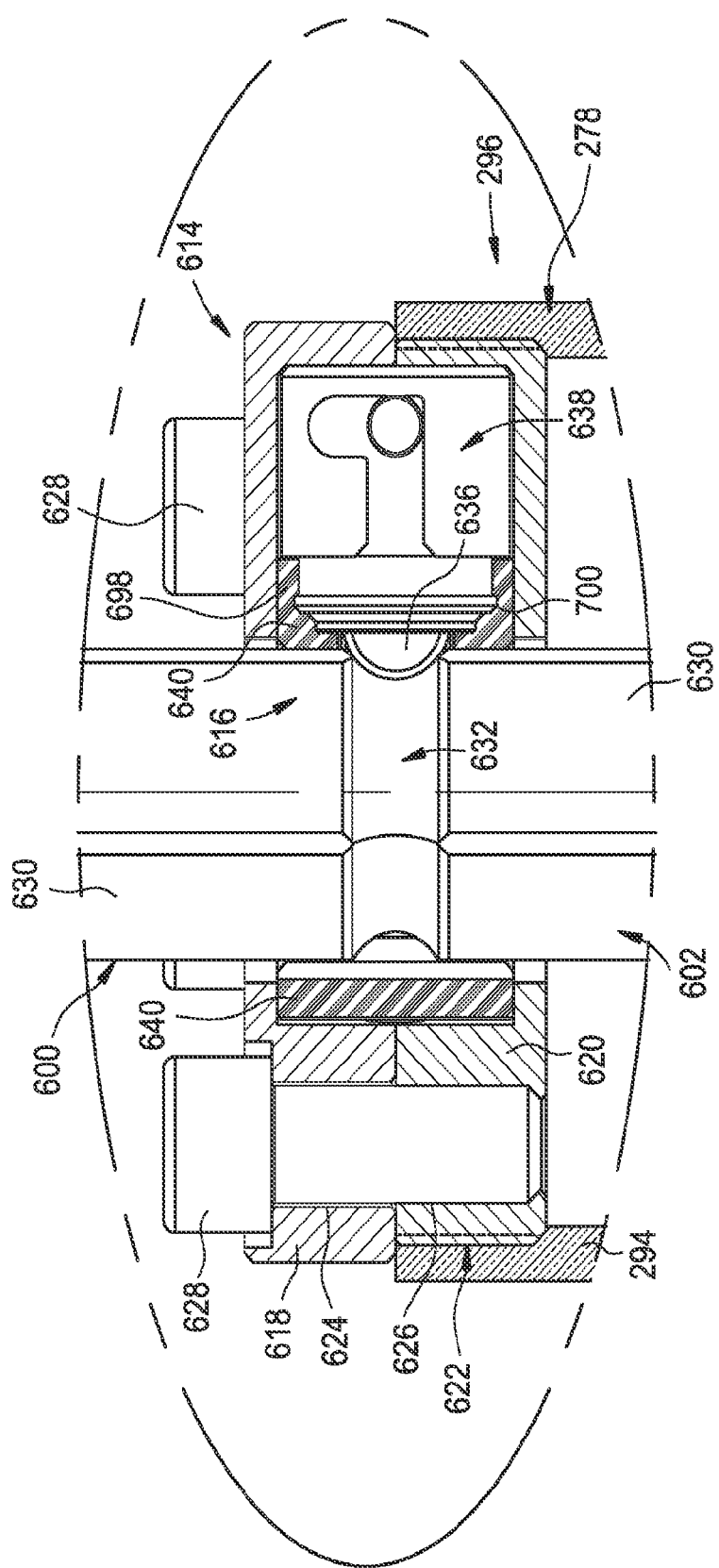
FIG. 10 is an enlarged, cross-sectional view of the portion of the gas spring and gas damper assembly identified as Detail 10 in FIG. 9.

FIGS. 9 and 10 illustrate an alternate embodiment of a damper element 600, such as may be operatively associated with damper element 278 to form a gas damper assembly 204' that can be secured within gas spring assembly 202, such as has been described above in connection with gas damper assembly 204, for example. It will be appreciated that damper element 600 may be similar in construction and/or operation to damper element 276 and that gas damper assembly 204' may be similar in overall construction and operation to gas damper assembly 204, both of which have been described above in detail in connection with gas spring and gas damper assembly 200, for example. As such, it will be recognized that common elements are identified in FIGS. 9 and 10 by like reference numbers.

As identified in FIG. 9, damper element 600 includes a damper rod 602 that extends longitudinally from an end 604 to an end 606. Damper piston 288 can be disposed along end 606 of damper rod 602 and can be attached or otherwise connected thereto in any suitable manner. For example, damper piston 288 could be integrally formed with damper rod 602. As another example, end 606 of damper rod 602 could include a securement feature, such as a threaded passage 608, for example. Damper piston 288 could include hole 292 extending therethrough such that a securement device, such as a threaded fastener (not shown), for example, could be used to secure damper piston 288 along end 606 of damper rod 602. Additionally, damper rod 602 can include a securement feature, such as a threaded passage 610, for example, disposed along end 604 and suitable for operative connection with misalignment mount 378 or another suitable feature or component. In some cases, damper rod 602 can include a shoulder wall 612 (FIG. 9) formed along end 606, such as may be suitable for inhibiting direct contact between the damper piston and another component (e.g., an end cap or end wall of damper element 278).

FIGS. 9-12 also illustrate alternate embodiment of an end cap 614 that is suitable for use in connection with a gas damper assembly, such as an alternative to end cap 306, 306' and/or 400 of damper element 278 of gas damper assembly 204, for example. FIGS. 9-12 further illustrate another example of a releasable axial-locking assembly (or a releasable shaft-lock connection) 616 that may be capable of maintaining two damper elements (e.g., damper elements 600 and 278) in a substantially fixed position relative to one another up to a predetermined force threshold and capable of permitting relative movement between the two damper elements under conditions in which the predetermined force threshold is exceeded. In some cases, releasable shaft-lock connection 616 can include a rolling element and detent arrangement, such as has been described above in connection with releasable shaft-lock connection 316, for example. It will be appreciated, however, that other configurations and/or arrangements could alternately be used.

It will be appreciated that end cap 614 can be assembled or otherwise formed from any suitable material or combination of materials, and can include any suitable number of one or more components. In the exemplary arrangement shown in FIGS. 9-12, for example, end cap 614 is shown as taking the form of an end cap assembly that includes cap sections 618 and 620. Additionally, it will be appreciated that end cap 614 can be secured on or along side wall 294 of damper element 278 in any suitable manner. For example, an outer peripheral edge of cap section 620 can include a securement feature, and end 296 of side wall 294 can include a securement feature that is complimentary to the securement feature of cap 620. In this manner, at least a portion of the end cap can be secured across the end of the side wall. In some cases, for example, a plurality of threads could be disposed along the outer peripheral edge of cap section 620 and a corresponding plurality of threads could be disposed along end 296 of side wall 294 such that a threaded connection 622 can be formed therebetween. While it will be appreciated that other securement features could alternately be used, one benefit of using a threaded connection, such as has been described above, is that the same may facilitate assembly.

It will be appreciated, that cap sections 618 and 620 can be secured together or otherwise attached to one another in any suitable manner, such as by way of one or more threaded connections, for example. In the arrangement in FIGS. 9-12, for example, cap section 618 is shown as including a plurality of clearance holes 624 that extend through and are spaced circumferentially from one another around the cap section. Additionally, cap section 620 is shown as including a plurality of threaded holes 626 that extend into the cap section and are spaced from one another in approximate alignment with clearance holes 624. A plurality of threaded fasteners 628 can extend through clearance holes 624 and engage threaded holes 626 to secure cap sections 618 and 620 to one another on or along end 296 of side wall 294.

As described above, releasable shaft-lock connection 616 is preferably capable of maintaining two damper elements (e.g., damper elements 600 and 278) in a substantially fixed position relative to one another up to a predetermined force threshold and capable of permitting relative movement between the two damper elements under conditions in which the predetermined force threshold is exceeded. As indicated above, a connection in accordance with the subject matter of the present disclosure can be constructed in any suitable manner and through the use of any suitable combination of features and/or components. Additionally, it will be appreciated that such features and/or components can be attached, supported or otherwise disposed of on or along one or more of the damper elements in any suitable manner. As described above, connection 616 preferably utilizes a rolling element and detent arrangement, such as, for example, may be formed between a groove that extends inwardly into damper rod 602 and one or more detent-engaging elements that are biased into engagement with the groove.

As illustrated in FIGS. 9, 10 and 13-15, damper rod 602 includes a plurality of side surfaces 630 that extend lengthwise along the damper rod between ends 604 and 606. As such, damper rod 602 is shown as having a generally polygonal cross-sectional shape. A groove 632 extends into the damper rod from along side surfaces 630. As such, groove 632 can have a generally polygonal cross-sectional shape as well, such as is shown in FIG. 15 as having a number of groove segments 634 corresponding to the number of side surfaces 630 of the damper rod. It will be appreciated, however, that other configurations and/or arrangements could alternately be used.

It will be appreciated that the one or more detent-engaging elements can be supported on or along end cap 614 in any suitable manner. For example, the end cap could take the form of a single, unitary component and the one or more detent-engaging elements could be received within the end cap, such as, for example, has been described above in connection with end caps 306, 306' and/or 400 as well as in connection with shaft-lock connection 316. As another example, the one or more detent-engaging elements could be captured between cap sections 618 and 620 of end cap 614. In the arrangement shown in FIGS. 9-12, a plurality of detent-engaging elements 636 are at least partially disposed within and supported by a plurality of cartridge assemblies 638, which are shown as being captured between cap sections 618 and 620 of end cap 614. It will be appreciated, however, that other configurations and/or arrangements could alternately be used.

Additionally, it will be recognized that damper rod 602 is displaced relative to end cap 614 during certain conditions of use, such as have been described in detail in connection with FIGS. 6 and 7, for example. In some cases, one or more guide elements and/or wear surfaces can, optionally, be operatively disposed between the end cap and the damper rod. It will be appreciated that such one or more guide elements and/or wear surface can be provided in any suitable manner. As one example, either or both of cap sections 618 and 620 could be formed from a material or otherwise include an element, feature or surface suitable for slidingly engaging the damper rod. As another example, a wear band and/or guide bushing 640 can be supported on or along end cap 614 in a suitable manner. In some cases, the wear band can be captured between cap sections 618 and 620 of end cap 614, such as is illustrated in FIGS. 9, 10 and 12, for example. In such cases, cartridge assemblies 638 can be independently captured between the cap sections of the end cap. Or, alternately, cartridge assemblies 638 can be supported on or along wear band 640. In such case, the cartridge assemblies and the wear band can form an assembly that is captured between the cap sections of the end cap.

Figure 16:
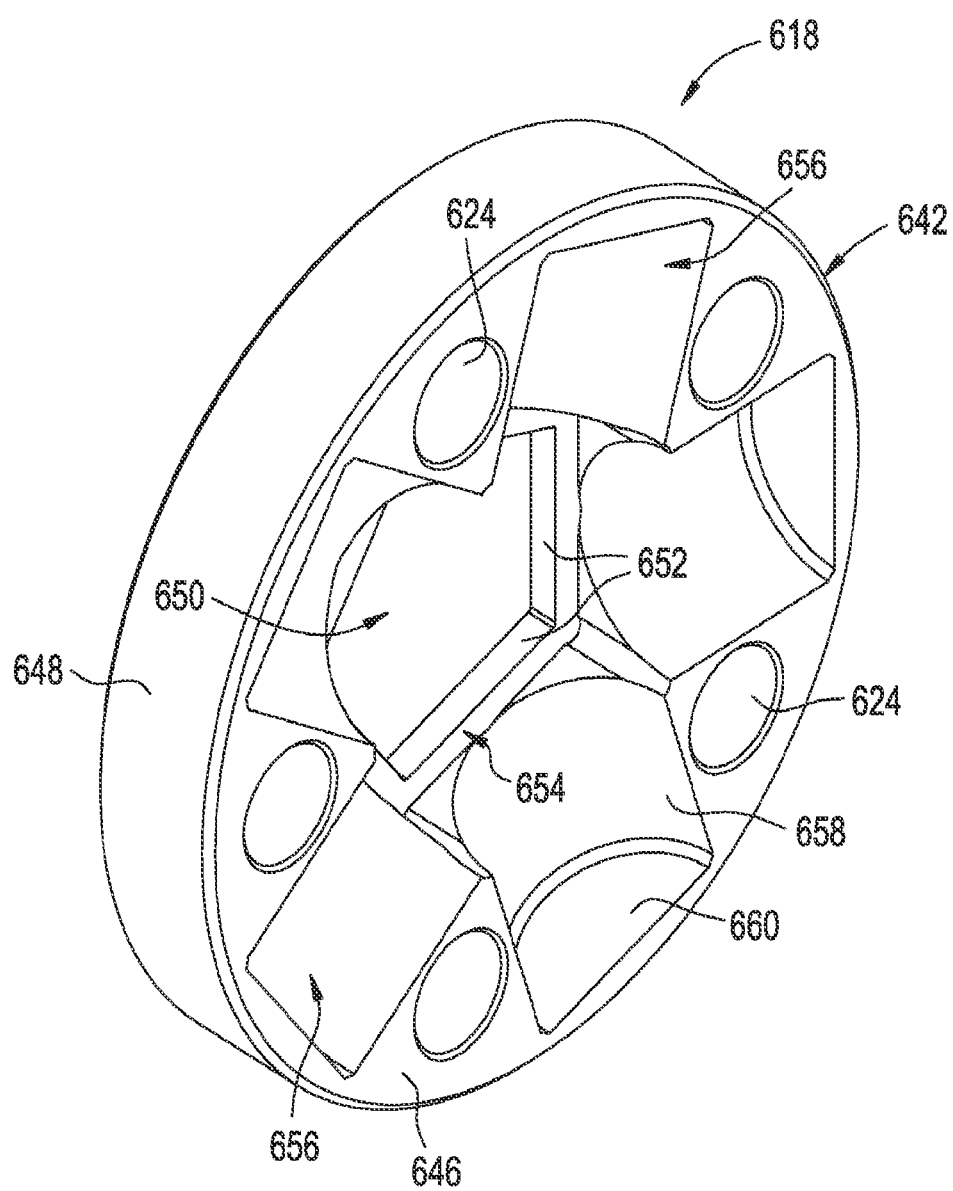
FIG. 16 is a perspective view of one example of a cap section of an end cap.
Figure 17:
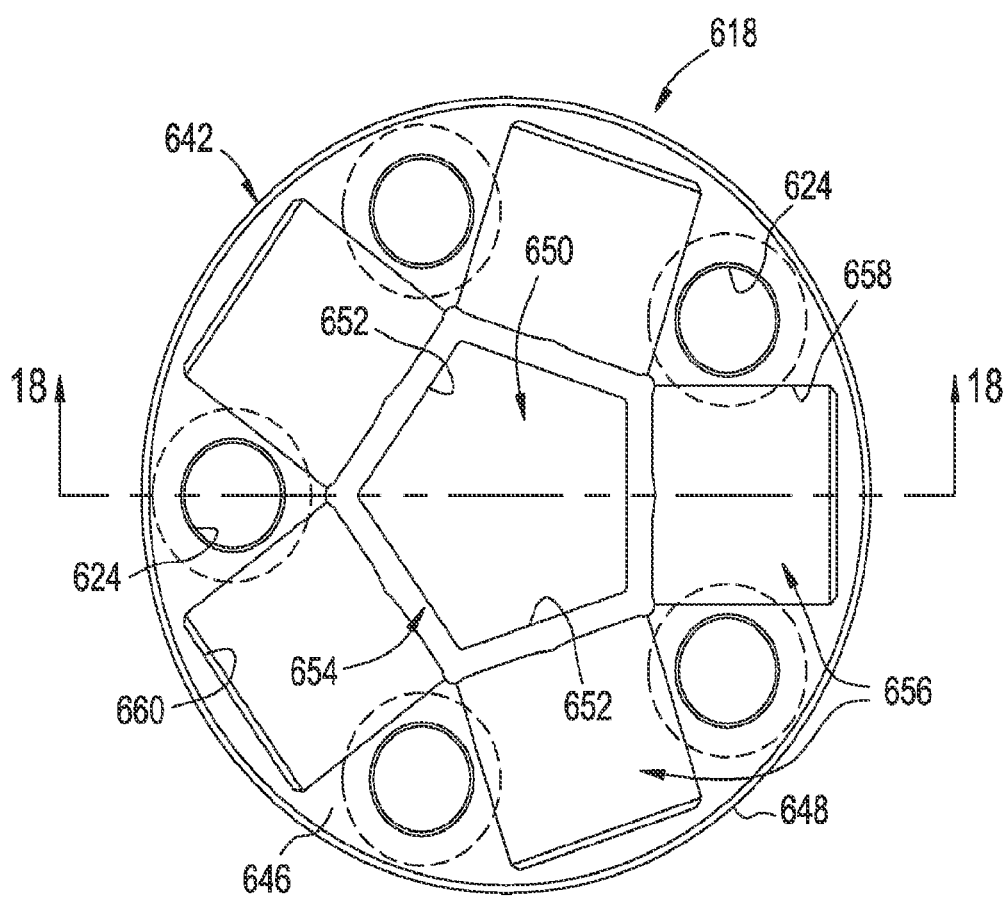
FIG. 17 is a rear plan view of the cap section shown in FIG. 16.
Figure 18:
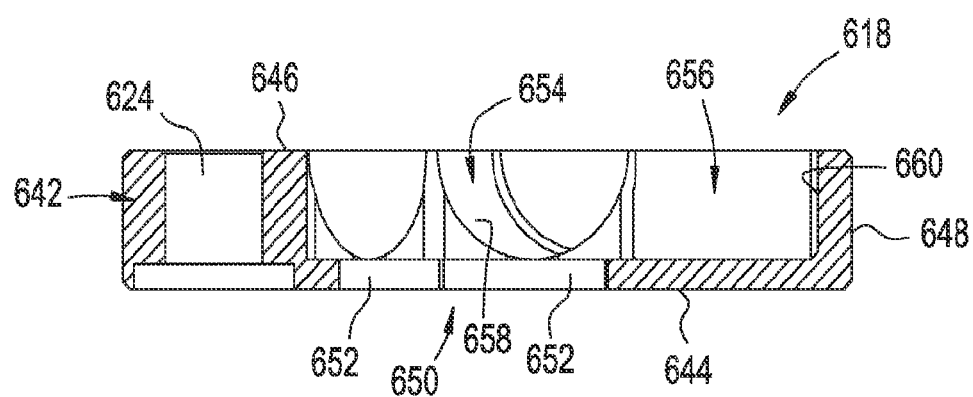
FIG. 18 is a cross-sectional side view of the cap section shown in FIGS. 16 and 17 taken from along line 18-18 in FIG. 17.

Cap section 618 is shown in FIGS. 16-18 as including a body 642 having opposing surfaces 644 and 646 with an outer peripheral side surface 648 extending axially therebetween. Plurality of clearance holes 624 extend through body 642 and are disposed in spaced relation to one another along the periphery of the cap section. A rod passage 650 extends through body 642 and has a suitable cross-sectional size and shape to receive damper rod 602. In a preferred arrangement, rod passage 650 will be at least partially formed from a plurality of passage surfaces 652 that correspond to the number of side surfaces 630 of the damper rod. Additionally, a central recess 654 extends into body 642 from along surface 646 and is dimensioned to at least partially receive wear band 640. A plurality of outer recesses 656 are disposed outwardly from central recess 654 and are dimensioned to receive one of cartridge assemblies 638. In some cases, the outer recesses can be at least partially defined by a recess surface 658 and/or an end surface 660. In some cases, an assembly that is at least partially formed by wear band 640 and a plurality of cartridge assemblies 638 can be at least partially received within cap section 618.

Figure 19:
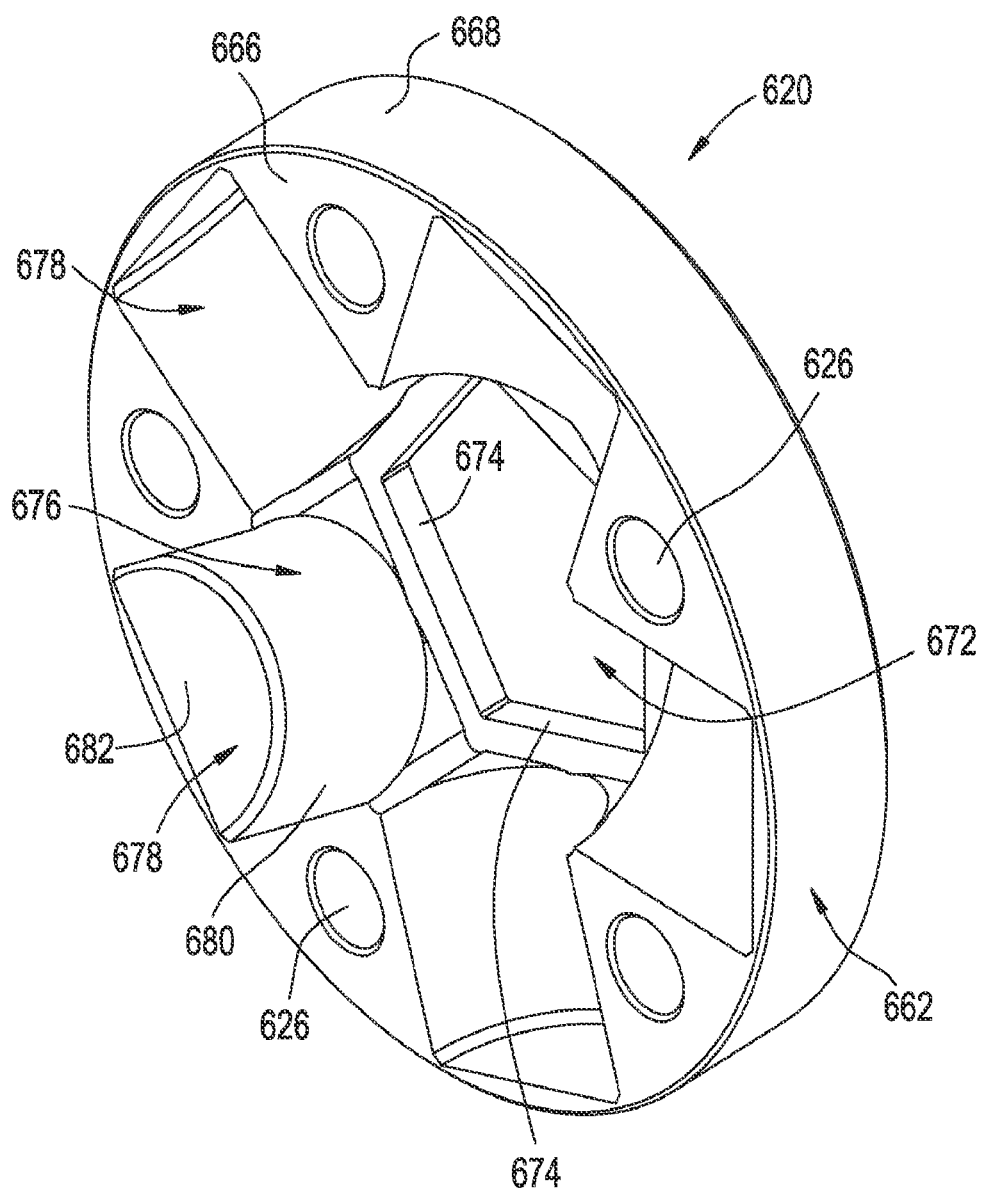
FIG. 19 is a perspective view of another example of a cap section of an end cap.
Figure 20:
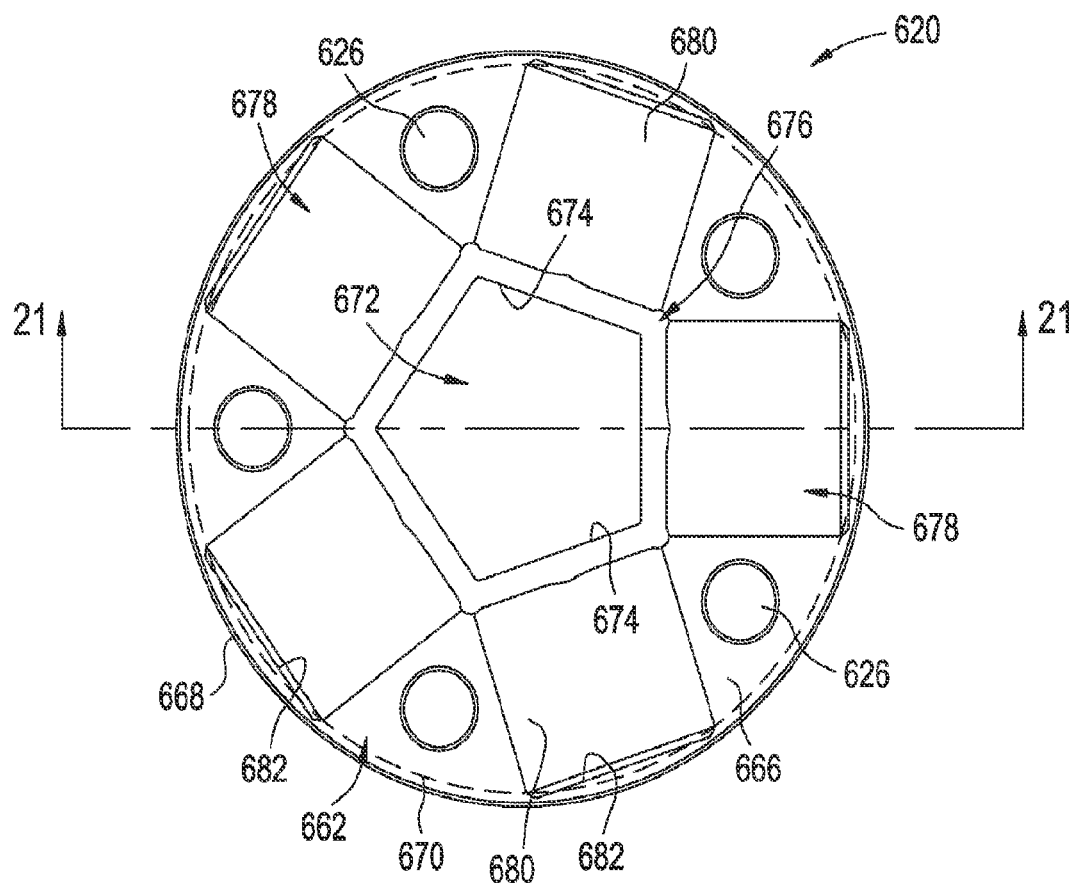
FIG. 20 is a front plan view of the cap section shown in FIG. 19.
Figure 21:
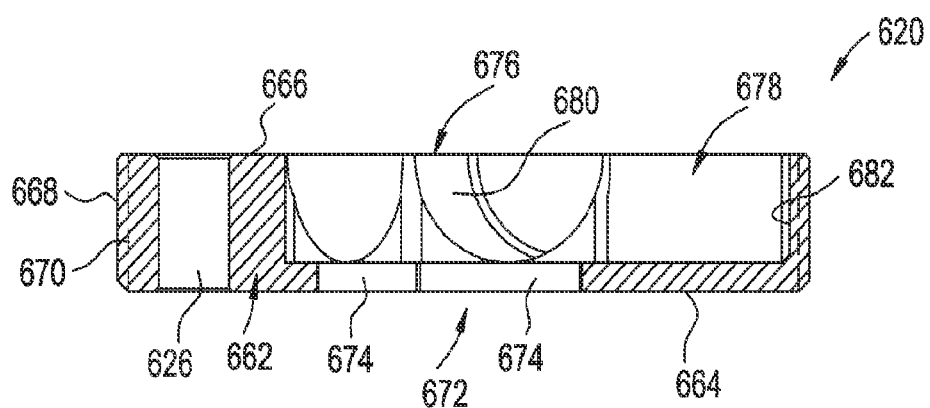
FIG. 21 is a cross-sectional side view of the cap section shown in FIGS. 19 and 20 taken from along line 21-21 in FIG. 20.

Cap section 620 is shown in FIGS. 19-21 as including a body 662 having opposing surfaces 664 and 666 with an outer peripheral side surface 668 extending axially therebetween. In some cases, one or more helical threads 670 can be provided on or along outer peripheral side surface 668, such as may be suitable for forming threaded connection 622, for example. Plurality of threaded holes 626 extend through body 662 and are disposed in spaced relation to one another along the periphery of the cap section. A rod passage 672 extends through body 662 and has a suitable cross-sectional size and shape to receive damper rod 602. In a preferred arrangement, rod passage 672 will be at least partially formed from a plurality of passage surfaces 674 that correspond to the number of side surfaces 630 of the damper rod. Additionally, a central recess 676 extends into body 662 from along surface 666 and is dimensioned to at least partially receive wear band 640. A plurality of outer recesses 678 are disposed outwardly from central recess 676 and are dimensioned to receive one of cartridge assemblies 638. In some cases, the outer recesses can be at least partially defined by a recess surface 680 and/or an end surface 682. In some cases, an assembly that is at least partially formed by wear band 640 and a plurality of cartridge assemblies 638 can be at least partially received within cap section 620.

In some cases, rod passages 650 and 672 can be substantially similar in size and shape. In a preferred arrangement, cap sections 618 and 620 will together substantially encapsulate wear band 640 and plurality of cartridge assemblies 638. It will be appreciated that, in some cases, central recesses 654 and 676 can be substantially similar in size and/or shape. Furthermore, in some cases, outer recesses 656 and 678 can be substantially similar in size and/or shape.

Figure 22:
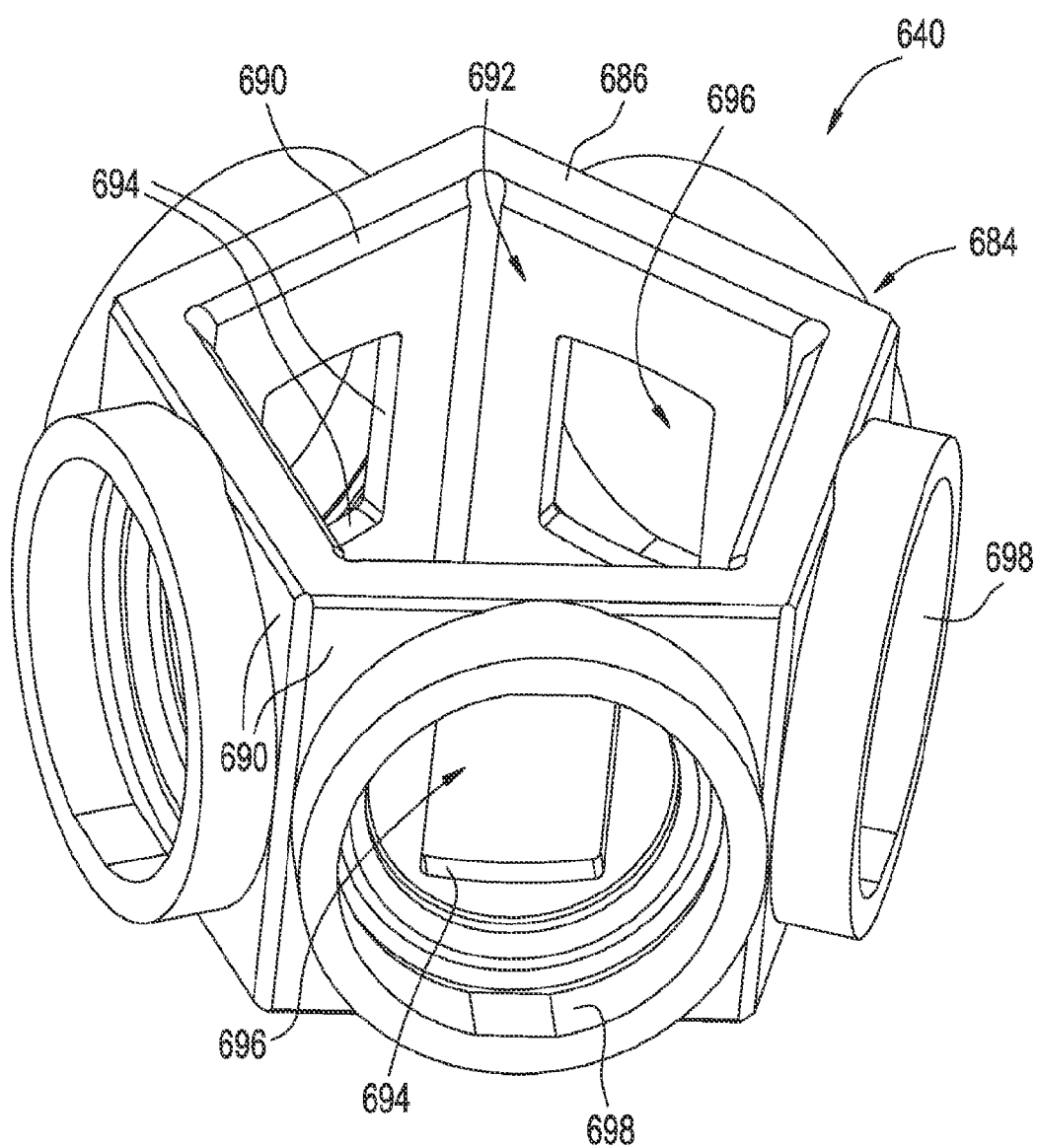
FIG. 22 is a perspective view of one example of a wear band.
Figure 23:
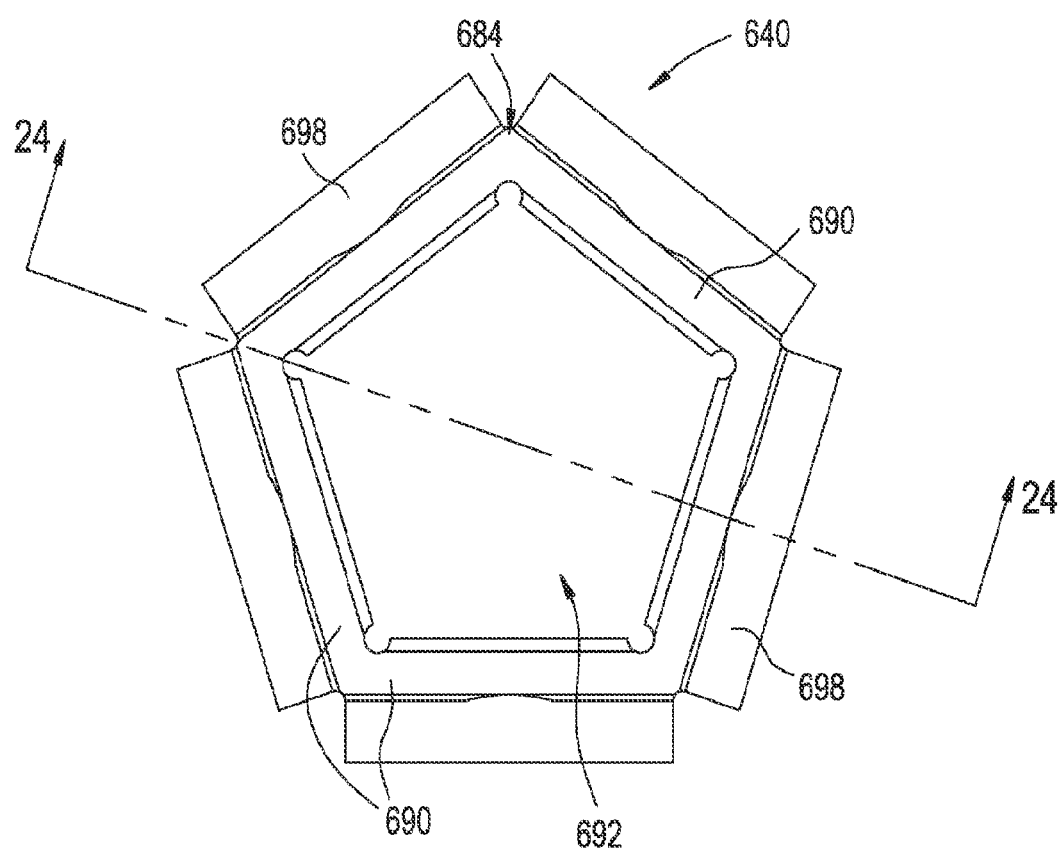
FIG. 23 is a top plan view of the wear band shown in FIG. 22.
Figure 24:
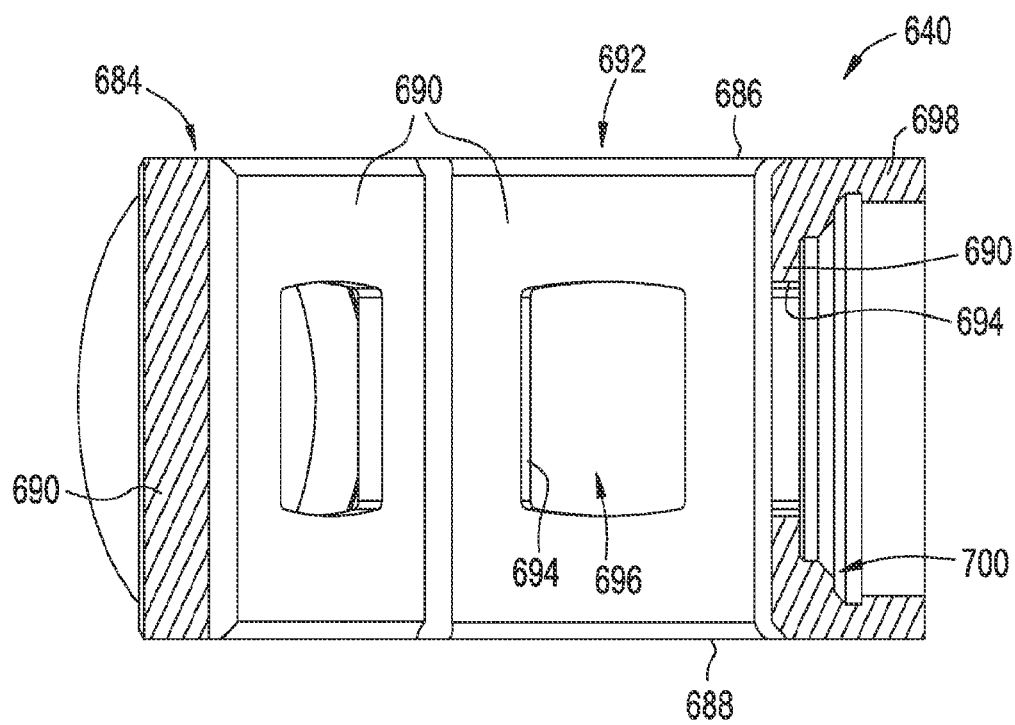
FIG. 24 is a cross-sectional side view of the wear band shown in FIGS. 22 and 23 taken from along line 24-24 in FIG. 23.

Wear band and/or guide bushing 640 is shown in FIGS. 22-24 as including a body 684 that extends axially between opposing sides 686 and 688. Body 684 can include a plurality of body walls 690 that have opposing inner and outer surfaces (not numbered). The plurality of body walls extend axially between sides 686 and 688, and the inner surfaces (not numbered) of the body walls at least partially define a rod passage 692 extending axially through body 684. In a preferred arrangement, rod passage 692 will be at least partially formed from a plurality of inner surfaces that correspond to the number of side surfaces 630 of the damper rod. One or more of body walls 690 can include an opening wall 694 that at least partially defines a corresponding opening 696 extending through the body wall. In a preferred arrangement, the opening is dimensioned such that at least a portion of a detent-engaging element, such as one of detent-engaging elements 636, for example, can extend at least partially therethrough and into communication with rod passage 692. It will be appreciated, however, that openings 696 can be of any suitable size, shape and/or configuration. Body 684 can also, optionally, include one or more connector walls 698 that can project outwardly from along the outer surfaces of body walls 690. In a preferred arrangement, connector walls 698, if provided, can include one or more securement features 700 (FIG. 24) configured to receive and engage a corresponding connection feature on one of cartridge assemblies 638.

Figure 26:
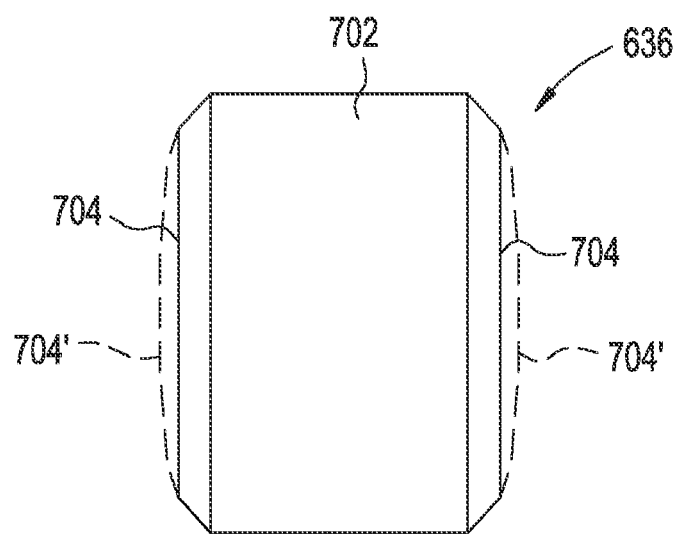
FIG. 26 is a top plan view of the detent-engaging element in FIG. 25.
Figure 27:
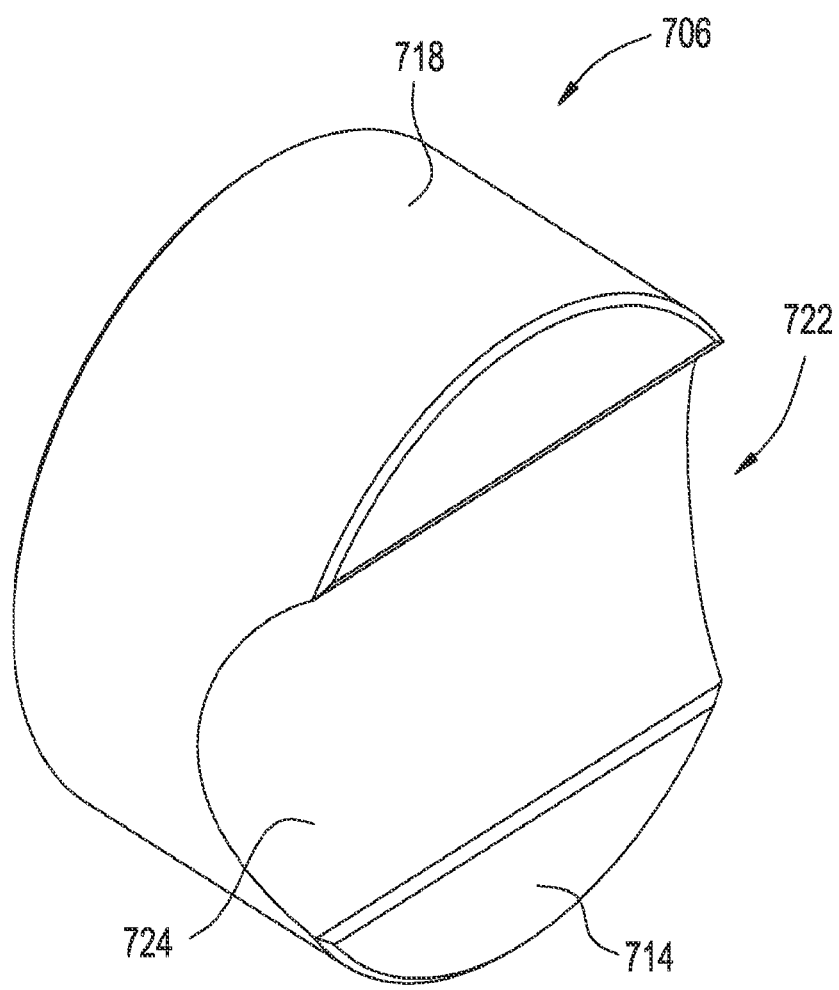
FIG. 27 is a perspective view of one example of a race.

It will be appreciated that detent-engaging elements suitable for use in forming a releasable shaft-lock connection in accordance with the subject matter of the present disclosure can be of any suitable size, shape and/or arrangement, such as one or more sphere-shaped elements, one or more cylindrically-shaped elements, one or more convex-shaped (e.g., barrel-shaped) elements, or any combination thereof. As one example, detent-engaging element 636 is shown in FIGS. 26 and 27 in the form of a cylindrical roller having an axis of rotation AXR. Element 636 also has an outer surface 702 disposed circumferentially about the axis that extends axially between opposing end surfaces 704. In some cases, end surfaces 704 can be approximately planar and can be disposed transverse to axis AXR. In other cases, the end surfaces can be curved, such as is represented in FIG. 27 by dashed lines 704'.

As mentioned above, the one or more detent-engaging elements of a releasable shaft-lock connection in accordance with the subject matter of the present disclosure can be supported in operative association with a corresponding detent of a damper rod (e.g., groove 632 of damper rod 602) in any suitable manner. In some cases, one or more of the detent-engaging elements can be at least partially captured within one or cartridge assemblies 638, such as may be secured on or along wear band 640 with the detent-engaging elements biased inwardly into operative engagement with the damper rod. It will be appreciated that detent-engaging element 636 can be captured and/or otherwise retained as well as biased or otherwise urged in an inward direction in any suitable manner.

As one example, cartridge assemblies 638 can include a race 706 that abuttingly engages element 636 and a biasing element 708 that urges race 706 into abutting engagement with the detent-engaging element. Cartridge assemblies 638 can also include an inner retainer 710 and retaining cover 712 that cooperatively engages inner retainer 710 to at least partially encapsulate element 636, race 706 and biasing element 708. As shown in FIG. 12, cartridge assemblies 638 can have a cartridge axis AXC, which may, in some cases, be disposed in a direction transverse to axis AX of gas spring and gas damper assembly 200. Additionally, it will be appreciated from at least FIG. 12 that axes AXR of elements 636 are oriented in a direction transverse to cartridge axis AXC and also in a direction transverse to the axis of the gas spring and gas damper assembly.

Figure 25:
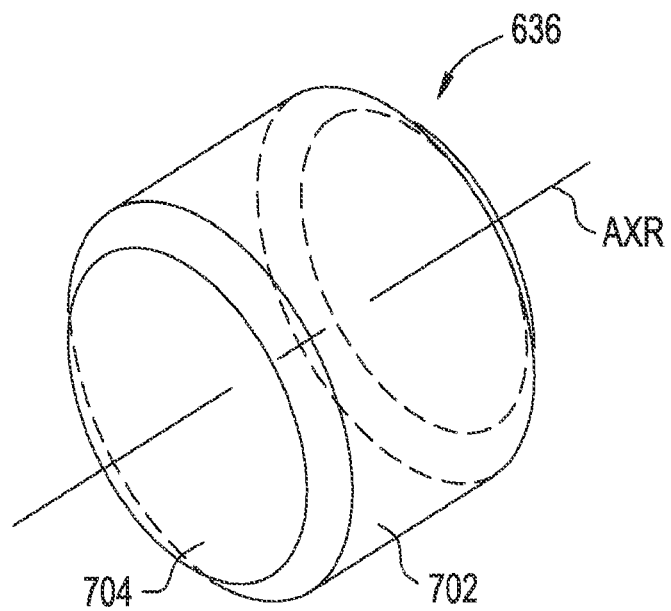
FIG. 25 is a perspective view of one example of a detent-engaging element.
Figure 28:
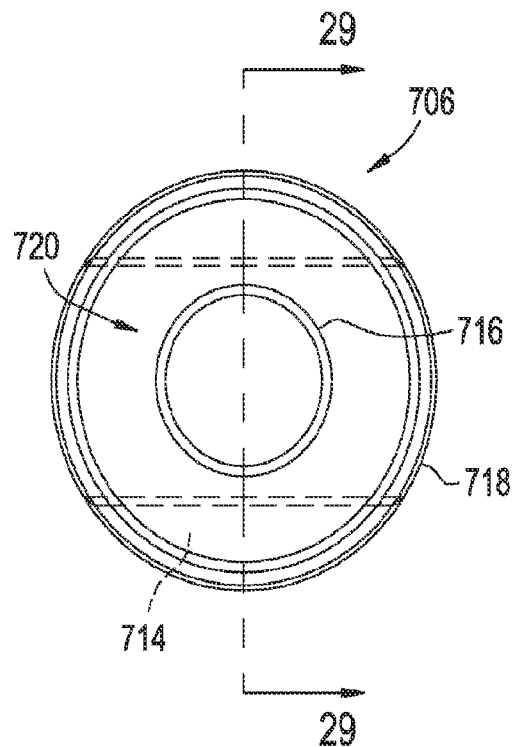
FIG. 28 is a rear view of the race shown in FIG. 27.
Figure 29:
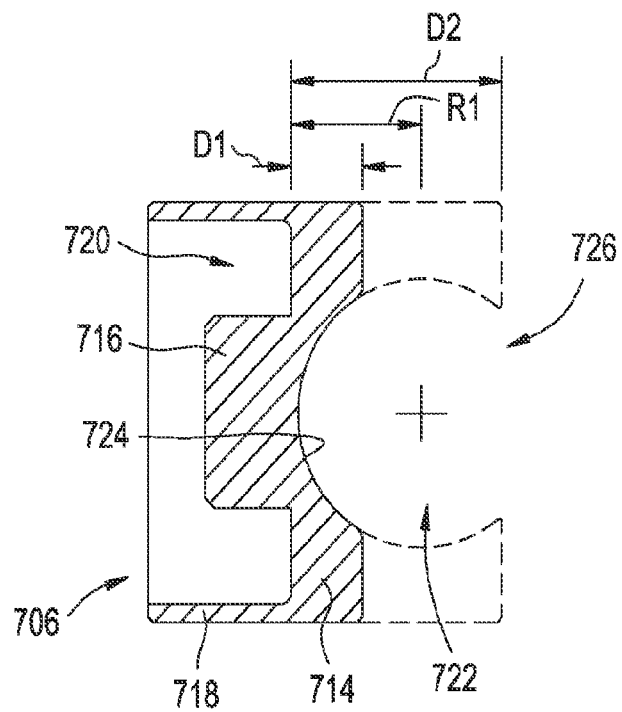
FIG. 29 is a cross-sectional side view of the race shown in FIGS. 27 and 28 taken from along line 29-29 in FIG. 28.
Figure 30:
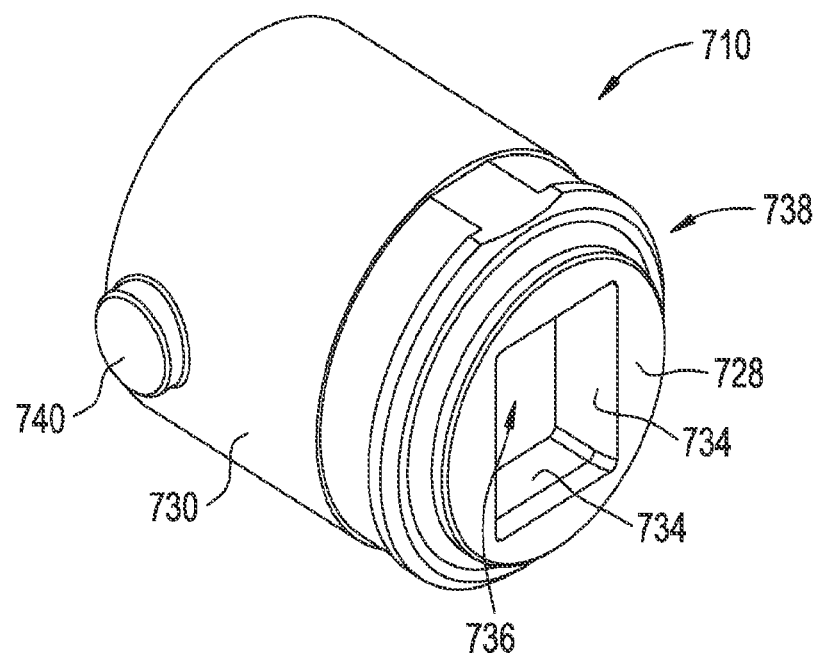
FIG. 30 is a front perspective view of one example of an inner retainer.
Figure 31:
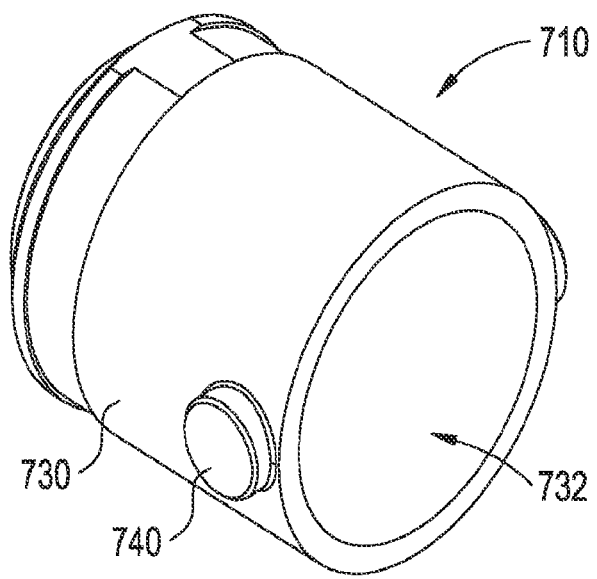
FIG. 31 is a rear perspective view of the inner retainer shown in FIG. 30.
Figure 32:
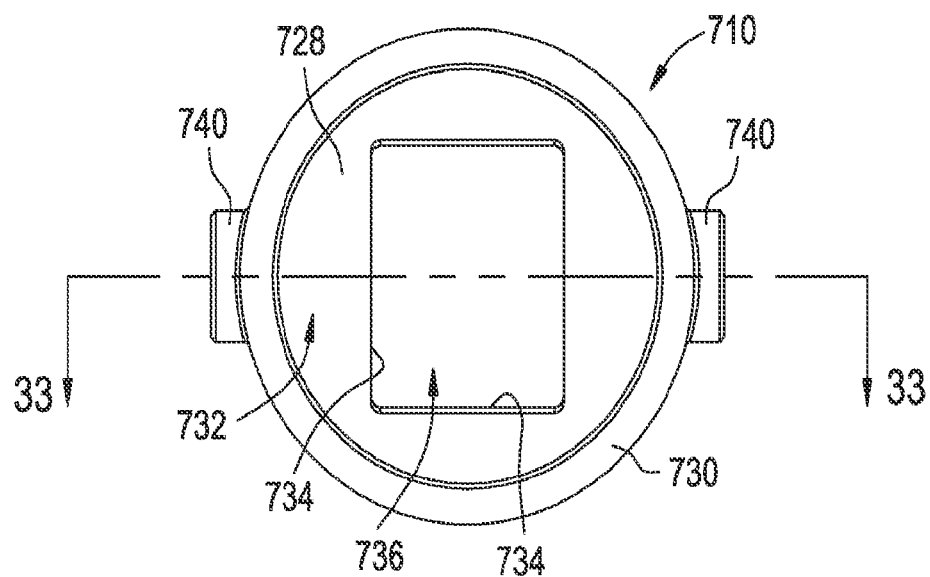
FIG. 32 is a rear view of the inner retainer shown in FIGS. 30 and 31.
Figure 33:
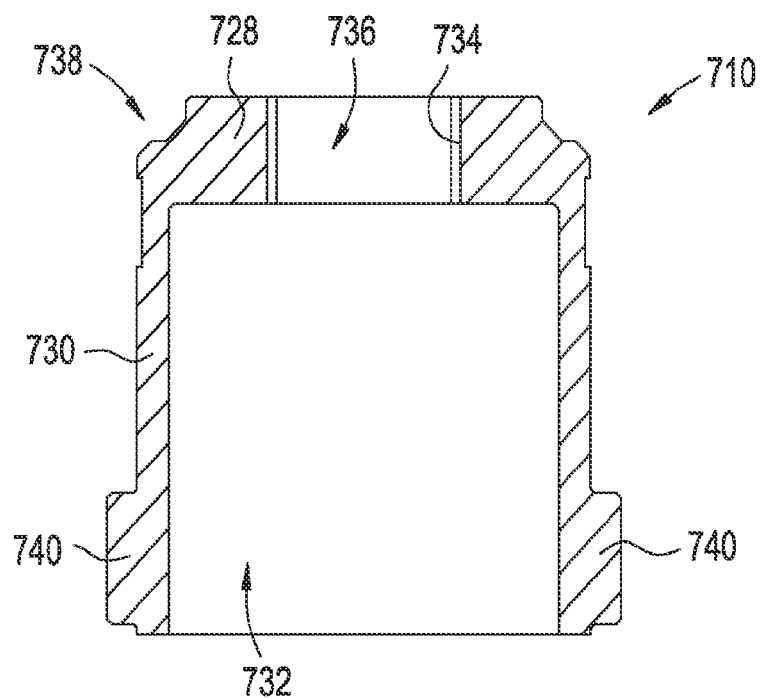
FIG. 33 is a cross-sectional side view of the inner retainer shown in FIGS. 30-32 taken from along line 33-33 in FIG. 32.

As shown in FIGS. 27-29, race 706 can include an end wall 714 that has an approximately planar portion and is oriented transverse to cartridge axis AXC. Race 706 can also include an inner side wall 716 that extends axially from along end wall 714. Race 706 can further include an outer side wall 718 that extends axially from along end wall 714 in radially-outwardly spaced relation to inner side wall 716 such that a cavity 720 is at least partially formed therebetween. Race 706 can also include a recess 722 dimensioned to at least partially receive one or more of detent-engaging elements 636, such as may be suitable for permitting rotation about axis AXR (FIG. 25) thereof. It will be appreciated that the recess can be formed in any suitable manner. As one example, end wall 714 can include a curved or curvilinear wall portion that at least partially defines the recess. As another example, race 706 can include a recess wall 724 that at least partially defines the recess.

It will be appreciated that recess 722 can be of any suitable size, shape and/or configuration. For example, in some cases, recess 722 can have a depth dimension that is less than a radius dimension of element 636, such as are respectively represented in FIG. 29 by reference dimensions D1 and R1, for example. In other cases, recess 722 can have a depth dimension that is greater than a radius dimension of element 636, such as is represented in FIG. 29 by reference dimension D2, for example. In such cases, end wall 714 can at least partially define an opening 726 through which at least a portion of a detent-engaging element can project. In some cases, the outer side wall could extend peripherally around the recess. In other cases, the recess can have an elongated shape with open ends that extend through outer side wall 718. In such cases, the one or more detent-engaging elements could be inserted into recess 722 through one of the open ends.

Biasing element 708, such as a coil spring, for example, can be at least partially received within cavity 720 of race 706. Detent-engaging element 636, race 706 and biasing element 708 can be received within and captured between inner retainer 710 and retaining cover 712. As illustrated in FIGS. 30-33, inner retainer 710 can include an end wall 728 and a side wall 730 that together at least partially define a retainer chamber 732 within which element 636, race 706 and biasing element 708 can be at least partially received. End wall 728 includes one or more opening surfaces 734 that at least partially define an opening 736 extending through the end wall. In some cases, the opening may be dimensioned such that element 636 can extend through the opening and into operative engagement with the damper rod without contacting the end wall of the inner retainer. In other cases, the inner retainer may be at least partially made from a bearing material, such as hardened steel, sintered bronze or oil-impregnated polymeric material. In which case, opening 736 may be sized such that element 636 is at least partially retained by inner retainer 710.

Inner retainer 710 can be secured on or along wear band 640 in any suitable manner to thereby attach the corresponding cartridge assembly to the wear band. As one example, inner retainer 710 can include one or more securement features 738 configured to cooperatively engage a corresponding connection feature on wear band 640, such as one of securement features 700, for example. Additionally, it will be appreciated that inner retainer 710 and retaining cover 712 can be operatively connected with one another in any suitable manner. As one example, inner retainer 710 can include cam lobes 740 that project radially outwardly from along side wall 738 and operatively entered engage corresponding features on retaining cover 712.

Figure 34:
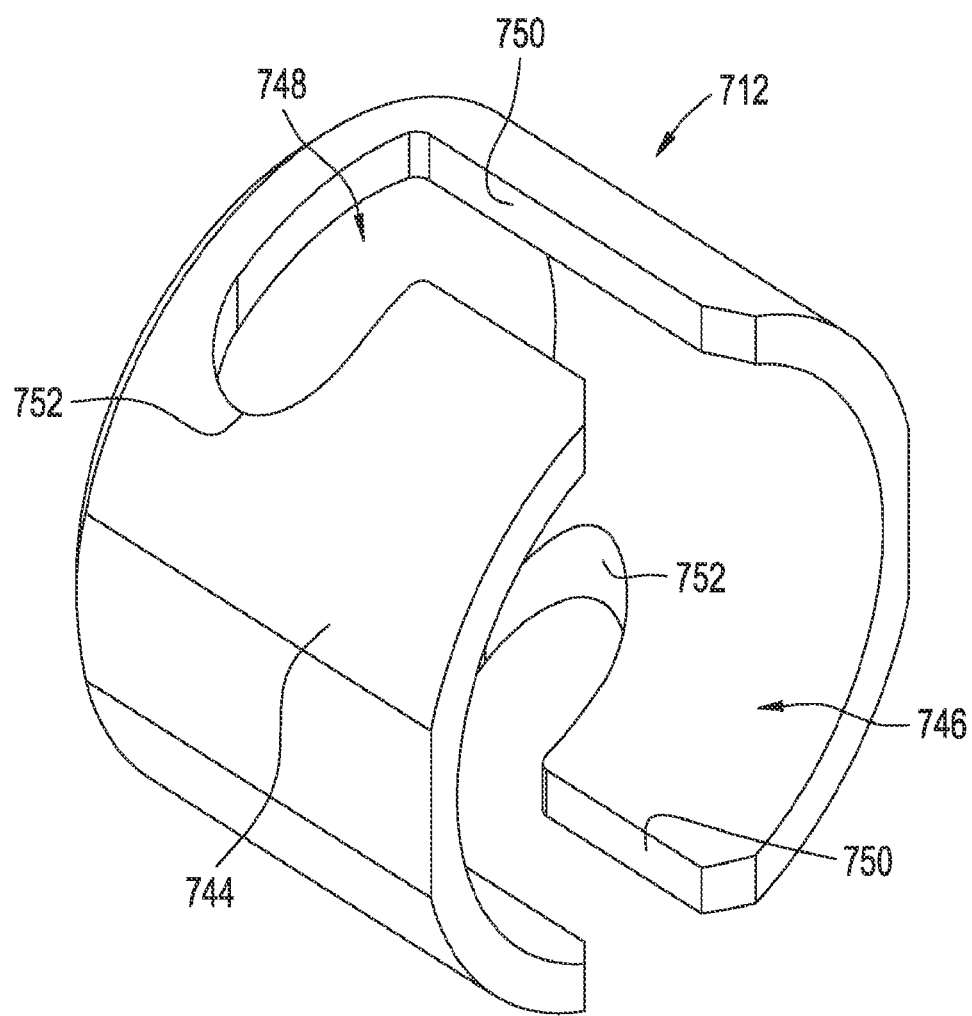
FIG. 34 is a rear perspective view of one example of a retainer cover.
Figure 35:
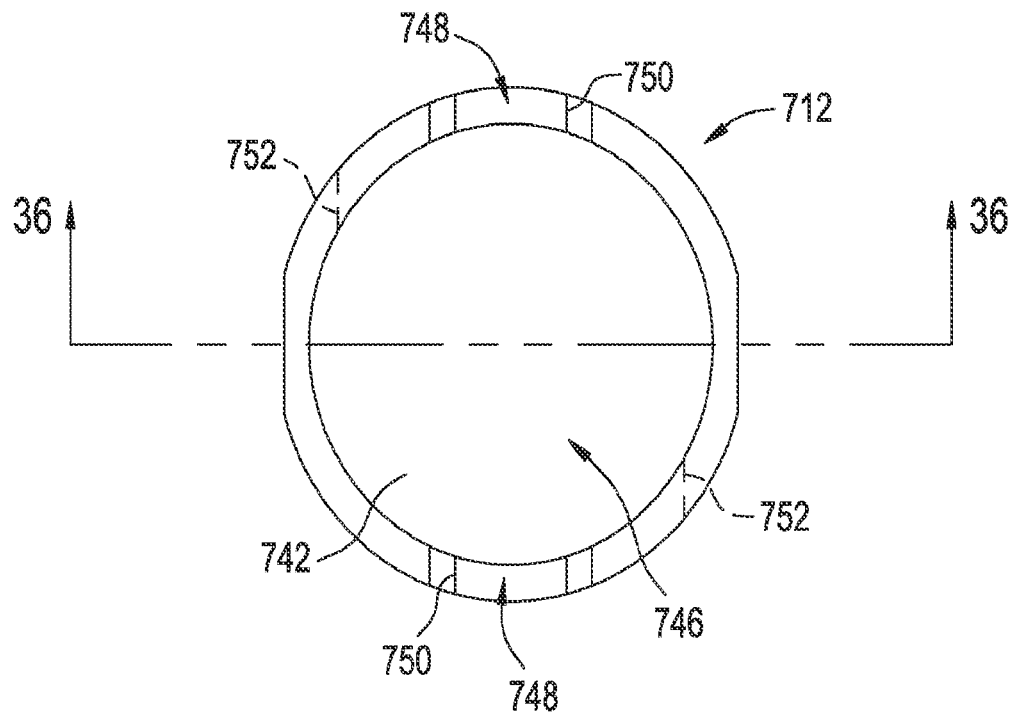
FIG. 35 is a rear view of the retainer cover shown in FIG. 34.
Figure 36:
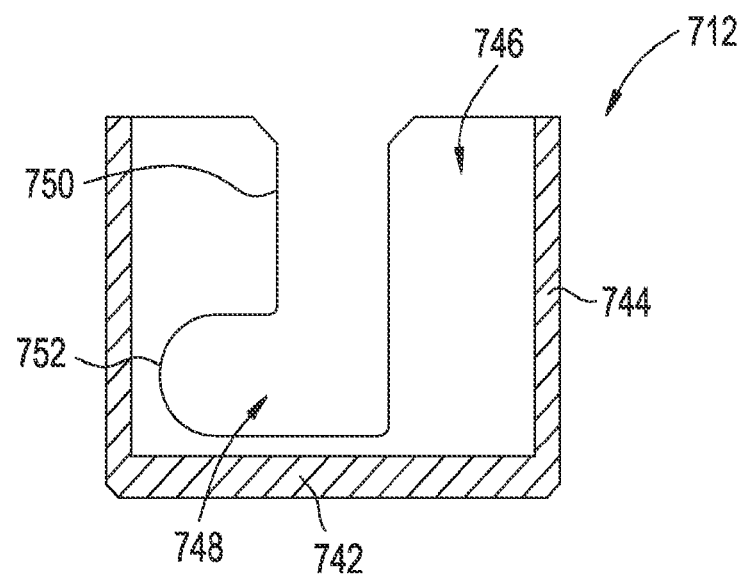
FIG. 36 is a cross-sectional side view of the retainer cover shown in FIGS. 34 and 35 taken from along line 36-36 in FIG. 35.

As illustrated in FIGS. 34-36, retaining cover 712 can include an end wall 742 and a side wall 744 that together at least partially define a cover chamber 746 within which at least a portion of inner retainer 710 as well as at least a portion of one or more of element 636, race 706 and/or biasing element 708 can be at least partially received. It will be appreciated that side wall 744 is, preferably, dimensioned to telescopically receive side wall 730 of the inner retainer. Side wall 730 can also include one or more slots 748 extending therethrough that are dimensioned to at least partially receive a corresponding one of cam lobes 740 of inner retainer 710. In the arrangement shown in FIGS. 34-36, slots 748 have an L-shaped or J-shaped configuration that is at least partially defined by slot walls 750 and 752. In some cases, such a slot configuration will permit the inner retainer to be twist-locked together with the retaining cover to thereby capture at least element 636, race 706 and biasing element 708 within cartridge assembly 638.

Figure 37:
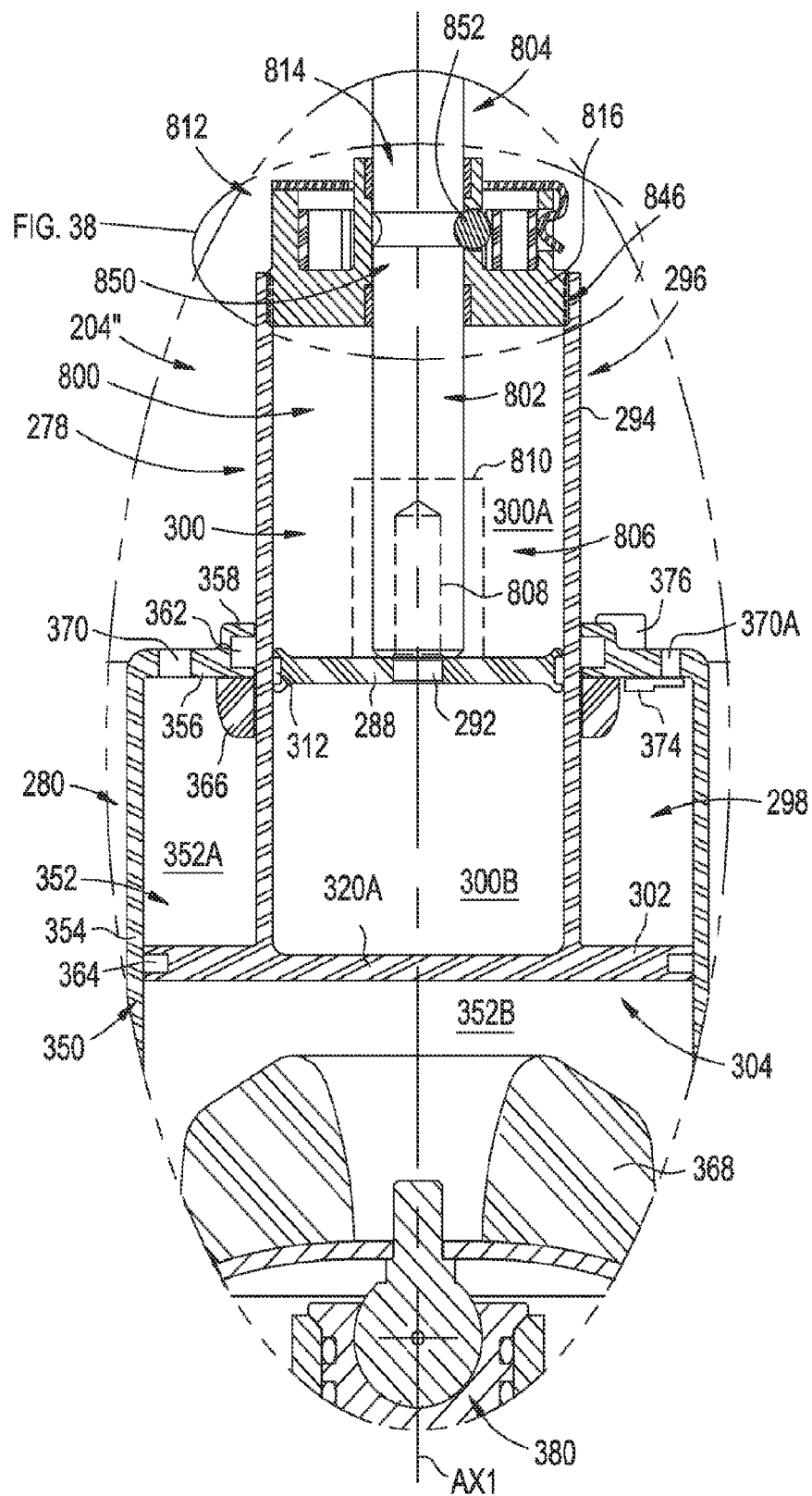
FIG. 37 is a cross-sectional view of another alternate embodiment of the portion of the gas spring and gas damper assembly shown in FIG. 4.
Figure 38:
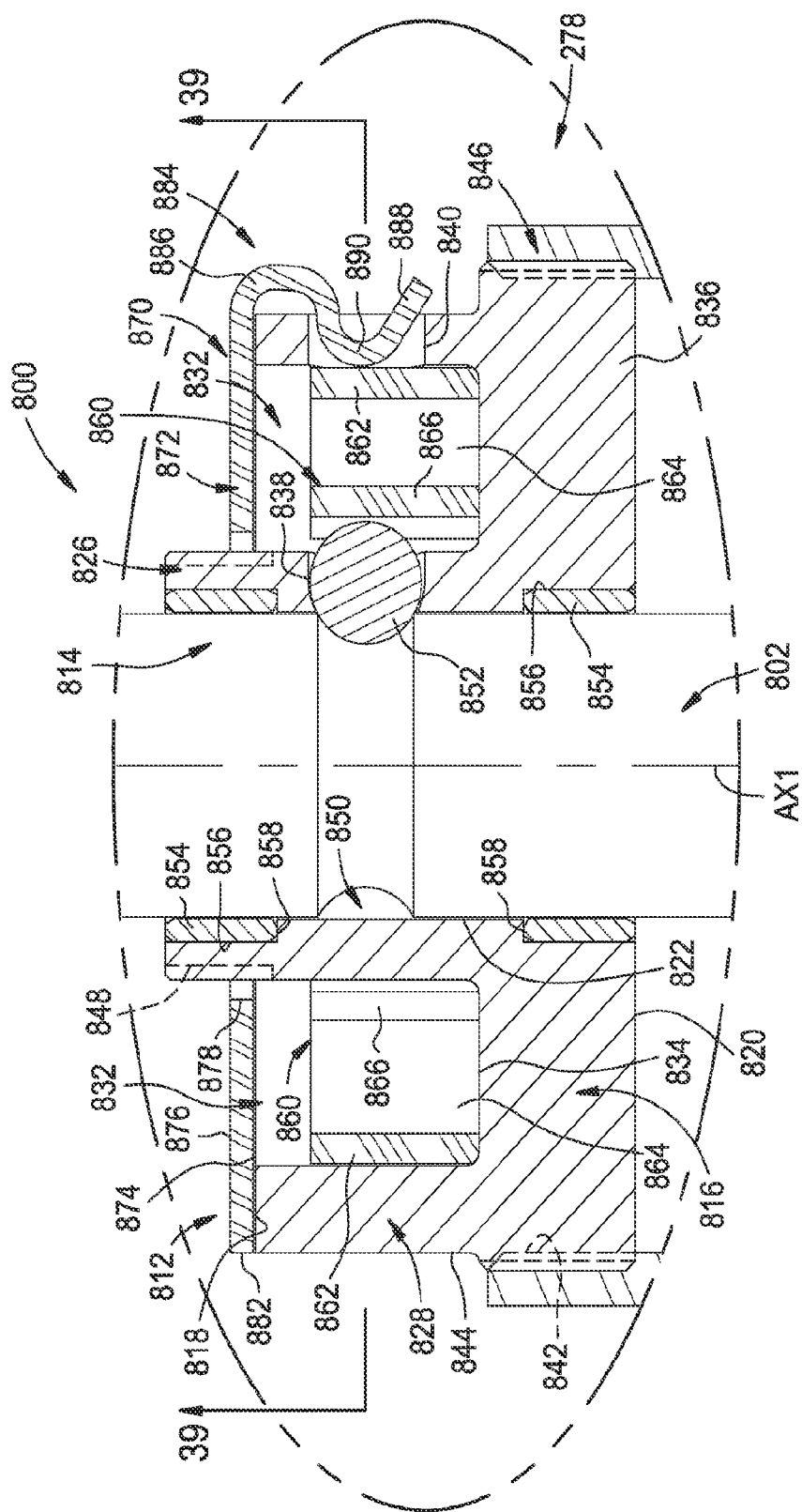
FIG. 38 is an enlarged, cross-sectional view of the portion of the gas spring and gas damper assembly identified as Detail 38 in FIG. 37.
Figure 39:
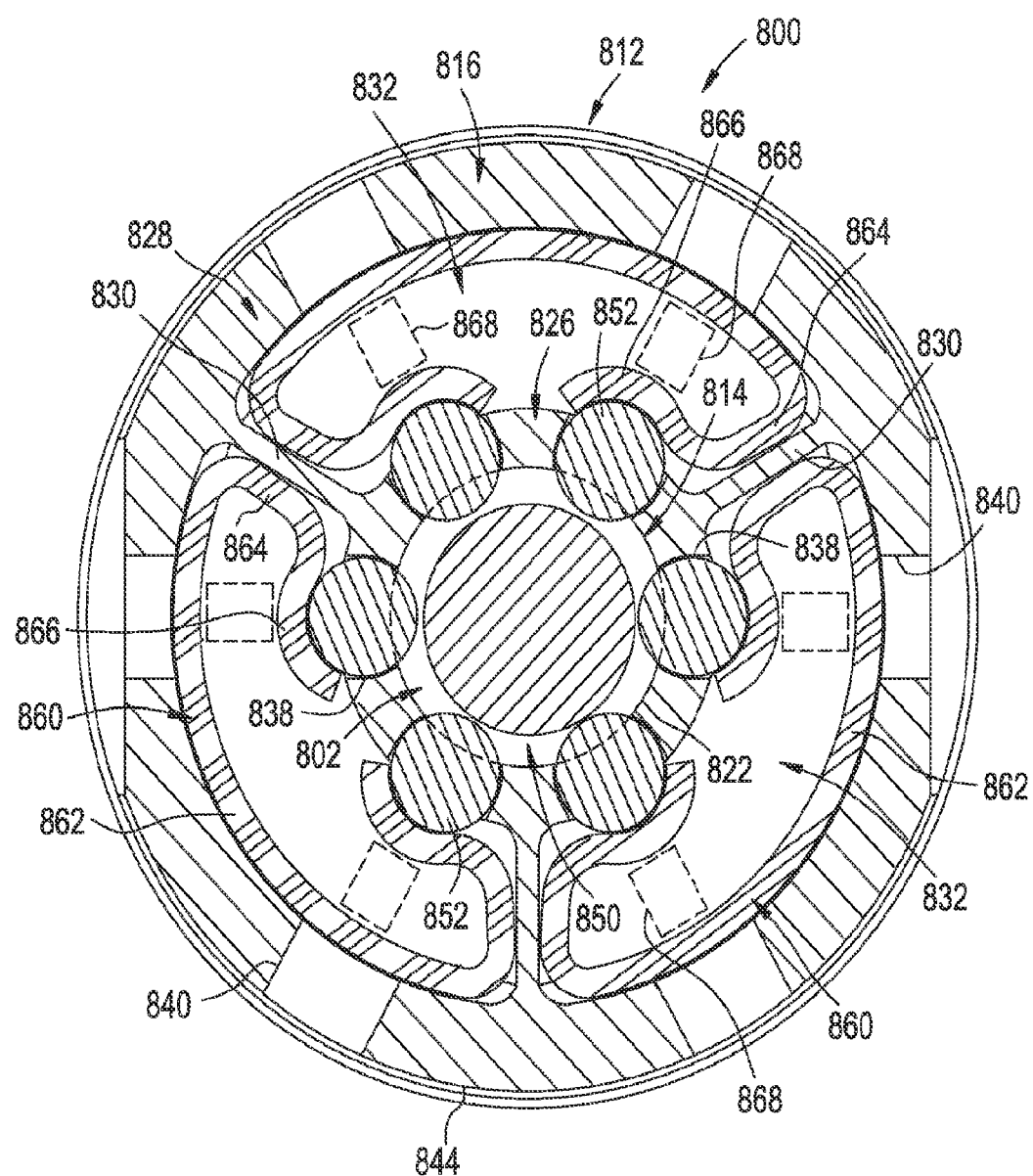
FIG. 39 is a cross-sectional side view of the portion of the gas spring and gas damper assembly shown in FIGS. 37 and 38 taken from along line 39-39 in FIG. 38.
Figure 40:
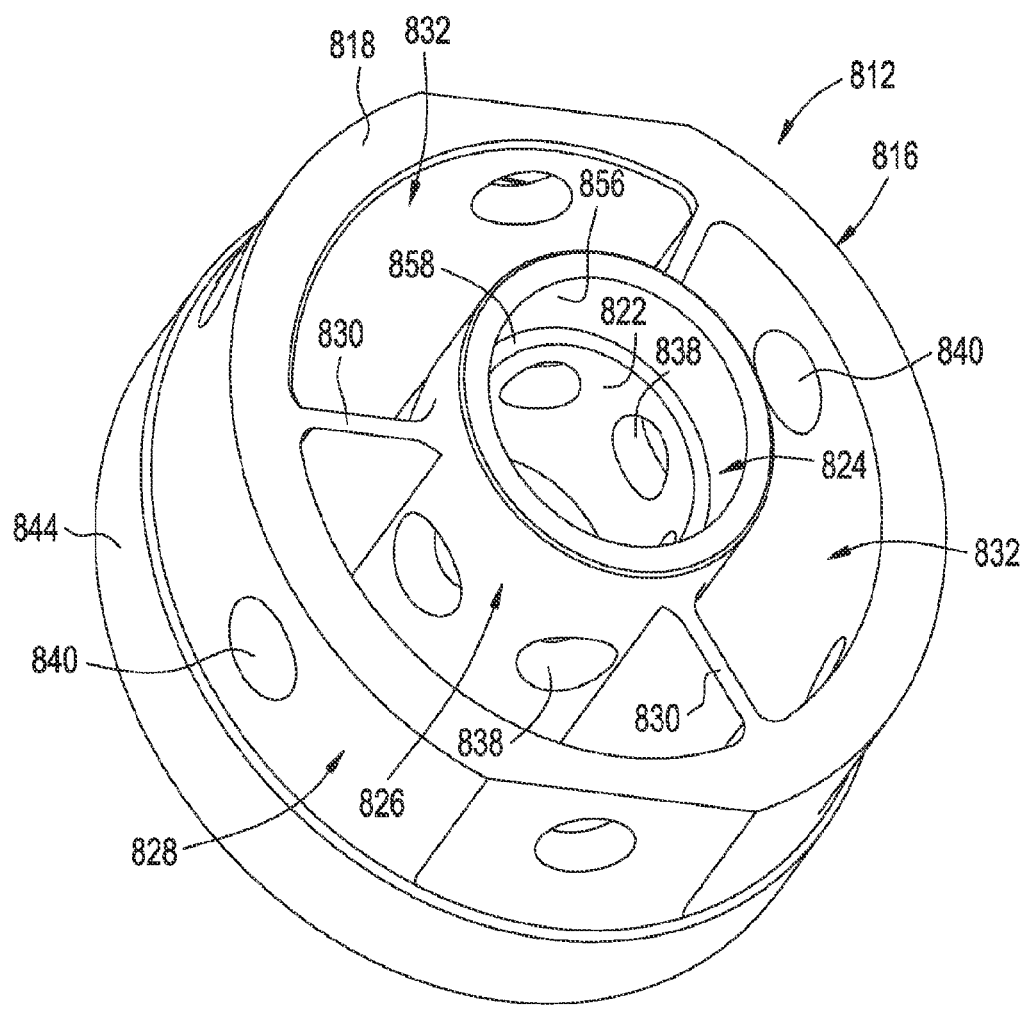
FIG. 40 is a top perspective view of the end cap body of the gas spring and gas damper assembly shown in FIGS. 37-39.
Figure 41:
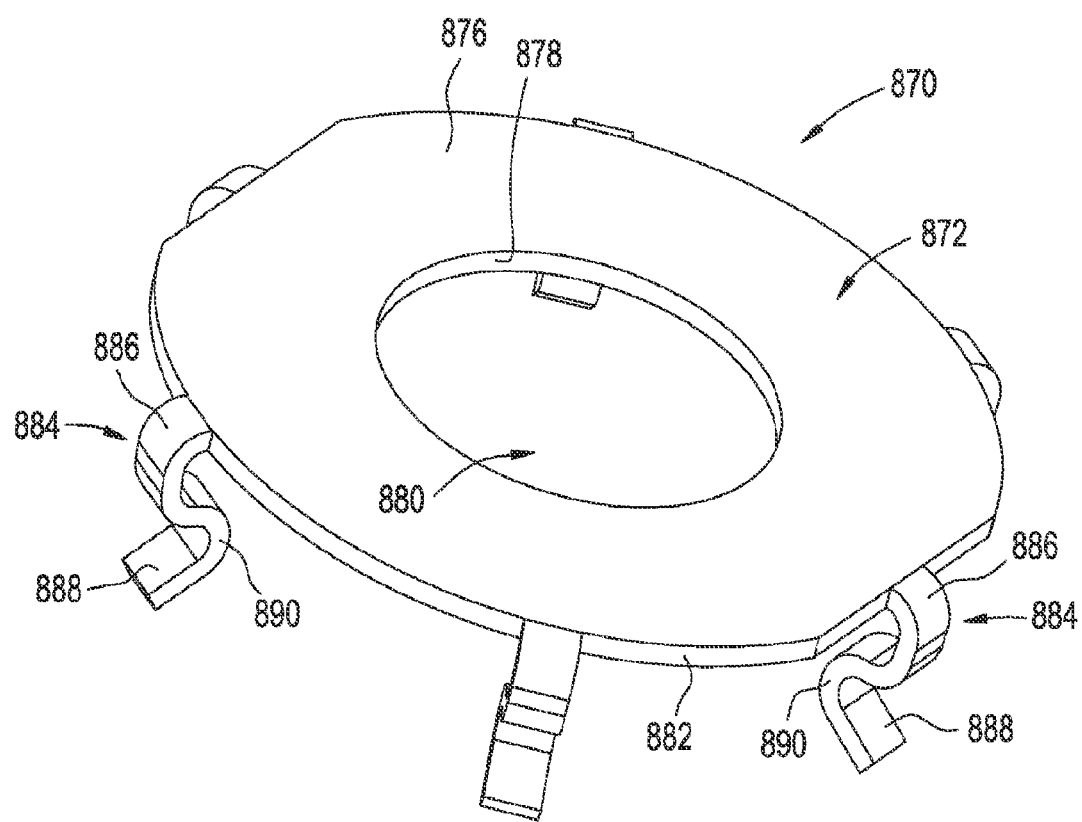
FIG. 41 is a top perspective view of the end cap cover of the gas spring and gas damper assembly shown in FIGS. 37-40.

FIGS. 37-39 illustrate an alternate embodiment of a damper element 800, such as may be operatively associated with damper element 278 to form a gas damper assembly 204" that can be secured within gas spring assembly 202, such as has been described above in connection with gas damper assembly 204, for example. It will be appreciated that damper element 800 may be similar in construction and/or operation to damper element 276 and that gas damper assembly 204" may be similar in overall construction and operation to gas damper assembly 204, both of which have been described above in detail in connection with gas spring and gas damper assembly 200, for example. As such, it will be recognized that common elements are identified in FIGS. 37-39 by like reference numbers.

As illustrated in FIG. 37-39, damper element 800 includes a damper rod 802 that extends longitudinally from an end 804 to an end 806. Damper piston 288 can be disposed along end 806 of damper rod 802 and can be attached or otherwise connected thereto in any suitable manner. For example, damper piston 288 could be integrally formed with damper rod 802. As another example, end 806 of damper rod 802 could include a securement feature, such as a threaded passage 808, for example. Damper piston 288 could include hole 292 extending therethrough such that a securement device, such as a threaded fastener (not shown), for example, could be used to secure damper piston 288 along end 806 of damper rod 802. Additionally, damper rod 802 can include a securement feature, such as a threaded passage 610 (FIGS. 11, 13 and 14), for example, disposed along end 804 and suitable for operative connection with misalignment mount 378 or another suitable feature or component. In some cases, damper rod 802 can include a shoulder wall 810 formed along end 806, such as may be suitable for inhibiting direct contact between the damper piston and another component (e.g., an end cap or end wall of damper element 278).

FIGS. 37-39 also illustrate alternate embodiment of an end cap 812 that is suitable for use in connection with a gas damper assembly, such as an alternative to end cap 306, 306', 400 and/or 614 of damper element 278 of gas damper assembly 204 and/or 204' for example. FIGS. 37-39 further illustrate another example of a releasable axial-locking assembly (or a releasable shaft-lock connection) 814 that may be capable of maintaining two damper elements (e.g., damper elements 800 and 278) in a substantially fixed position relative to one another up to a predetermined force threshold and capable of permitting relative movement between the two damper elements under conditions in which the predetermined force threshold is exceeded. In some cases, releasable shaft-lock connection 814 can include a rolling element and detent arrangement, such as has been described above in connection with releasable shaft-lock connection 316 and/or 616, for example. It will be appreciated, however, that other configurations and/or arrangements could alternately be used.

End cap 812 is shown in FIGS. 37-40 as including an end cap body 816 with a longitudinally-extending axis AX1, an end surface 818 that extends transverse to axis AX1 and an end surface 820 disposed opposite surface 818. A passage wall 822 extends longitudinally along end cap body 816 and at least partially defines a rod passage 824 extending through end cap body 816. End cap body 816 also includes at least one side wall. In the exemplary arrangement shown in FIGS. 37-40, end cap body 816 includes an inner side wall 826 and an outer side wall 828 that is disposed in radially-outwardly spaced relation to the inner side wall such that at least one cavity is formed therebetween, such as may be accessible from along surface 818, for example. In some cases, one or more connector walls 830 can extend between and operatively interconnect the inner and outer side walls. In such case, a plurality of cavities 832 can be formed between inner and outer side walls 826 and 828. In some cases, the cavities can extend through the end cap body. In other cases, however, cavities 832 can include a bottom surface 834, such as may be formed by an end wall portion 836 (FIG. 38) that can also at least partially include end surface 820 opposite bottom surfaces 834.

End cap body 816 also includes one or more element bores 838 that extend through inner side wall 826. In the arrangement in FIGS. 37-40, a plurality of element bores are shown as being disposed transverse to axis AX1 and extending radially outwardly through the inner side wall such that the element bores are in communication with rod passage 824. In some cases, one or more outer bores 840 can, optionally, extend through outer side wall 828 and can, if provided, be disposed in approximate alignment with element bores 838, such as may be beneficial for manufacturing and/or other purposes, for example.

It will be appreciated that end cap 812 can be secured on or along an associated component, such as side wall 294 of damper element 278, for example, in any suitable manner. As one example, end cap body 816 can include one or more securement features, and end 296 of side wall 294 can include one or more securement features that are complimentary to the one or more securement feature of end cap 812. As one example, end cap body 816 can include one or more helical threads 842 that extend peripherally about an outer peripheral surface 844 of the end cap body and a corresponding one or more helical threads (not numbered) could be disposed along end 296 of side wall 294 such that a threaded connection 846 can be formed therebetween. While it will be appreciated that other securement features could alternately be used, one benefit of using a threaded connection, such as has been described above, is that the same may facilitate assembly.

Additionally, end cap body 816 can, optionally, include one or more securement features, such as one or more helical threads 848, for example, disposed on or along inner side wall 826, such as may be useful for at least partially securing a cover across the open end of cavities 832, for example, and/or for at least partially securing another component or device (not shown) on or along the end cap.

In the exemplary arrangement shown in FIGS. 37-40, damper rod 802 includes a detent in the form of a groove 850 that extends inwardly into the damper rod. It will be appreciated that groove 850 can be of any suitable size, shape and/or configuration, such as, for example, may take the form of an endless annular groove that extends radially inwardly into the damper rod and/or such as may include a curved cross-sectional profile. Additionally, it will be appreciated that the damper rod can have any suitable cross-section of shape and/or configuration, and that the group can have any suitable cross-sectional shape and/or configuration. In some cases, the groove can have a cross-sectional shape that is approximately the same as the cross-sectional shape of the damper rod (e.g., both the damper rod and the groove could have a circular, pentagonal, hexagonal or octagonal shape). In other cases, the groove can have a cross-sectional shape that differs from the cross-sectional shape of the damper rod (e.g., the damper rod can have a polygonal cross-sectional shape and the groove can have a circular cross-sectional shape). It will be appreciated that, in some cases, the inclusion of a non-circular damper rod and corresponding releasable shaft-lock connection can inhibit twisting or rotational actions that may be inherent in certain gas spring and gas damper assemblies.

End cap 812 can also include one or more detent-engaging elements 852, such as hardened steel or ceramic spheres, for example, disposed within element bores 838 and that can be biased into engagement with an associated detent feature of a damper rod, such as groove 850 of damper rod 802, for example. It will be appreciated, however, that detent-engaging elements of other shapes, sizes and/or configurations could alternately be used, such as cylindrical and/or tapered rollers, for example.

Additionally, end cap 812 can also include one or more sealing elements, bushings and/or wear bands. In the exemplary arrangement shown in FIGS. 37-40, wear bands 854 are supported on or along passage wall 822, and can be dimensioned to abuttingly engage an outer surface of damper rod 802. In some cases, one or more of the wear bands and/or other components can be at least partially recessed into end cap body 816, such as may be at least partially defined by shoulder walls 856 and 858, for example.

Additionally, it will be appreciated that detent-engaging elements 852 can be biased into engagement with the associated detent (e.g., groove 850 of damper rod 802) in any suitable manner. As one example, one or more biasing elements can be supported on or along end cap body 816 and can operatively engage one or more of the detent-engaging elements. In the arrangement shown in FIGS. 37-39, for example, a plurality of biasing elements 860 are supported on end cap body 816 with at least one biasing element disposed within one of cavities 832. Biasing elements 860 are shown as being formed from an elongated element wall (not numbered) that has a somewhat C-shaped configuration with a base wall portion 862, side wall portions 864 and element engaging portions 866. Base wall portion 862 is disposed in abutting engagement with an inside surface (not numbered) of outer side wall 828. Side wall portions 864 extend from along base wall portion 862 and are disposed adjacent corresponding connector walls 830. Element engaging portions 866 form free ends of the elongated element wall and can have a shape that abuttingly engages a corresponding number of one or more detent-engaging elements 852. In a preferred arrangement, element engaging portions 866 are disposed in spaced relation from the outer surface (not numbered) of inner side wall 826 such that the detent-engaging elements are biased in a radially inward direction due at least in part to a biasing force from the deflection of element engaging portions 866.

In some cases, biasing elements 860 can be formed from metal, such as from a spring-steel grade of material, for example. Additionally, in some cases, biasing elements can act as primary biasing elements and secondary biasing elements can be operatively associated with the primary biasing elements to supplement the biasing force acting on detent-engaging elements 852. As one example, secondary biasing elements are schematically represented in FIG. 39 by items 868, and can take the form of any suitable spring device or other biasing element, such as a compression-type coil spring, for example. In the arrangement shown, biasing elements 868 are operatively disposed between base wall portions 862 and element engaging portions 866. It will be appreciated, however, that other configurations and/or arrangements could alternately be used. Furthermore, in some cases, secondary biasing elements 868 can be substantially identical to one another, such as may be useful for providing supplemental biasing force, for example. In other cases, the secondary biasing elements can differ from one another, such as may be useful for balancing the biasing force acting on the detent-engaging elements, for example.

Damper element 800 can also include a cover that can be secured on or along end cap 812, such as may be useful for enclosing the end cap and/or retaining biasing elements 860 and/or 868, for example. It will be appreciated that the cover can be of any suitable type, kind, configuration and/or construction, and can be secured on or along the end cap in any suitable manner. As one example, damper element 800 is shown in FIGS. 37-39 as including a cover 870 that is secured along end cap 812 adjacent end surface 818 and acts to at least partially enclose cavities 832. In some cases, cover 870 could be disposed in abutting engagement with biasing elements 868 and/or 868.

As illustrated in FIGS. 37-39 and 41, cover 870 can include a cover wall 872 that has opposing surfaces 874 and 876. Additionally, cover wall 872 is shown as extending between an inner surface 878 that at least partially defines an opening 880 dimensioned to receive damper rod 802 and, in some cases, a portion of end cap body, such as a portion of inner side wall 826, for example. Cover wall 872 extends outwardly to an outer peripheral edge 882, and a plurality of retaining arms 884 can extend from cover wall 872, such as from along outer peripheral edge 882, for example. Retaining arms 884 are dimensioned to engage a corresponding one or more features of end cap 812, such as outer bores 840, for example, to at least partially retain cover 870 in operative association with end cap 812.

In some cases, cover wall 872 and retaining arms 884 can be formed form a common material, such as stamped or otherwise formed sheet metal material, for example. In some cases, at least retaining arms 884 can be formed from metal, such as from a spring-steel grade of material, for example. In such cases, at least the retaining arms can be radially-inwardly biased such that the retaining arms at least partially engage corresponding features of the end cap. For example, retaining arms 884 can include proximal portions 886 that are disposed toward cover wall 872 and distal ends 888 that are freely displaceable relative to cover wall 872 and proximal portions 886. In some cases, an engagement feature, such as an intermediate wall portion 890, for example, can be dimensioned or otherwise configured to cooperatively engage the corresponding features of the end cap, such as outer bores 840, for example. It will be appreciated, however, that other configurations and/or arrangements could alternately be used.

Figure 42:
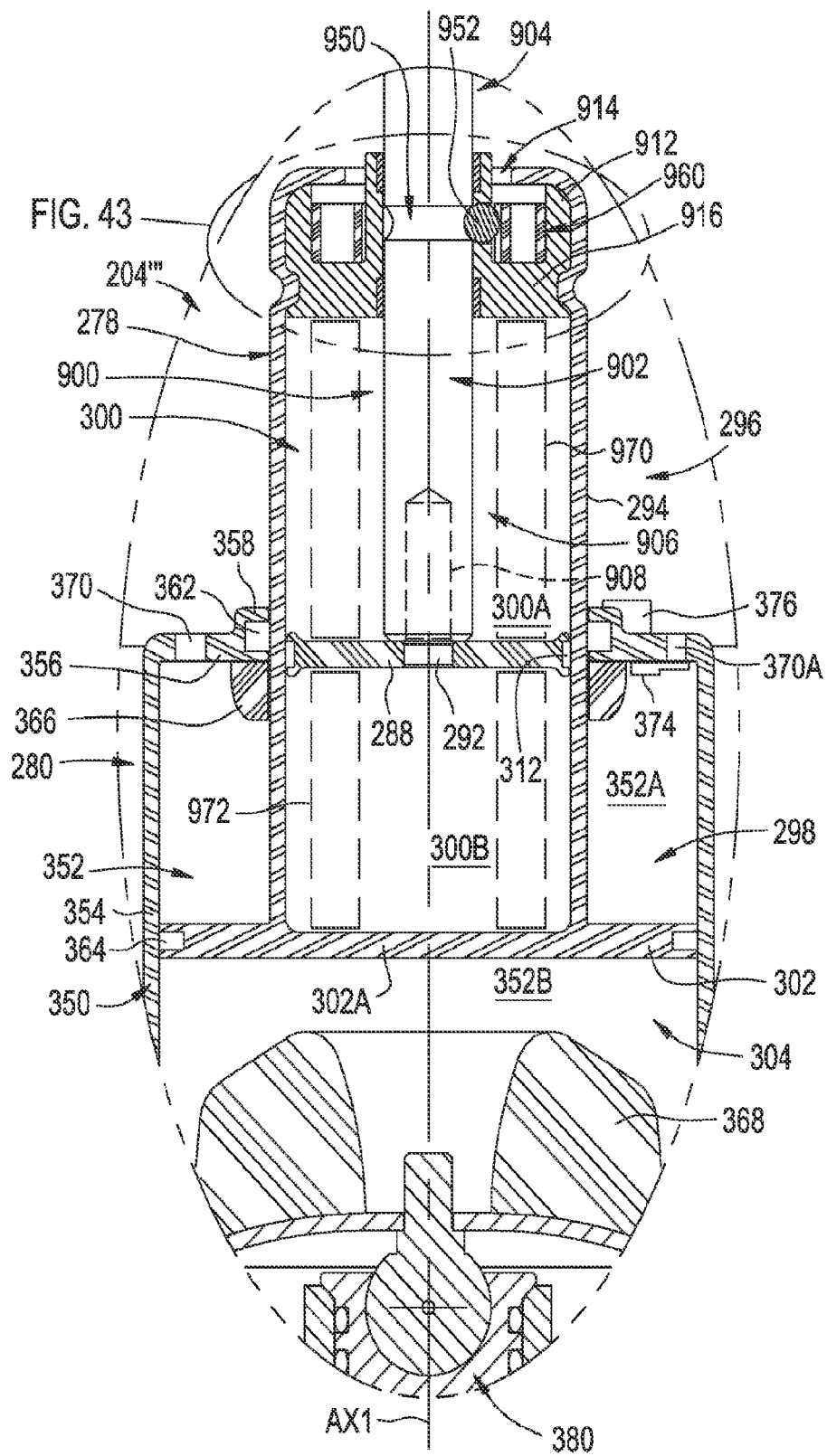
FIG. 42 is a cross-sectional view of a further alternate embodiment of the portion of the gas spring and gas damper assembly shown in FIG. 4.
Figure 43:
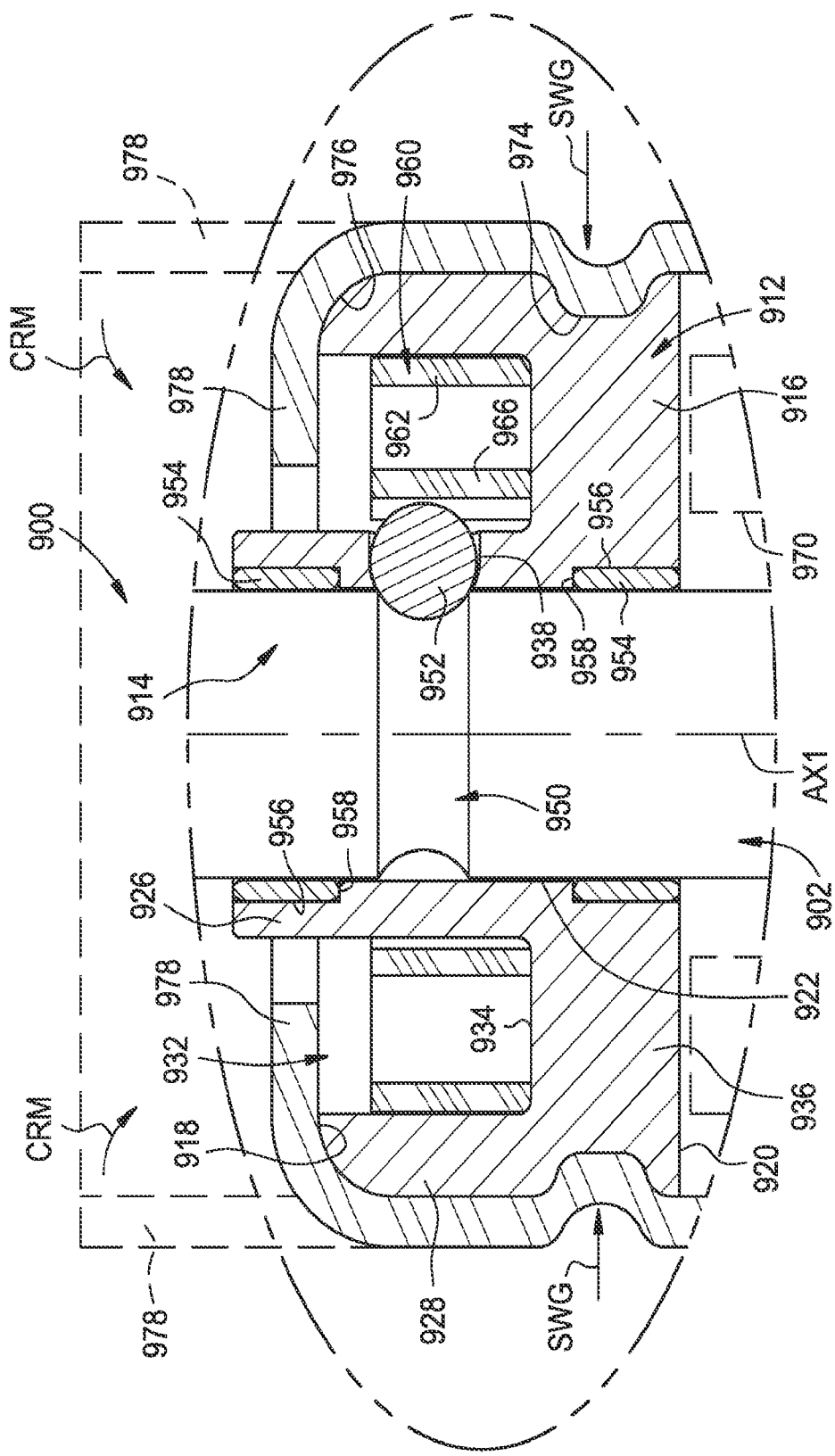
FIG. 43 is an enlarged, cross-sectional view of the portion of the gas spring and gas damper assembly identified as Detail 43 in FIG. 42.

FIGS. 42 and 43 illustrate an alternate embodiment of a damper element 900, such as may be operatively associated with damper element 278 to form a gas damper assembly 204''' that can be secured within gas spring assembly 202, such as has been described above in connection with gas damper assembly 204, for example. It will be appreciated that damper element 900 may be similar in construction and/or operation to damper element 276 and that gas damper assembly 204''' may be similar in overall construction and operation to gas damper assembly 204, both of which have been described above in detail in connection with gas spring and gas damper assembly 200, for example. As such, it will be recognized that common elements are identified in FIGS. 42 and 43 by like reference numbers.

As illustrated in FIGS. 42 and 43, damper element 900 includes a damper rod 902 that extends longitudinally from an end 904 to an end 906. Damper piston 288 can be disposed along end 906 of damper rod 902 and can be attached or otherwise connected thereto in any suitable manner. For example, end 906 of damper rod 902 could include a securement feature, such as a threaded passage 908, for example. Damper piston 288 could include hole 292 extending therethrough such that a securement device, such as a threaded fastener (not shown), for example, could be used to secure damper piston 288 along end 906 of damper rod 902. Additionally, damper rod 902 can include a securement feature, such as a threaded passage 610 (FIGS. 11, 13 and 14), for example, disposed along end 904 and suitable for operative connection with misalignment mount 378 or another suitable feature or component. In some cases, damper rod 902 can include a shoulder wall (not shown) formed along end 906, such as may be suitable for inhibiting direct contact between the damper piston and another component (e.g., an end cap or end wall of damper element 278).

FIGS. 42 and 43 also illustrate alternate embodiment of an end cap 912 that is suitable for use in connection with a gas damper assembly, such as an alternative to end cap 306, 306', 400, 614 and/or 812 of gas damper assembly 204, 204' and/or 204'', for example. FIGS. 42 and 43 further illustrate another example of a releasable axial-locking assembly (or a releasable shaft-lock connection) 914 that may be capable of maintaining two damper elements (e.g., damper elements 900 and 278) in a substantially fixed position relative to one another up to a predetermined force threshold and capable of permitting relative movement between the two damper elements under conditions in which the predetermined force threshold is exceeded. In some cases, releasable shaft-lock connection 914 can include a rolling element and detent arrangement, such as has been described above in connection with releasable shaft-lock connection 316 and/or 616, for example. It will be appreciated, however, that other configurations and/or arrangements could alternately be used.

End cap 912 is shown in FIGS. 42 and 43 as including an end cap body 916 with a longitudinally-extending axis AX1, an end surface 918 that extends transverse to axis AX1 and an end surface 920 disposed opposite surface 918. A passage wall 922 extends longitudinally along end cap body 916 and at least partially defines a rod passage (not numbered) extending through end cap body 916. End cap body 916 also includes at least one side wall. In the exemplary arrangement shown in FIGS. 42 and 43, end cap body 916 includes an inner side wall 926 and an outer side wall 928 that is disposed in radially-outwardly spaced relation to the inner side wall such that at least one cavity is formed therebetween, such as may be accessible from along surface 918, for example. In some cases, one or more connector walls 930 can extend between and operatively interconnect the inner and outer side walls. In such case, a plurality of cavities 932 can be formed between inner and outer side walls 926 and 928. In some cases, the cavities can extend through the end cap body. In other cases, however, cavities 932 can include a bottom surface 934, such as may be formed by an end wall portion 936 (FIG. 43) that can also at least partially include end surface 920 opposite bottom surfaces 934.

End cap body 916 also includes one or more element bores 938 that extend through inner side wall 926. In the arrangement in FIGS. 42 and 43, a plurality of element bores are shown as being disposed transverse to axis AX1 and extending radially outwardly through the inner side wall such that the element bores are in communication with the rod passage. In some cases, one or more outer bores (e.g., outer bores 840) can, optionally, extend through outer side wall 928 and can, if provided, be disposed in approximate alignment with element bores 938, such as may be beneficial for manufacturing and/or other purposes, for example.

In the exemplary arrangement shown in FIGS. 42 and 43, damper rod 902 includes a detent in the form of a groove 950 that extends inwardly into the damper rod. It will be appreciated that groove 950 can be of any suitable size, shape and/or configuration, such as, for example, may take the form of an endless annular groove that extends radially inwardly into the damper rod and/or such as may include a curved cross-sectional profile. Additionally, it will be appreciated that the damper rod can have any suitable cross-section of shape and/or configuration, and that the group can have any suitable cross-sectional shape and/or configuration. In some cases, the groove can have a cross-sectional shape that is approximately the same as the cross-sectional shape of the damper rod (e.g., both the damper rod and the groove could have a circular, pentagonal, hexagonal or octagonal shape). In other cases, the groove can have a cross-sectional shape that differs from the cross-sectional shape of the damper rod (e.g., the damper rod can have a polygonal cross-sectional shape and the groove can have a circular cross-sectional shape). It will be appreciated that, in some cases, the inclusion of a non-circular damper rod and corresponding releasable shaft-lock connection can inhibit twisting or rotational actions that may be inherent in certain gas spring and gas damper assemblies.

End cap 912 can also include one or more detent-engaging elements 952, such as hardened steel or ceramic spheres, for example, disposed within element bores 938 and that can be biased into engagement with an associated detent feature of a damper rod, such as groove 950 of damper rod 902, for example. It will be appreciated, however, that detent-engaging elements of other shapes, sizes and/or configurations could alternately be used, such as cylindrical and/or tapered rollers, for example.

Additionally, end cap 912 can also include one or more sealing elements, bushings and/or wear bands. In the exemplary arrangement shown in FIGS. 42 and 43, wear bands 954 are supported on or along passage wall 922, and can be dimensioned to abuttingly engage an outer surface of damper rod 902. In some cases, one or more of the wear bands and/or other components can be at least partially recessed into end cap body 916, such as may be at least partially defined by shoulder walls 956 and 958, for example.

Additionally, it will be appreciated that detent-engaging elements 952 can be biased into engagement with the associated detent (e.g., groove 950 of damper rod 902) in any suitable manner. As one example, one or more biasing elements can be supported on or along end cap body 916 and can operatively engage one or more of the detent-engaging elements. In the arrangement shown in FIGS. 42 and 43, for example, a plurality of biasing elements 960 are supported on end cap body 916 with at least one biasing element disposed within one of cavities 932. Biasing elements 960 are shown as being formed from an elongated element wall (not numbered) that has a somewhat C-shaped configuration with a base wall portion 962, side wall portions (e.g., side wall portions 864) and element engaging portions 966. Base wall portion 962 is disposed in abutting engagement with an inside surface (not numbered) of outer side wall 928. The side wall portions extend from along base wall portion 962 and are disposed adjacent corresponding connector walls 930. Element engaging portions 966 form free ends of the elongated element wall and can have a shape that abuttingly engages a corresponding number of one or more detent-engaging elements 952. In a preferred arrangement, element engaging portions 966 are disposed in spaced relation from the outer surface (not numbered) of inner side wall 926 such that the detent-engaging elements are biased in a radially inward direction due at least in part to a biasing force from the deflection of element engaging portions 966.

In some cases, biasing elements 960 can be formed from metal, such as from a spring-steel grade of material, for example. Additionally, in some cases, biasing elements can act as primary biasing elements and secondary biasing elements can be operatively associated with the primary biasing elements to supplement the biasing force acting on detent-engaging elements 952. As one example, secondary biasing elements (which are schematically represented in FIG. 39 by items 868) can take the form of any suitable spring device or other biasing element, such as a compression-type coil spring, for example. In the arrangement shown, the secondary biasing elements are operatively disposed between base wall portions 962 and element engaging portions 966. It will be appreciated, however, that other configurations and/or arrangements could alternately be used. Furthermore, in some cases, the secondary biasing elements can be substantially identical to one another, such as may be useful for providing supplemental biasing force, for example. In other cases, the secondary biasing elements can differ from one another, such as may be useful for balancing the biasing force acting on the detent-engaging elements, for example.

In some cases, one or more biasing elements 970 and/or 972 can be disposed within damping chamber 300, which can be operative to act between damper piston 288 and either one or both of end cap 912 and central portion 302A of piston wall 302. One benefit of including one or more of such biasing elements 970 and/or 972 within one or both of the chamber portions (e.g., chamber portions 300A and 300B) is that the biasing element can act as a bumper or cushion that impedes direct physical contact between damper piston 288 and a corresponding one of end cap 912 and/or central portion 302A of piston wall 302. Another benefit of including such one or more biasing elements 970 and/or 972 within one or both of the chamber portions is that the biasing element(s) can act to establish and/or control the longitudinal position of damper element 278 relative to other components of the gas damper assembly.

It will be appreciated that end cap 912 can be secured on or along an associated component, such as side wall 294 of damper element 278, for example, in any suitable manner. As one example, outer side wall 928 of end cap body 916 can be dimensioned for an interference fit with side wall 294 of damper element 278 such that a press-fit connection can formed therebetween. Such a press-fit connection can be used to retain end cap 912 in a desired position during assembly and/or other manufacturing processes. For example, such a press-fit connection can be used to set and maintain a preload on biasing elements 970 and/or 972 during the assembly process.

Additionally, or in the alternative, end cap 912 can, in some cases, include one or more grooves 974 and/or other features extending radially-inwardly (or outwardly) along outer side wall 928. In such cases, side wall 294 of damper element 278 can be swaged or otherwise deformed into abutting engagement with grooves 974 and/or any other such retention features, such as is represented in FIG. 43 by arrows SWG. Furthermore, or as a further alternative, end cap 912 can include a radiused outer shoulder 976 along outer side wall 928 and end surface 918. A distal wall portion 978 of side wall 294 can extend beyond end surface 918 prior to final assembly, and during the assembly process distal wall portion 978 can be crimped or otherwise radially-inwardly deformed around radiused outer shoulder 976 and along end surface 918 to retain end cap 912 on side wall 294 of damper element 278.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:
1. A gas spring and gas damper assembly comprising:
a gas spring having a longitudinal axis and including:
  a flexible spring member including a flexible wall extending peripherally about said axis and longitudinally between opposing first and second ends such that said flexible spring member at least partially defines a spring chamber;
  a first end member secured across said first end of said flexible spring member such that a substantially fluid-tight seal is formed therebetween; and,
  a second end member secured across said second end of said flexible spring member such that a substantially fluid-tight seal is formed therebetween; and,
a gas damper disposed within said gas spring and including:
  a first damper element operatively connected along said first end member;
  a second damper element operatively connected to said second end member and telescopically engaged with said first damper element for reciprocal motion relative to one another upon displacement of said gas spring between an extended condition and a compressed condition; and,
  a releasable axial-locking assembly operatively connected between said first and second damper elements capable of maintaining said first and second damper elements in a substantially fixed position relative to one another up to a predetermined force threshold and capable of permitting relative move- ment between said first and second damper elements under conditions in which said predetermined force threshold is exceeded.

2. A gas spring and gas damper assembly according to claim 1, wherein said releasable axial-locking assembly includes one or more rolling elements and one or more detents that are dimensioned to receive at least a portion of said one or more rolling elements.

3. A gas spring and gas damper assembly according to claim 2, wherein said one or more rolling elements include one of spherical rolling elements and cylindrical rolling elements.

4. A gas spring and gas damper assembly according to claim 2, wherein said releasable axial-locking assembly includes one or more biasing elements urging said one or more rolling elements into engagement with said one or more detents.

5. A gas spring and gas damper assembly according to claim 4, wherein said releasable axial-locking assembly includes an adjustable biasing force applied by said one or more biasing elements.

6. A gas spring and gas damper assembly according to claim 5, wherein said releasable axial-locking assembly includes one or more supplemental biasing elements operatively connected with said one or more biasing elements to provide said adjustable biasing force.

7. A gas spring and gas damper assembly according to claim 1, wherein said releasable axial-locking assembly includes an end cap supported on one of said first and second damper elements.

8. A gas spring and gas damper assembly according to claim 7, wherein said end cap includes an end cap body with one or more pockets formed into said end cap body from along an end surface thereof, and said biasing elements are C-shaped biasing elements that are disposed within said pockets.

9. A gas spring and gas damper assembly according to claim 7, wherein said end cap includes a side wall dimensioned to press fit against a wall of the other of said first and second damper elements.

10. A gas spring and gas damper assembly according to claim 7, wherein said end cap includes a side wall with an annular groove extending radially into said side wall, and a wall of the other of said first and second damper elements is deformed into said groove.

11. A gas spring and gas damper assembly according to claim 1, wherein said first damper element includes a damper rod and a damper piston, and said second damper element includes a damper housing dimensioned to receive at least a portion of said damper rod and said damper piston.

12. A suspension system comprising:
a pressurized gas system; and,
at least one gas spring and gas damper assembly according to claim 1 in fluid communication with said pressurized gas system.

13. A gas spring and gas damper assembly comprising:
a gas spring having a longitudinal axis and including:
a flexible spring member including a flexible wall extending peripherally about said axis and longitudinally between opposing first and second ends such that said flexible spring member at least partially defines a spring chamber;
a first end member secured across said first end of said flexible spring member such that a substantially fluid-tight seal is formed therebetween; and,
a second end member secured across said second end of said flexible spring member such that a substantially fluid-tight seal is formed therebetween; and,
a gas damper assembly disposed within said spring chamber and operatively connected between said first and second end members, said gas damper assembly including:
a first damper element operatively connected to said first end member and including a first side wall at least partially defining a first damping chamber;
a second damper element extending longitudinally between a first end and a second end opposite said first end, said second damper element including an end wall and a second side wall at least partially defining a second damping chamber, said end wall disposed transverse to said second side wall and at least partially forming a piston of said second damper element, said second damper element being oriented such that said piston of said second damper element and at least a portion of said second side wall are disposed within said first damping chamber, said second damper element being slidably supported within said first damping chamber such that said end wall is displaceable relative to said first side wall of said first damper element; and,
a third damper element operatively connected to said second end member and including a damper rod and a piston of said third damper element disposed along said damper rod in spaced relation to said second end member, said third damper element being oriented such that said piston of said third damper element and at least a portion of said damper rod are disposed within said second damping chamber, said third damper element being displaceable relative to said second side wall of said second damper element, said damper rod including at least one detent formed therealong; and,
a releasable axial-locking assembly operatively connected between said second and third damper elements, said releasable axial-locking assembly including:
a plurality of rolling elements dimensioned to be at least partially received within said at least one detent of said damper rod; and,
one or more radial biasing elements operative to urge said plurality of rolling elements into engagement with said at least one detent of said damper rod such that said plurality of rolling elements are capable of maintaining said second and third damper elements in a substantially fixed position relative to one another up to a predetermined force threshold and capable of permitting relative movement between said first and second damper elements under conditions in which said predetermined force threshold is exceeded.

14. A gas spring and gas damper assembly according to claim 13, wherein said gas damper assembly includes a first axial biasing element disposed within said second damping chamber between said first end of said second damper element and said piston of said third damper element, said first axial biasing element operative to urge said first end of said second damper element in a direction away from said piston of said third damper element.

15. A gas spring and gas damper assembly according to claim 14, wherein said gas damper assembly includes a second axial biasing element disposed within said second damping chamber between said second end of said second damper element and said piston of said third damper element, said second axial biasing element operative to urge said second end of said second damper element in a direction away from said piston of said third damper element.

16. A gas spring and gas damper assembly according to claim 13, wherein said releasable axial-locking assembly includes an end cap supported on said second damper element.

17. A gas spring and gas damper assembly according to claim 16, wherein said end cap includes an end cap body with one or more pockets formed into said end cap body from along an end surface thereof, and said one or more radial biasing elements are C-shaped biasing elements that are disposed within said pockets.

18. A gas spring and gas damper assembly according to claim 16, wherein said end cap includes a cap side wall dimensioned to press fit against said second side wall of said second damper element.

19. A gas spring and gas damper assembly according to claim 18, wherein said cap side wall includes an annular groove extending radially into said cap side wall, and said second side wall of said second damper element is deformed into said groove to at least partially retain said end cap on said second damper element.

20. A gas spring and gas damper assembly according to claim 13, wherein said releasable axial-locking assembly includes one or more supplemental biasing elements operatively engaged with said one or more radial biasing elements to generate an adjustable biasing force.

* * * * *